(12) United States Patent
Mahlmeister et al.

(10) Patent No.: US 11,731,045 B2
(45) Date of Patent: Aug. 22, 2023

(54) PRE-SET AUDIO PROFILES FOR GRAPHICAL USER INTERFACE AND PARAMETRIC EQUALIZER IN GAMING SYSTEMS

(71) Applicant: STEELSERIES ApS, Copenhagen SV (DK)

(72) Inventors: Jeffrey Nicholas Mahlmeister, Glenview, IL (US); Simon Duffy, Chicago, IL (US); Battsengel Lopez, Copenhagen (DK)

(73) Assignee: STEELSERIES ApS, Copenhagen SV (DK)

( * ) Notice: Subject to any disclaimer, the term of this patent is extended or adjusted under 35 U.S.C. 154(b) by 0 days.

(21) Appl. No.: 17/507,966

(22) Filed: Oct. 22, 2021

(65) Prior Publication Data
US 2023/0063610 A1    Mar. 2, 2023

Related U.S. Application Data

(60) Provisional application No. 63/240,004, filed on Sep. 2, 2021.

(51) Int. Cl.
*A63F 13/424* (2014.01)
*A63F 13/213* (2014.01)
(Continued)

(52) U.S. Cl.
CPC .......... *A63F 13/424* (2014.09); *A63F 13/213* (2014.09); *A63F 13/215* (2014.09); *A63F 13/533* (2014.09); *A63F 13/537* (2014.09); *A63F 13/54* (2014.09); *A63F 13/79* (2014.09);

*G06N 3/02* (2013.01); *G06N 3/08* (2013.01); *G10L 15/16* (2013.01); *G10L 15/26* (2013.01); *H04R 3/12* (2013.01); *H04R 5/033* (2013.01); *H04R 5/04* (2013.01); *H04S 7/302* (2013.01); (Continued)

(58) Field of Classification Search
CPC ....... A63F 13/54; A63F 13/537; A63F 13/424
See application file for complete search history.

(56) References Cited

U.S. PATENT DOCUMENTS 7,479,063 B2 *  1/2009  Pryzby ................ G07F 17/3267
                                                        463/35
8,811,629 B1    8/2014  Kulavik et al.
(Continued)

OTHER PUBLICATIONS

"PS5 3D Audio—Customize These Settings To Get The Perfect Sound For Your PlayStation 5 Gaming Setup", https://www.youtube.com/watch?v=SjCv3-WNHGw, Jan. 11, 2021, 1 page.
(Continued)

*Primary Examiner* — Steve Rowland
(74) *Attorney, Agent, or Firm* — Guntin & Gust, PLC; John G. Rauch

(57) ABSTRACT

A system that incorporates the subject disclosure may include, for example, a gaming system that cooperates with a graphical user interface to enable user modification and enhancement of one or more audio streams associated with the gaming system. In embodiments, the audio streams may include a game audio stream, a chat audio stream of conversation among players of a video game, and a microphone audio stream of a player of the video game. Additional embodiments are disclosed.

20 Claims, 47 Drawing Sheets

(51) Int. Cl.

| | |
|---|---|
| *A63F 13/215* | (2014.01) |
| *G10L 15/16* | (2006.01) |
| *G06N 3/02* | (2006.01) |
| *G10L 15/26* | (2006.01) |
| *H04R 3/12* | (2006.01) |
| *H04R 5/033* | (2006.01) |
| *H04R 5/04* | (2006.01) |
| *H04S 7/00* | (2006.01) |
| *A63F 13/537* | (2014.01) |
| *A63F 13/54* | (2014.01) |
| *A63F 13/533* | (2014.01) |
| *A63F 13/79* | (2014.01) |
| *G06N 3/08* | (2023.01) |
| *A63F 13/87* | (2014.01) |

(52) U.S. Cl.
CPC .............. *H04S 7/308* (2013.01); *A63F 13/87* (2014.09); *A63F 2300/308* (2013.01); *A63F 2300/5546* (2013.01); *A63F 2300/572* (2013.01); *A63F 2300/6072* (2013.01); *A63F 2300/6081* (2013.01); *H04S 2400/01* (2013.01); *H04S 2420/01* (2013.01)

(56) References Cited

U.S. PATENT DOCUMENTS

| | | | |
|---|---|---|---|
| 9,675,871 | B1 | 6/2017 | Jetter et al. |
| 11,011,015 | B2* | 5/2021 | Achmueller ........ G07F 17/3206 |
| 2003/0100359 | A1* | 5/2003 | Loose ................ G07F 17/32 463/20 |
| 2005/0043090 | A1* | 2/2005 | Pryzby ............... G07F 17/3227 463/35 |
| 2005/0277469 | A1* | 12/2005 | Pryzby ................. G07F 17/323 463/20 |
| 2008/0320545 | A1* | 12/2008 | Schwartz ........... H04N 21/8541 725/135 |
| 2010/0261523 | A1* | 10/2010 | Bonney .............. G07F 17/3227 463/25 |
| 2012/0014553 | A1 | 1/2012 | Bonanno |
| 2013/0331188 | A1* | 12/2013 | Bonney .............. G07F 17/3227 463/35 |
| 2014/0153727 | A1 | 6/2014 | Walsh et al. |
| 2015/0106711 | A1 | 4/2015 | Virolainen |
| 2015/0302684 | A1* | 10/2015 | Loose ................ G07F 17/3227 463/31 |
| 2016/0303474 | A1 | 10/2016 | Kuruba Buchannagari et al. |
| 2018/0310115 | A1 | 10/2018 | Romigh |
| 2020/0043282 | A1* | 2/2020 | Keilwert ............ G07F 17/3239 |
| 2020/0097312 | A1* | 3/2020 | Kotteri ................ G06F 9/45545 |
| 2020/0242887 | A1* | 7/2020 | Achmueller ........ G07F 17/3206 |

OTHER PUBLICATIONS

Lundqvist, Jonas, "In a real game situation, is HRTF-enhanced game audio preferable over regular stereo game audio?", Luleå University of Technology | Bachelor thesis | Audio Technology | Department of Music and media | Division of Media and adventure management: 2010:152—ISSN: 1402-1773—ISRN: LTU-CUPP—10/152—SE, 2010, 19 pages.

Mills, Matt, "What is HRTF: Listening to Positional Audio in Games", https://itigic.com/hrtf-listening-to-positional-audio-in-games/, 7 pages.

Moore-Coyler, Roland, "PS5 and 3D audio: Everything you need to know", https://www.tomsguide.com/features/ps5-and-3d-audio-everything-you-need-to-know, Oct. 6, 2020, 17 pages.

Hennequin, Romain , et al., "Spleeter: a fast and efficient music source separation tool with pre-trained models", Journal of Open Source Software, 1 (5(50), 2154, Jun. 24, 2020, 4 pages.

Iwaya , "Individualization of head-related transfer functions with tournament-style listening test: Listening with other's ears", Acoust. Sci. & Tech., vol. 27, No. 6, Nov. 2006, pp. 340-343., 5 pgs.

Poirier-Quinot , et al., "Impact of HRTF individualization on player performance in a VR shooter game I", Conference on Spatial Reproduction, Aug. 2018, 7 pgs.

Seeber , et al., "Subjective Selection of Non-Individual Head-Related Transfer Functions", Proceedings of the 2003 International Conference on Auditory Display, Jul. 2003, 4 pgs.

Shukla , et al., "User selection of optimal HRTFf sets via holistic comparative evaluation", Conference on Audio for Virtual and Augmented Reality, Aug. 2018., 10 pages.

\* cited by examiner

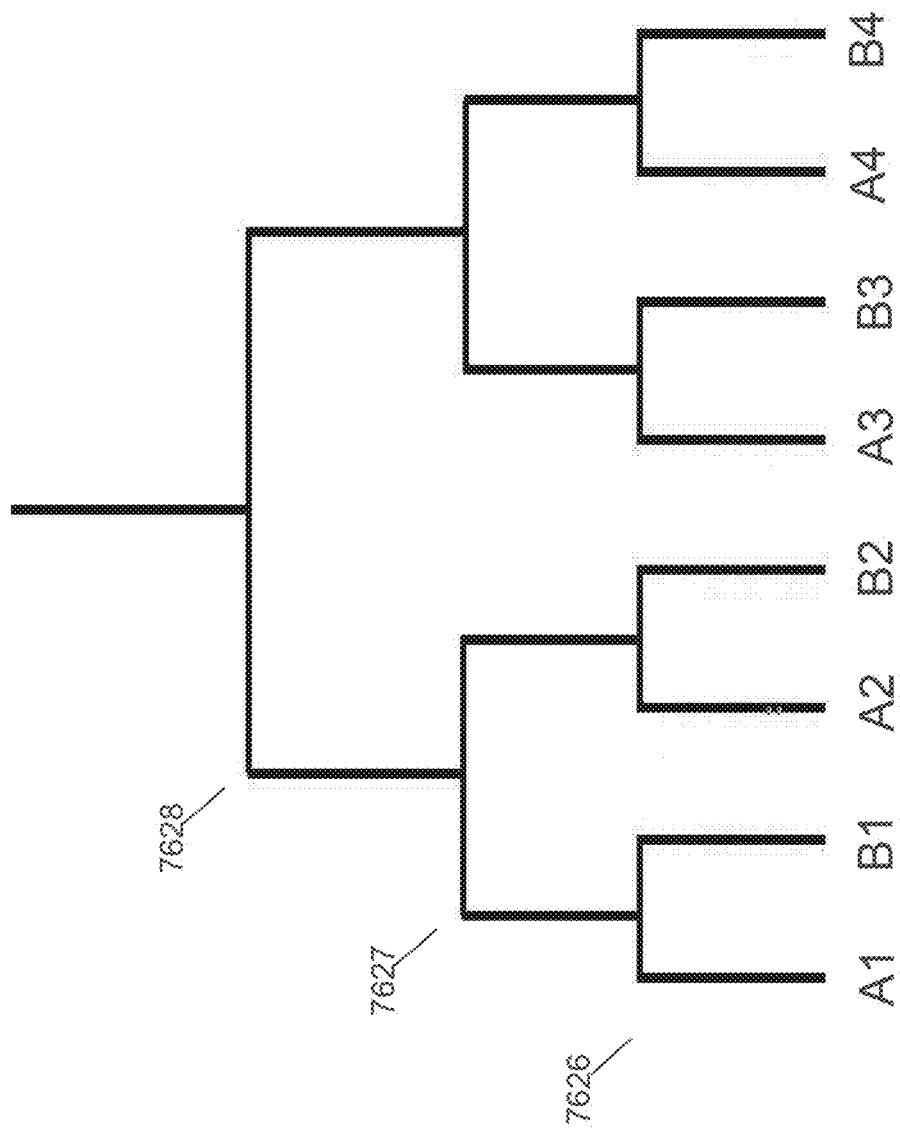

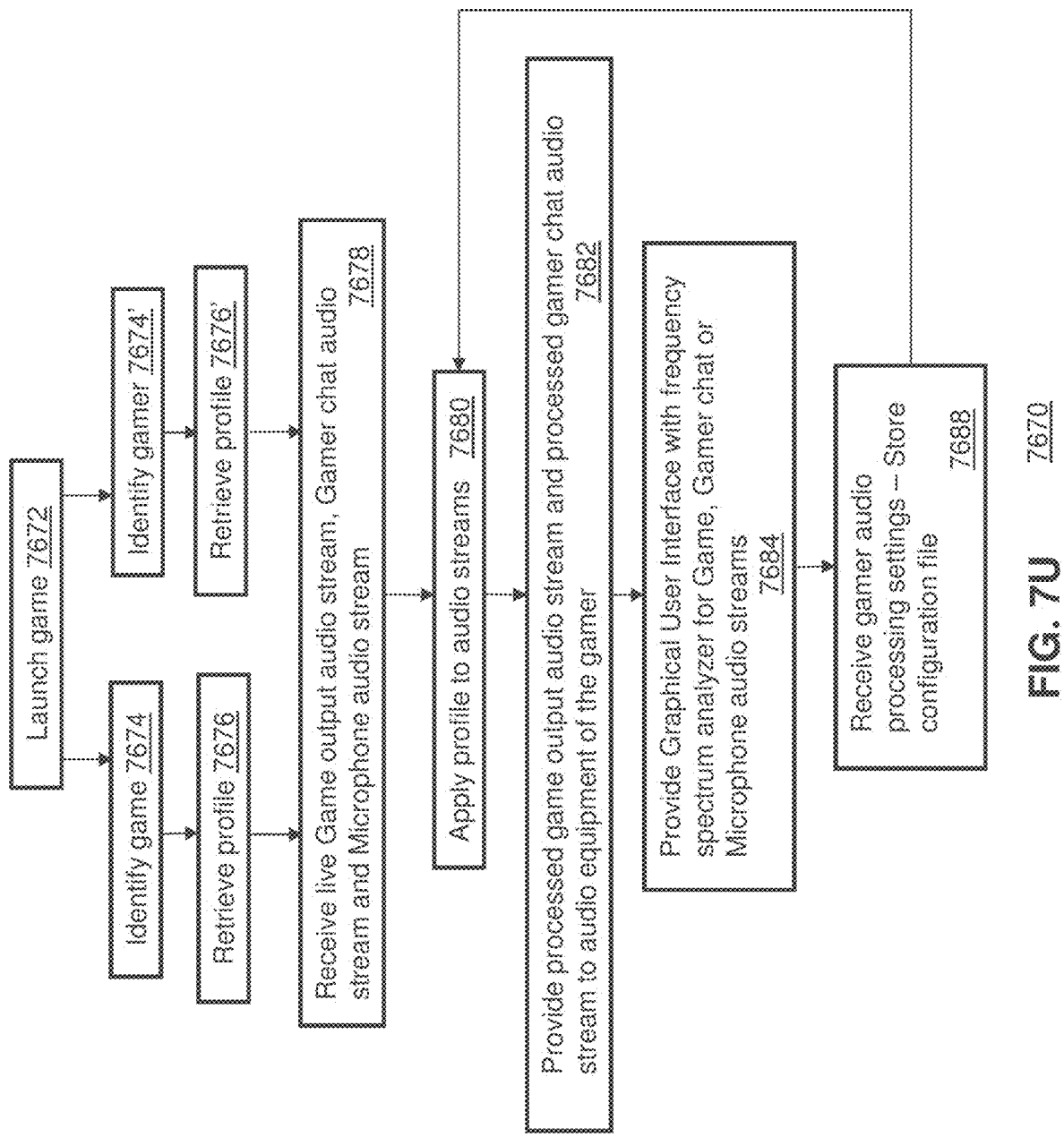

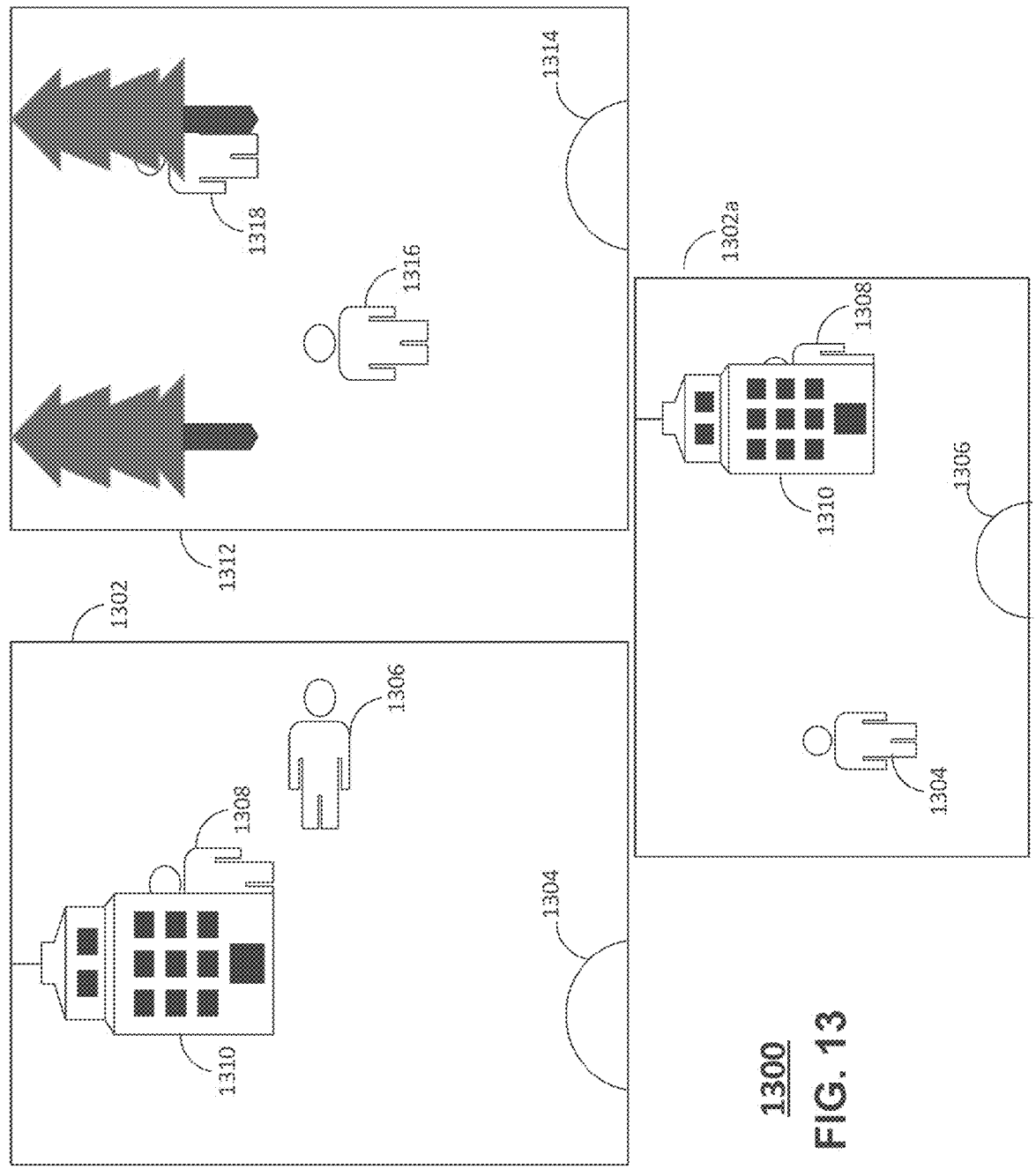

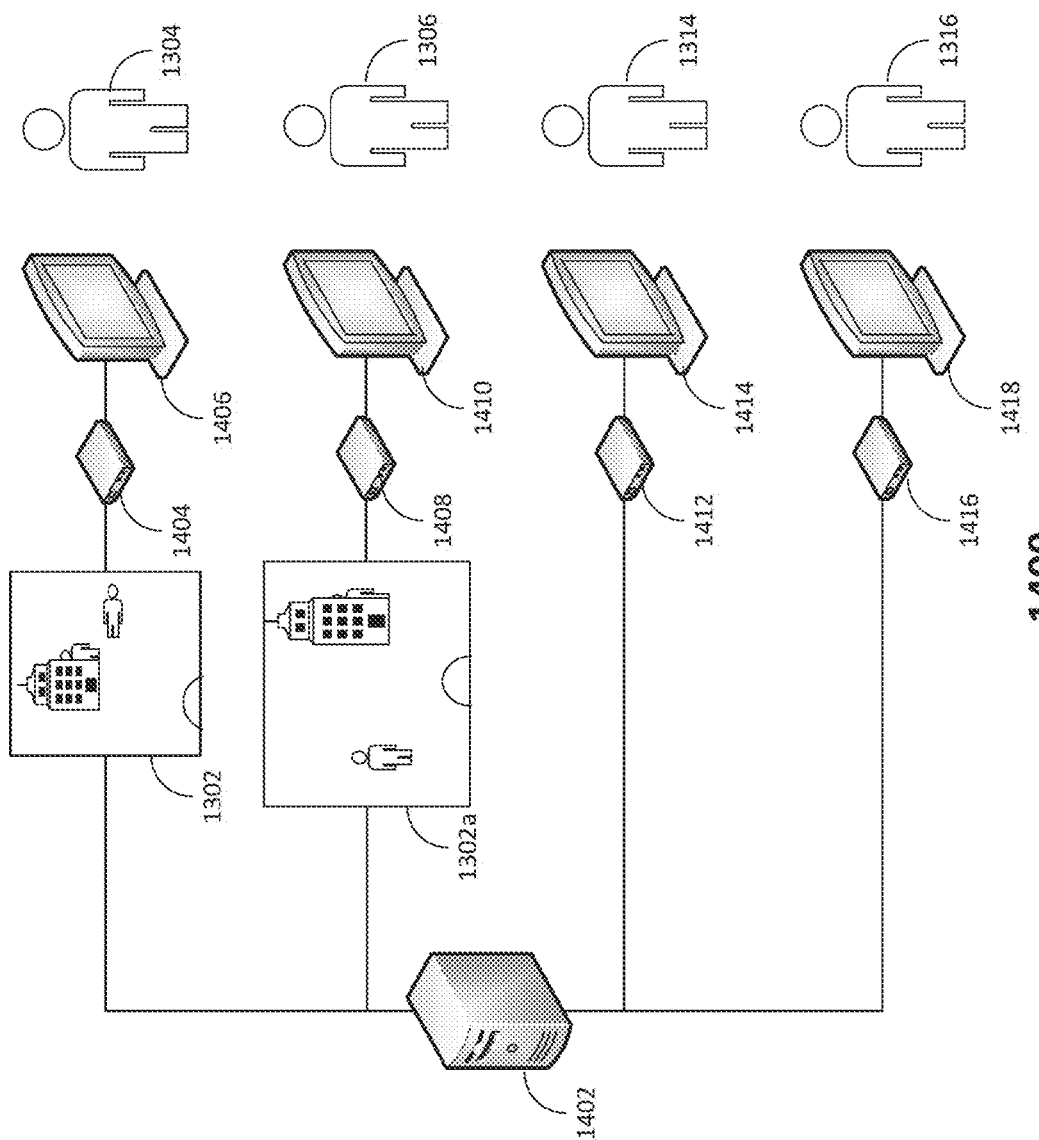

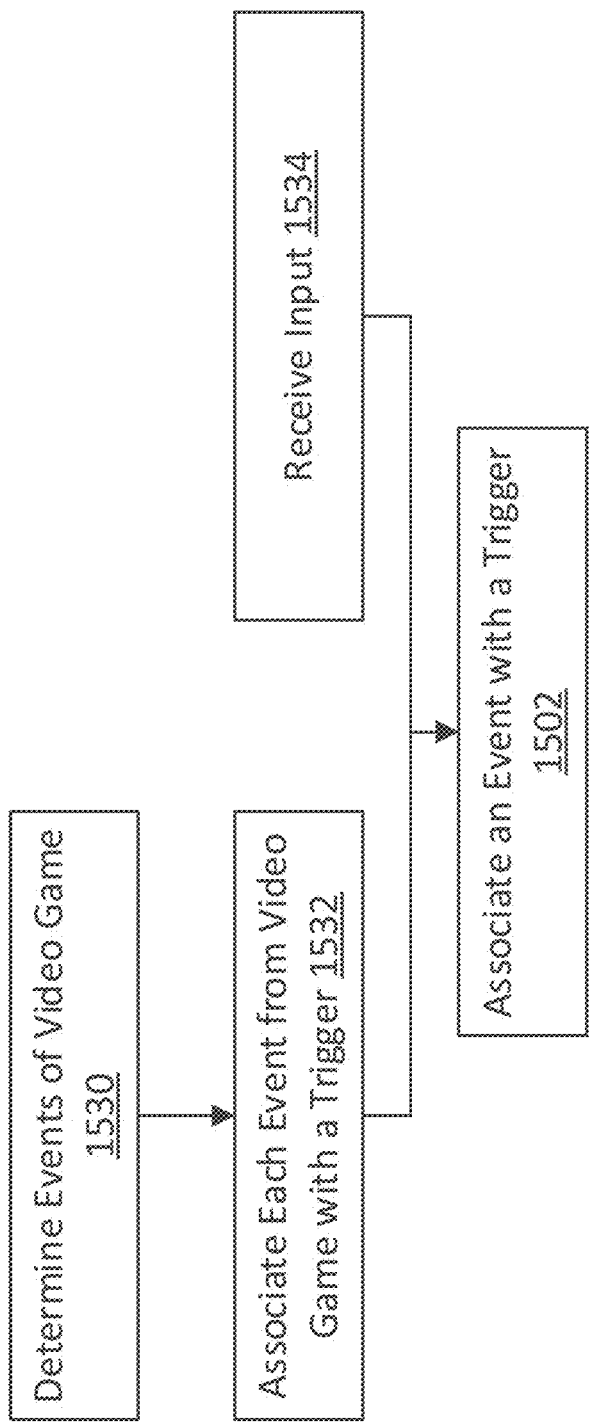

… (1)

PRE-SET AUDIO PROFILES FOR GRAPHICAL USER INTERFACE AND PARAMETRIC EQUALIZER IN GAMING SYSTEMS

CROSS-REFERENCE TO RELATED APPLICATION(S)

The present application claims the benefit of priority to U.S. Provisional Application No. 63/240,004 filed Sep. 2, 2021. All sections of the aforementioned application are incorporated herein by reference in their entirety.

FIELD OF THE DISCLOSURE

The present disclosure relates generally to a method and apparatus for providing a graphical user interface and a parametric equalizer for audio streams in a gaming system, including storing and retrieving pre-set audio profiles for gamers.

BACKGROUND

It is common today for gamers to utilize more than one gaming accessory. This is especially true of gamers who play on-line games or competitive games in a team or individual configuration. Gamers can have at their disposal accessories such as a keyboard, a general-purpose gaming pad, a mouse, a gaming console controller, a headset to communicate with other players, a joystick, a computer console, or other common gaming accessories.

A gamer can frequently use a combination of these accessories in a single game (e.g., headset, a keyboard, and mouse). Efficient management and utilization of these accessories can frequently impact a gamer's ability to compete.

Accessory management can have utility in other disciplines which may not relate to gaming applications. Efficient use of accessories in these other disciplines can be important to other users.

In addition, a player can play a video game with other players, as teammates or against opponents, all of which are remotely connected over a communication network. Players may communicate with teammates via spoken audio and players may hear game sounds generated by the video game. Further, the video game can monitor aspects of player interaction with the video game such that player performance can be reviewed to improve future performance.

BRIEF DESCRIPTION OF THE DRAWINGS

Reference will now be made to the accompanying drawings, which are not necessarily drawn to scale, and wherein:

FIGS. 7L-1 and FIG. 7L-2 depict an illustrative embodiment of operating system controls of a user interface for selecting device preferences;

FIG. 7L-3 depict an illustrative embodiment of a process for listener selection of a head-related transfer function (HRTF) profile for use by the user;

FIGS. 7M-7T depict an illustrative embodiment of a graphical user interface display of an audio processing system for a gaming system in accordance with aspects of the subject disclosure;

FIGS. 7U and 7V depict illustrative embodiments of methods utilized in the subject disclosure.

FIG. 13 depicts system to identify a group of possible trigger clips in accordance with aspects of this disclosure.

FIG. 14 depicts a system to distribute a group of trigger clips to a group of players in accordance with aspects of this disclosure.

FIGS. 15A-D depict illustrative embodiments of methods utilized in the subject disclosure.

DETAILED DESCRIPTION

Figure 1:
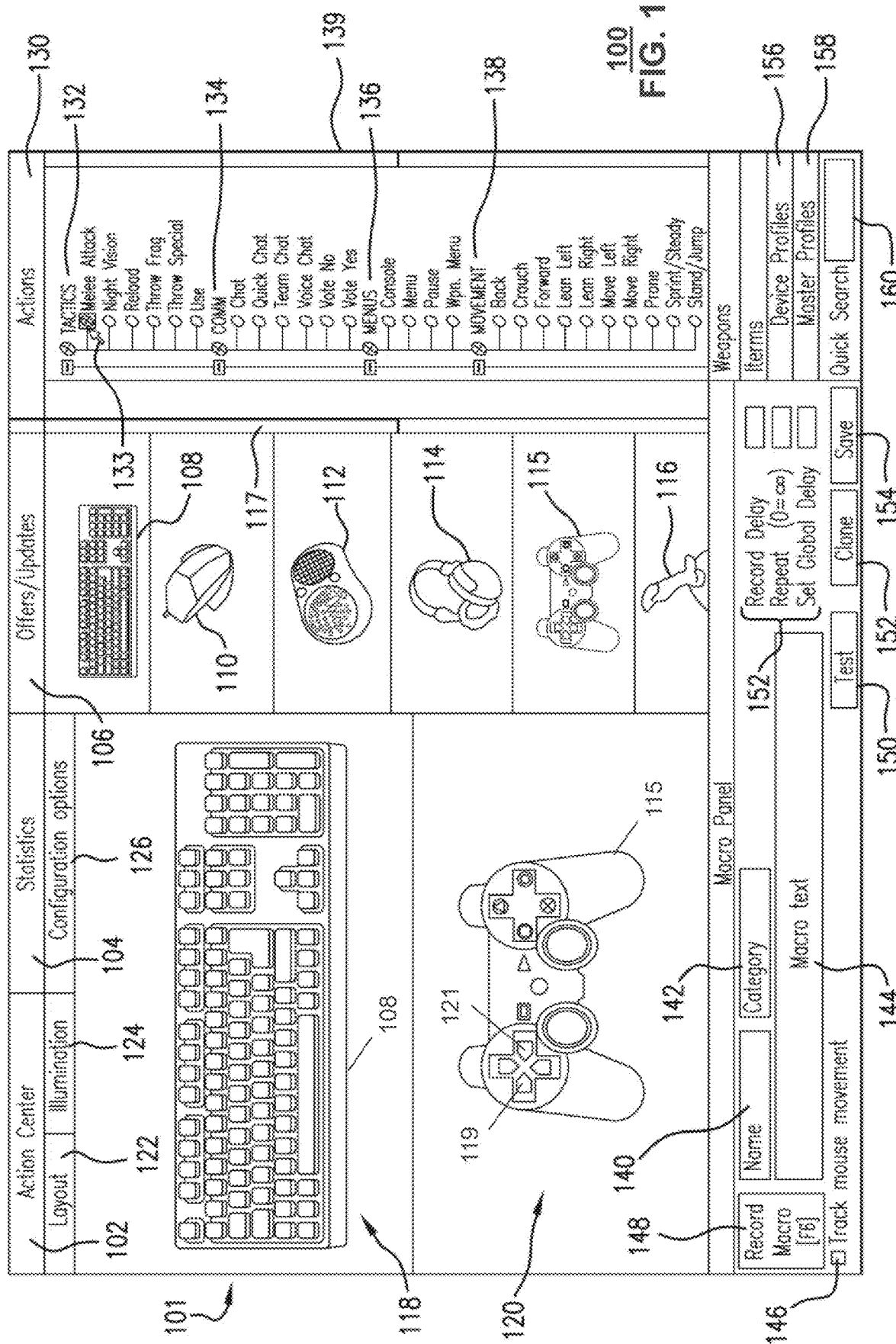
FIG. 1 depicts an illustrative embodiment of a Graphical User Interface (GUI) generated by an Accessory Management Software (AMS) application according to the present disclosure.

The subject disclosure describes, among other things, illustrative embodiments of, for example, a gaming system that cooperates with a graphical user interface to enable user modification and enhancement of one or more audio streams associated with the gaming system. In embodiments, the audio streams may include a game audio stream, a chat audio stream of conversation among players of a video game, and a microphone audio stream of a player of the video game. A player may adjust audio of the audio streams independently to improve clarity, reduce noise, assist in identifying in-game sounds such as footsteps and gunshots. The graphical user interface may be displayed on a display device of the player and manually adjusted to preferred settings or player profile or configuration file may be retrieved for each audio stream. To further enhance sound and audio quality for a player, a head-related transfer function may be chosen from among a set of predefined transfer functions. Audio may be provided in a surround sound arrangement to enhance the audio experience of the user still further. Individual sounds within the game audio may be analyzed and identified, such as by a neural network, and enhanced to give the game player an improved audio experience and a competitive advantage in playing the video game. Other embodiments are described in the subject disclosure.

One embodiment of the subject disclosure includes receiving a plurality of audio streams including a game output audio stream of a gaming application, a gamer chat audio stream produced by a plurality of gamers participating in the gaming application, and a gamer microphone audio stream produced by one gamer of the plurality of gamers, processing the game output audio stream according to first audio processing settings of one gamer, forming a processed game output audio stream, and processing the gamer chat audio stream according to second audio processing settings of the one gamer, forming a processed gamer chat audio stream. Embodiments further include processing the gamer microphone audio stream according to third audio processing settings of the one gamer, forming a processed gamer microphone audio stream, providing the processed game output audio stream and the processed gamer chat audio stream to audio equipment of the one gamer, and providing, the processed gamer microphone audio stream to one or more gamers of the plurality of gamers.

One embodiment of the subject disclosure includes receiving a live game output audio stream of a gaming application currently being played by the plurality of gamers, providing on a display device of one gamer of the plurality of gamers, a graphical user interface, the graphical user interface including a parametric equalizer user interface for selection of one or more live audio processing settings by the one gamer for the live game output audio stream, receiving from the graphical user interface, data defining the one or more live audio processing settings, and modifying the live game output audio stream of the gaming application according to the one or more live audio processing settings.

One embodiment of the subject disclosure includes receiving a live game output audio stream of a gaming application currently being played by the plurality of gamers, retrieving a stored configuration file, the stored configuration file including data defining stored live audio processing settings, and modifying the live game output audio stream of the gaming application according to the stored live audio processing settings.

One embodiment of the subject disclosure includes a processing system including a processor and a memory that stores executable instructions that, when executed by the processing system, facilitate performance of operations, the operations comprising a gaming application producing gaming output information including a game output audio stream and an audio processing module in data communication with the gaming application, the audio processing module operative to receive the game output audio stream from the gaming application and to produce a plurality of game audio streams, the audio processing module further operative to apply respective audio customizations to each respective game audio stream of the plurality of game audio streams, according to gamer input defining the respective audio customizations for each respective game audio stream.

One embodiment of the subject disclosure includes a device including a gaming application producing gaming output information including a game output audio stream and a head-related transfer function (HRTF) module in data communication with the gaming application, the HRTF module operative to receive the game output audio stream from the gaming application and to apply a selected head-related transfer function to the game output audio stream to produce a surround sound audio stream, the selected head-related transfer function selected from a plurality of standardized head-related transfer functions.

One embodiment of the subject disclosure includes receiving a gaming system audio stream during a video game, detecting a current trigger in the gaming system audio stream during the video game, recording a trigger clip of game content, wherein the trigger clip comprises a portion of game content that includes the current trigger, and providing the clip to a group of gaming devices over a communication network, wherein each gaming device of the group of gaming devices is associated with one player of the video game.

One embodiment of the subject disclosure includes receiving a gaming system audio stream during a video game the gaming system audio stream comprising a plurality of audio streams including a chat audio stream, a game audio stream and a microphone audio stream, detecting, by the processing system, a predetermined event in the gaming system audio stream during the video game, modifying an audio spectrum of the gaming system audio stream to emphasize the predetermined event in the gaming system audio stream, producing an equalized audio stream, and providing the equalized audio stream to an audio device of a player of the video game.

One or more aspects of the subject disclosure include receiving a live game output audio stream of a gaming application currently being played by a plurality of gamers, retrieving a stored configuration file, the stored configuration file including data defining stored live audio processing settings, modifying the live game output audio stream of the gaming application according to the stored live audio processing settings, forming modified gaming audio, and providing the modified gaming audio to one or more gamers of the plurality of gamers.

One or more aspects of the subject disclosure include initiating a gaming application for a gamer of a plurality of gamers, retrieving a gamer configuration file associated with the gamer, receiving a gaming application audio output stream, applying audio modifications specified by the gamer configuration file to the gaming application audio output stream, forming a modified gaming audio stream, and providing the modified gaming audio stream to one or more gamers including the gamer.

One or more aspects of the subject disclosure include initiating a gaming application for a gamer of a plurality of gamers, retrieving a standard configuration file, the standard configuration file including standard audio modifications to a gaming audio stream of the gaming application, receiving a gaming application audio output stream and applying the standard audio modifications to the gaming audio output stream, forming a modified gaming audio stream. Aspects of the subject disclosure further include providing the modified gaming audio stream to one or more gamers including the gamer, receiving, from actuation of a graphical user interface by the gamer of the plurality of gamers, customizations to the standard audio modifications specified by the standard configuration file, forming a customized configuration file for the gamer of the plurality of gamers, and storing the customized configuration file for subsequent retrieval and access by the gamer of the plurality of gamers.

FIG. 1 depicts an illustrative embodiment of a Graphical User Interface (GUI) generated by an Accessory Management Software (AMS) application according to the present disclosure. The AMS application can be executed by a computing device such as a desktop computer, a laptop computer, a tablet, a server, a mainframe computer, a gaming console, a gaming accessory, or any combination or portions thereof. The AMS application can also be executed by portable computing devices such as a cellular phone, a personal digital assistant, or a media player. The AMS application can be executed by any device with suitable computing and communication resources.

Figure 2:
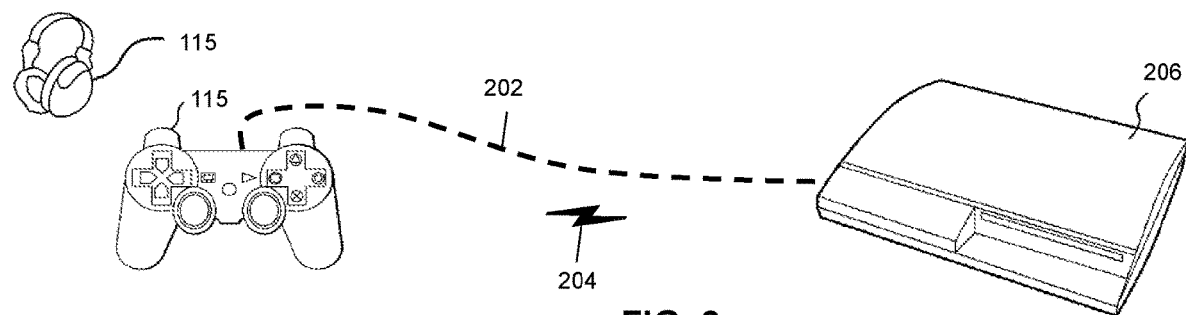
FIGS. 2-3 depict illustrative embodiments for communicatively coupling a gaming controller to a computing device.

FIG. 2 illustrates a number of embodiments for utilizing a gaming controller 115 with a computing device 206 in the form of a gaming console. In the illustration of FIG. 2, the gaming controller 115 can be communicatively coupled to the gaming console 206 with a tethered cable interface 202 such as a USB or proprietary cable, or a wireless interface 204 such as Wi-Fi, Bluetooth, ZigBee, or a proprietary wireless communications protocol. The cable interface 202 provides a means for communication that may be less susceptible to electromagnetic interference. It will be appreciated that the gaming controller 115 may further include a headset 114 (with or without a microphone not shown) utilized by a gamer to communicate with teammates and/or to listen to game sounds in high fidelity. In the illustration of FIG. 2, the AMS application can in whole or in part be executed by the gaming controller 115, the gaming console 206, or a combination thereof.

Figure 3:
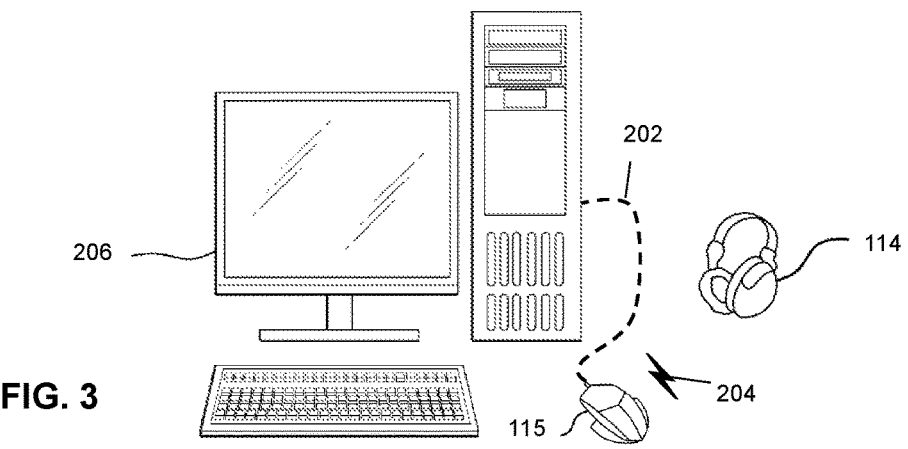

FIG. 3 illustrates a number of other embodiments for utilizing a gaming controller 115 with a computing device 206. In this embodiment, the gaming controller 115 comprises a mouse and the computing device 206 comprises a computer. The gaming controller 115 can be tethered to the computing device 206 by a cable interface 202 (e.g., USB cable or proprietary cable) or a wireless interface 204. The cable interface 202 provides a means for communication that may be less susceptible to electromagnetic interference. It will be appreciated that the gaming controller 115 may further include a headset (with or without a microphone not shown) utilized by a gamer to communicate with teammates and/or to listen to game sounds in high fidelity. In the illustration of FIG. 3, the AMS application can in whole or in part be executed by the gaming controller 115, the gaming console 206, or a combination thereof.

For illustration purposes, the terms gaming console 206 and computer 206 will be used hence forth interchangeably with the term computing device 206 with an understanding that a computing device 206 may represent a number of other devices such as a server, a tablet, a smart phone, and so on. Accordingly, a computing device 206 can represent any device with suitable computing resources to perform the methods described in the subject disclosure.

Figure 4:
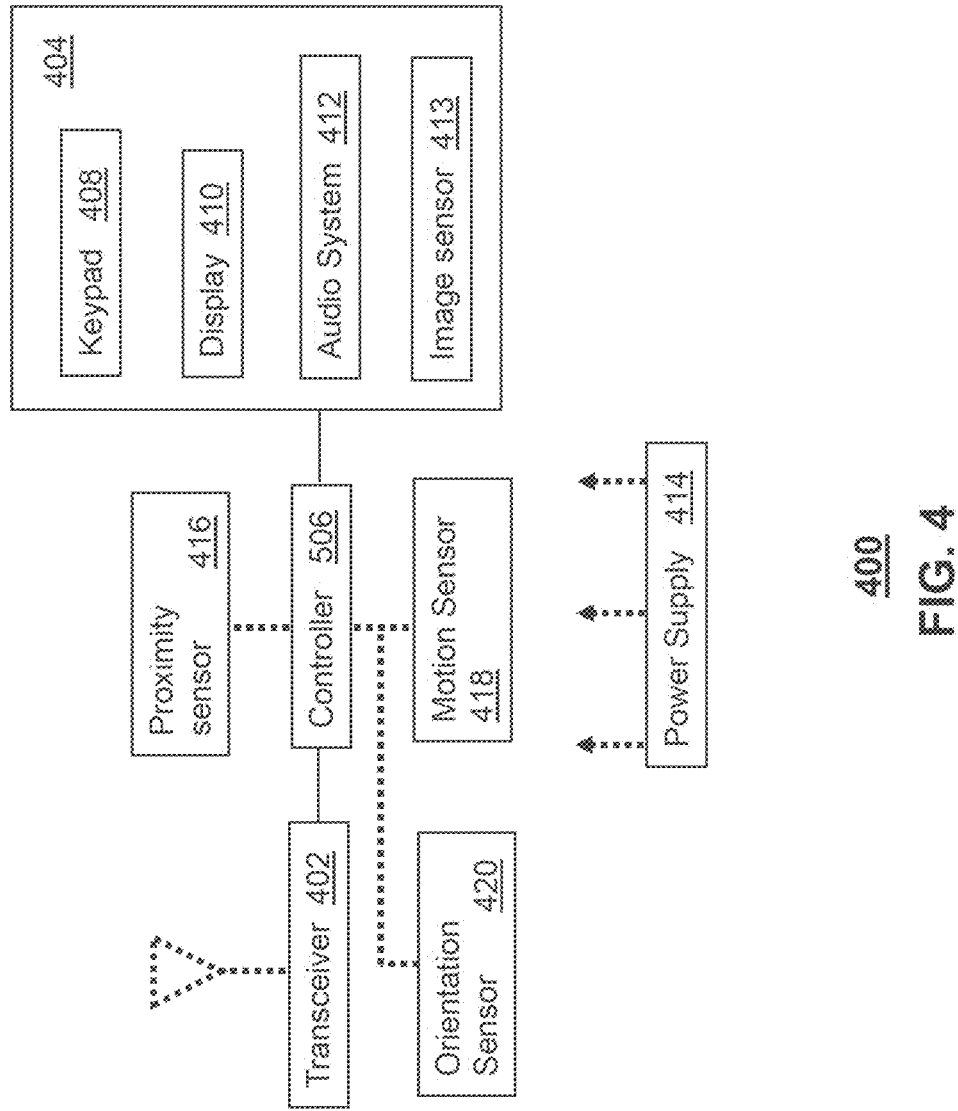
FIG. 4 depicts an illustrative embodiment of a communication device.
Figure 5:
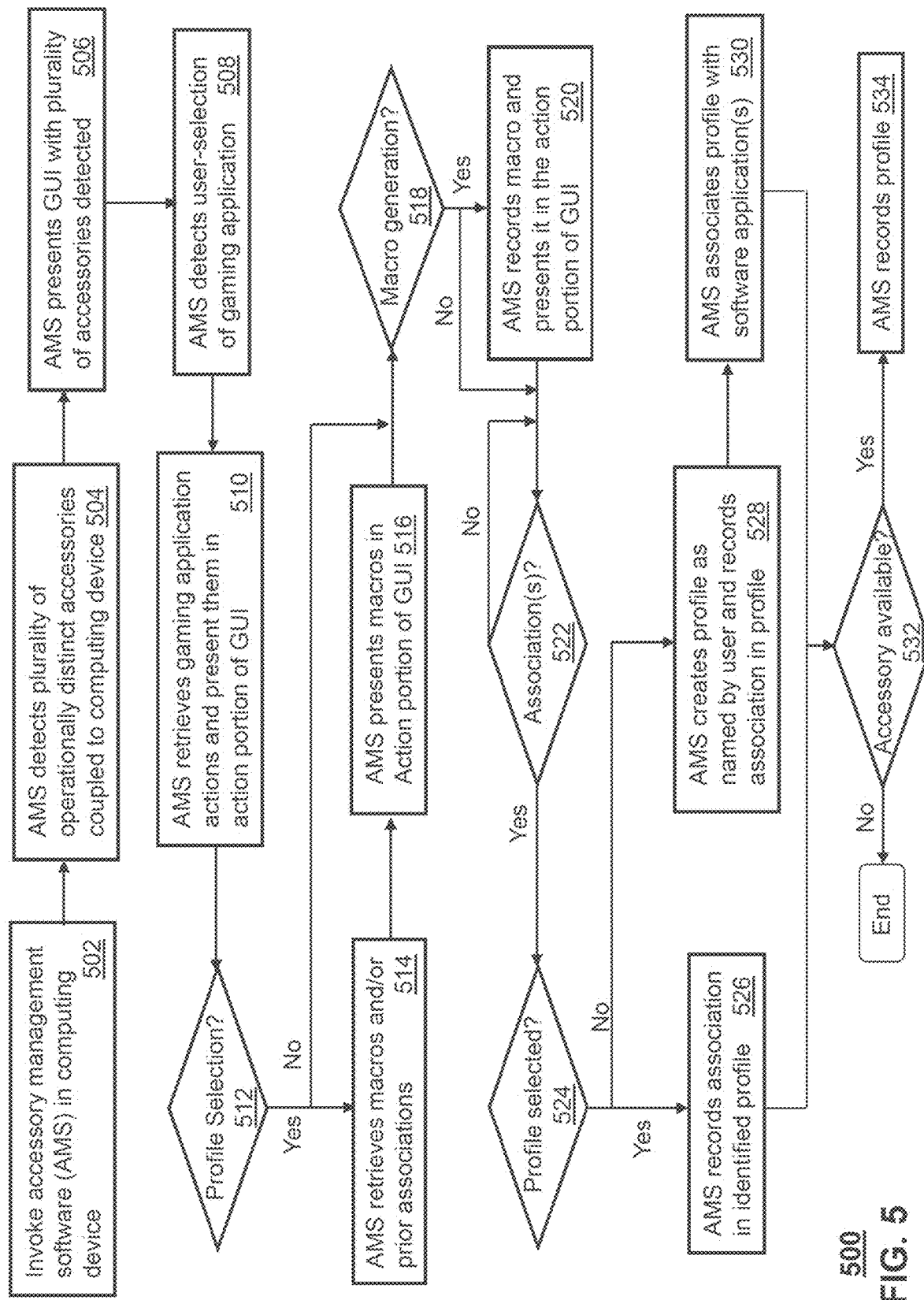
FIG. 5 depicts an illustrative embodiment of a first method utilized in the subject disclosure.

FIG. 4 depicts an illustrative embodiment of a communication device 400. Communication device 400 can serve in whole or in part as an illustrative embodiment of devices described in the subject disclosure. The communication device 400 can comprise a wireline and/or wireless transceiver 402 (herein transceiver 402), a user interface (UI) 404, a power supply 414, a proximity sensor 416, a motion sensor 418, an orientation sensor 420, and a controller 406 for managing operations thereof. The transceiver 402 can support short-range or long-range wireless access technologies such as Bluetooth, Wi-Fi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 coupled to a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400.

In an embodiment where the display 410 utilizes touch-sensitive technology, a portion or all of the keypad 408 can be presented by way of the display 410 with navigation features. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements.

The UI 404 can also include an audio system 412 that utilizes common audio technology for conveying low volume audio (such as audio heard only in the proximity of a human ear) and high-volume audio (such as speakerphone for hands free operation, stereo or surround sound system). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images and performing image recognition therefrom.

The power supply 414 can utilize common power management technologies such as replaceable or rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port or by way of a power cord attached to a transformer that converts AC to DC power.

The proximity sensor 416 can utilize proximity sensing technology such as an electromagnetic sensor, a capacitive sensor, an inductive sensor, an image sensor or combinations thereof. The motion sensor 418 can utilize motion sensing technology such as an accelerometer, a gyroscope, or other suitable motion sensing technology to detect movement of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, Wi-Fi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 as described herein can operate with more or less components described in FIG. 4 to accommodate the implementation of devices described by the subject disclosure. These variant embodiments are contemplated by the subject disclosure.

FIGS. 5-7A depict methods 500-700 describing illustrative embodiments of the AMS application. Method 500 can begin with step 502 in which the AMS application is invoked in a computing device. The computing device can be a remote server (not shown), the gaming console 206 or computer 206 of FIGS. 2-3, or any other computing device with suitable computing resources. The invocation step can result from a user selection of the AMS application from a menu or iconic symbol presented by the computing device 206, or when a user communicatively couples a gaming controller 115 or other form of accessory device with the computing device 206. In step 504, the AMS application can detect by way of software drivers in an operating system (OS) of the computing device 206 a plurality of operationally distinct accessories communicatively coupled to the computing device 206. The accessories can be coupled to the computing device 206 by a tethered interface (e.g., USB cable), a wireless interface (e.g., Bluetooth or Wireless Fidelity—Wi-Fi), or combinations thereof.

In the present context, an accessory can represent any type of device which can be communicatively coupled to the computing device 206 (or which can be an integral part of the computing device) and which can control aspects of the OS and/or a software application operating from the computing device 206. An accessory can represent for example a keyboard, a touch screen display, a gaming pad, a gaming controller, a mouse, a joystick, a microphone, or a headset with a microphone—just to mention a few.

In step 506, the AMS application presents a GUI 101 such as depicted in FIG. 1 depicting operationally distinct accessories such as a keyboard 108, and a gaming controller 115. The GUI 101 presents the accessories 108-116 in a scrollable section 117. One or more accessories can be selected by a user with a mouse pointer. In this illustration, the keyboard 108 and the gaming controller 115 were selected for customization. Upon selecting the keyboard 108 and the gaming controller 115 from the scrollable window of section 117, the AMS application presents the keyboard 108 and the gaming controller 115 in split windows 118, 120, respectively, to assist the user during the customization process.

In step 508, the AMS application can be programmed to detect a user-selection of a particular software application such as a video game. This step can be the result of the user entering in a Quick Search field 160 the name of a gaming application (e.g., World of Warcraft™ or WoW). Upon identifying a gaming application, the AMS application can retrieve in step 510 from a remote or local database gaming application actions which can be presented in a scrollable section 139 of the GUI represented as "Actions" 130. The actions can be tactical actions 132, communication actions 134, menu actions 136, and movement actions 138 which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories being customized in windows 118 and 120 by way of a drag and drop action or other customization options. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or selectable options of the gaming controller 115 to make an association with an input function of one of these accessories. Actions of one accessory can also be associated with another accessory that is of a different category. For example, key depressions "Ctrl A" of the keyboard 108 can be associated with one of the buttons of the gaming controller 115 (e.g., the left button 119).

In one embodiment, a Melee Attack action can be associated by dragging this action to either the left button 119 or right button 121 of the gaming controller 115. Thus, when the selected button is depressed, the stimulus signal that is generated by the selected button of the gaming controller 115 can be substituted by the AMS application with the Melee Attack action. In another embodiment, the AMS application can be configured so that the Melee Attack action can be associated with a combination of key button presses (e.g., simultaneous depression of the left and right buttons 119, 121, or a sequence of button depressions: two rapid left button depressions followed by a right button depression).

In yet another embodiment, the AMS application can be configured so that the Melee Action can be associated with movement of the gaming controller 115 such as, for example, rapid movement or shaking of the gaming controller 115. In a further embodiment, the AMS application can be adapted to make associations with two dimensional or three-dimensional movements of the gaming controller 115 according to a gaming venue state. For example, suppose the player's avatar enters a fighter jet. In this gaming venue state, moving the left navigation knob forward can be associated by the AMS application with controlling the throttle of the jet engines. Rapidly moving the gaming controller 115 downward can represent release of munitions such as a bomb.

In a gaming venue state where the gamer's avatar has entered a building, lifting of the gaming controller 115 above a first displacement threshold can be associated with a rapid movement of the avatar up one floor. A second displacement threshold can be associated with a rapid movement of the avatar down one floor—the opposite of the first displacement threshold. Alternatively, the second displacement threshold could be associated with a different action such as jumping between buildings when the avatar is on the roof of a building.

The AMS application can monitor gaming venue states by analyzing captured images produced by the gaming application (e.g., one or more still images of a tank, or a video of an avatar entering a tank), and/or by receiving messages from the gaming application by way of an application programming interface (API) thereby enabling the AMS application to identify the occurrence of a particular gaming venue state.

At step 512 the AMS application can also respond to a user selection of a profile. A profile can be a device profile or master profile invoked by selecting GUI button 156 or 158, each of which can identify the association of gaming actions with input functions of one or more accessories. If a profile selection is detected in step 512, the AMS application can retrieve in step 514 macro(s) and/or prior associations defined by the profile. The actions and/or macros defined in the profile can also be presented in step 516 by the AMS application in the actions section 130 of the GUI 101 to modify existing profile associations or create new associations.

In step 518, the AMS application can also respond to a user selection to create a macro. A macro in the present context can mean any actionable command which can be recorded by the AMS application. An actionable command can represent a sequence of stimuli generated by manipulating input functions of an accessory, a combination of actions in the Action section 130, an identification of a software application to be initiated by the OS of the computing device 206, or any other recordable stimulus to initiate, control or manipulate software applications. For instance, a macro can represent a user entering the identity of a software application (e.g., instant messaging tool) to be initiated by the OS upon the AMS application detecting a speech command using speech recognition technology.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a joystick of the gaming controller 115, recordable selections of buttons of the gaming controller 115, and so on. Macros can also be combinations of the above illustrations with selected actions from the Actions 130 menu. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, navigation knob movements of the gaming controller 115, etc.) and/or by manual entry in field 144 (e.g., typing the name and location of a software application to be initiated by an OS, such as an instant messaging application, keyboard entries such as Ctrl A, etc.). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to modify and thereby customize the timing of one or more stimulations in the stimulation sequence. Once the macro has been fully defined, selection of button 154 records the macro in step 520. The recording step can be combined with a step for adding the macro to the associable items Actions column 130, thereby providing the user the means to associate the macro with input functions of the accessories (e.g., one or more keys of the keyboard 108, buttons of the gaming controller 115, etc.).

In step 522, the AMS application can respond to drag and drop associations of actions with input functions of the keyboard 108 or the gaming controller 115. Associations can also be made based on the two- or three-dimensional movements of the gaming controller 115. If user input indicates that a user is performing an association, the AMS application can proceed to step 524 where it can determine if a profile has been identified in step 512 to record the association(s) detected. If a profile has been identified, the associations are recorded/stored in the profile in step 526. If a profile has not been identified in step 512, the AMS application can create a profile in step 528 for recording the detected associations. In the same step, the user can name the newly created profile as desired. The newly created profile can also be associated with one or more gaming software applications in step 530 for future reference. The AMS application can also record in a profile in step 526 associations based on gaming venue states. In this embodiment the same stimuli generated by the gaming controller 115 can result in different substitutions based on the gaming venue state detected by the AMS application.

Referring back to step 526, once the associations have been recorded in a profile, the AMS application can determine in step 532 which of the accessories shown illustratively in FIGS. 1-3 are programmable and available for programming. If the AMS application detects that an accessory (e.g., keyboard 108, gaming controller 115) is communicatively coupled to the computing device 206 and determines that the accessory is capable of performing stimulus substitutions locally, the AMS application can proceed to step 534 of FIG. 5 where it submits the profile and its contents for storage in the accessory (e.g., the gaming controller 115 in FIGS. 2-3). Once the accessory (e.g., the gaming controller 115) is programmed with the profile, the accessory can perform stimuli substitutions according to the associations recorded by the AMS application in the profile. Alternatively, the AMS application can store the profile in the computing device 206 of FIGS. 2-3 and perform substitutions of stimuli supplied by the gaming controller 115 according to associations recorded in the profile by the AMS application.

The GUI 101 of FIG. 1 presented by the AMS application can have other functions. For example, the GUI 101 can present a layout of the accessory (button 122), how the accessory is illuminated when associations between input functions and actions are made (button 124), and configuration options for the accessory (button 126). The AMS application can adapt the GUI 101 to present more than one functional GUI page. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics from stimulation information and/or gaming action results captured by the AMS application as described in the subject disclosure. Selecting button 106 can also cause the AMS application to adapt the GUI 101 to present promotional offers and software updates.

The steps of method 500 in whole or in part can be repeated until a desirable pattern is achieved of associations between stimulus signals generated by accessories and substitute stimuli. It would be apparent to an artisan with ordinary skill in the art that there can be numerous other approaches to accomplish the embodiments described by method 500 or variants thereof. These undisclosed approaches are contemplated by the subject disclosure.

Figure 6:
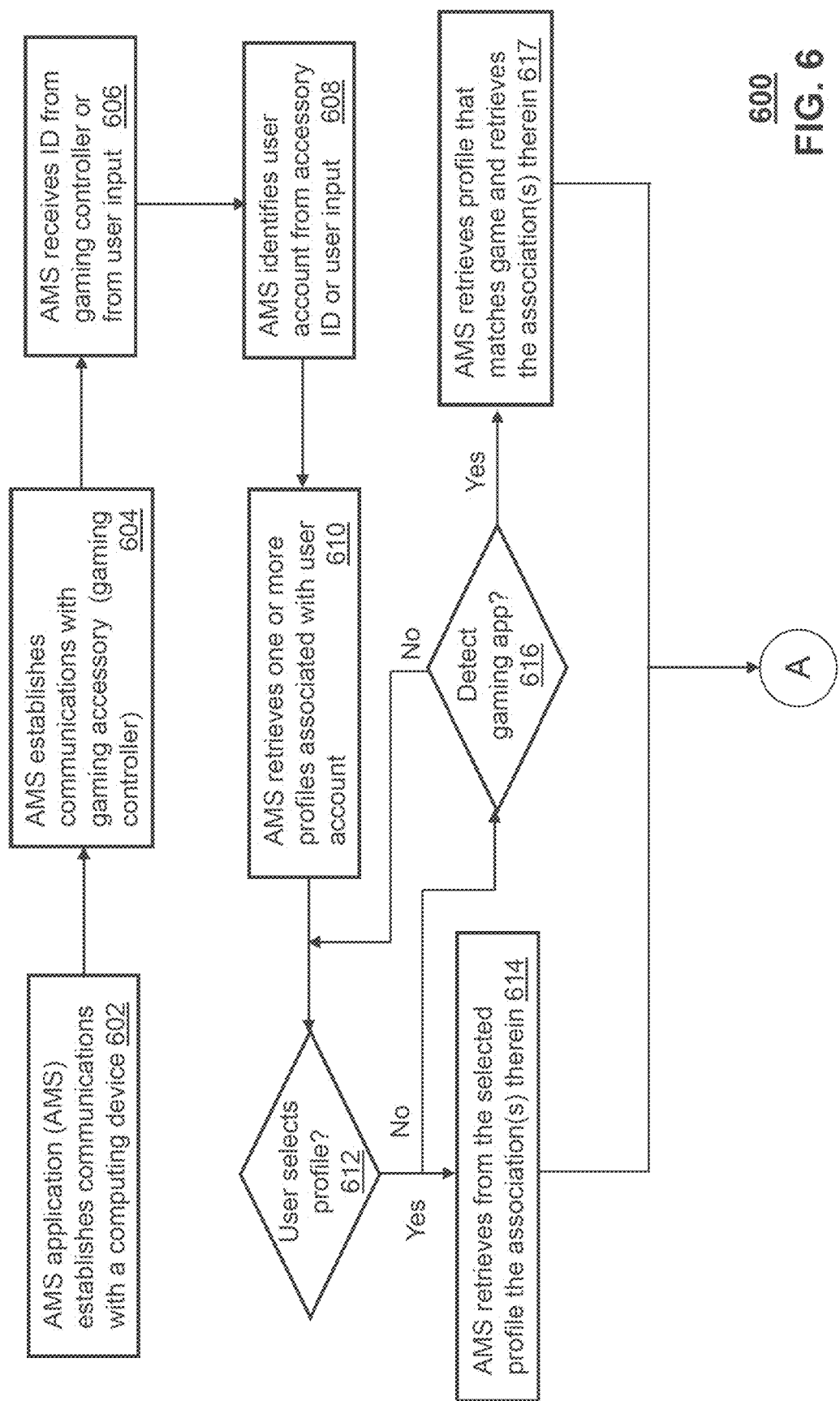
FIG. 6 depicts an illustrative embodiment of a second method utilized in the subject disclosure.

FIG. 6 depicts a method 600 for illustrating additional operations of the AMS application. In the configurations of FIGS. 2-3, the AMS application can be operating in whole or in part from the gaming controller 115, a gaming console 206, a computer 206, or a remote server (not shown). For illustration purposes, it is assumed the AMS application operates from the gaming console 206. Method 600 can begin with the AMS application establishing communications in steps 602 and 604 between the gaming console 206 and a gaming accessory such as the gaming controller 115, and a headset 114 such as shown in FIG. 1. These steps can represent for example a user starting the AMS application from the gaming console 206 and/or the user inserting at a USB port of the gaming console 206 a connector of a USB cable tethered to the gaming controller 115, which invokes the AMS application. In step 606, the gaming controller 115 and/or headset 114 can in turn provide the AMS application one or more accessory ID's, or the user can provide by way of a keyboard or the gaming controller 115 user identification. With the accessory ID's, or user input the AMS application can identify in step 608 a user account associated with the gaming controller 115 and/or headset 114. In step 610, the AMS application can retrieve one or more profiles associated with the user account.

In step 612, the user can be presented by way of a display coupled to the gaming console 206 profiles available to the user to choose from. If the user makes a selection, the AMS application proceeds to step 614 where it retrieves from the selected profiles the association(s) stored therein. If a selection is not made, the AMS application can proceed to step 616 where it can determine whether a software gaming application (e.g., video game) is operating from the gaming console 206 or whether the gaming console 206 is communicating with the software gaming application by way of a remote system communicatively coupled to the gaming console 206 (e.g., on-line gaming server(s) presenting, for example, World of Warcraft™). If a gaming software application is detected, the AMS application proceeds to step 617 where it retrieves a profile that matches the gaming application detected and the association(s) contained in the profile. As noted earlier, association(s) can represent accessory stimulations, navigation, speech, the invocation of other software applications, macros or other suitable associations that result in substitute stimulations. The accessory stimulations can be stimulations that are generated by the gaming controller 115, as well as stimulations from other accessories (e.g., headset 114), or combinations thereof.

Once a profile and its contents have been retrieved in either of steps 614 or step 617, the AMS application can proceed to step 719 of FIG. 7 where it monitors for a change in a gaming venue state based on the presentations made by the gaming application, or API messages supplied by the gaming application. At the start of a game, for example, the gaming venue state can be determined immediately depending on the gaming options chosen by the gamer. The AMS application can determine the gaming venue state by tracking the gaming options chosen by a gamer, receiving an API instruction from the gaming application, or by performing image processing on the video presentation generated by the gaming application. For example, the AMS application can detect that the gamer has directed an avatar to enter a tank.

The AMS application can retrieve in step 719 associations for the gaming controller 115 for controlling the tank.

The AMS application can process movements of the gaming controller 115 forwards, backwards, or sideways in two or three dimensions to control the tanks movement. Similarly, rotating the gaming controller 115 or tilting the gaming controller 115 forward can cause an accelerometer, gyro or magnetometer of the gaming controller 115 to provide navigational data to the AMS application which can be substituted with an action to cause the tank to turn and/or move forward. The profile retrieved by the AMS application can indicate that the greater the forward tilt of the gaming controller 115, the greater the speed of the tank should be moving forward. Similarly, a rear tilt can generate navigation data that is substituted with a reverse motion and/or deceleration of the forward motion to stop or slow down the tank. A three-dimensional lift of the mouse can cause the tank to steer according to the three-dimensional navigation data provided by the gaming controller 115. For example, navigation data associated with a combination of a forward tilt and right bank of the gaming controller 115 can be substituted by the AMS application to cause an increase in forward speed of the tank with a turn to the right determined by the AMS application according to a degree of banking of the gaming controller 115 to the right. In the above embodiment, the three-dimensional navigation data allows a gamer to control any directional vector of the tank including speed, direction, acceleration and deceleration.

In another illustration, the AMS application can detect a new gaming venue state as a result of the gamer directing the avatar to leave the tank and travel on foot. Once again, the AMS application retrieves in step 719 associations related to the gaming venue state. In this embodiment, selection of buttons of the gaming controller 115 can be associated by the AMS application with weaponry selection, firing, reloading and so on. The movement of the gaming controller 115 in two or three dimensions can control the direction of the avatar and/or selection or use of weaponry. Once the gaming venue state is detected in step 719, the AMS application retrieves the associations related to the venue state and can perform substitutions of stimuli generated by the gaming controller 115, and/or speech commands received by microphone of the headset 114.

In one embodiment, the AMS application can be configured in step 719 to retrieve a profile that provides substitute stimuli for replacing certain stimuli generated by accessories. The associations recorded in the profile can be venue independent. In another embodiment, the AMS application can retrieve a combination of profiles, where one or more profiles provide substitute stimuli that are venue dependent and one or more other profiles provide substitute stimuli that are venue independent.

The AMS application can monitor in step 720 stimulations generated by the accessories coupled to the gaming console 206. The stimulations can be generated by the gamer manipulating the gaming controller 115, and/or by generating speech commands detected by a microphone of the headset 114. If a stimulation is detected at step 720, the AMS application can determine in step 722 whether to forward the detected stimulation(s) to an Operating System (OS) of the gaming console 206 or the gaming application directly without substitutions. This determination can be made by comparing the detected stimulation(s) to corresponding associations in one or more profiles retrieved by the AMS application. If the detected stimulation(s) match the associations, then the AMS application proceeds to step 740 where it retrieves substitute stimulation(s) in the profile(s).

In step 742, the AMS application can substitute the detected stimulation(s) with the substitute stimulations in the profile(s).

In one embodiment, the AMS application can track in step 744 the substitute stimulations by updating the stimulations with a unique identifier such as a globally unique identifier (GUID). In this embodiment, the AMS application can also add a time stamp to each substitute stimulation to track when the substitution was performed. In another embodiment, the AMS application can track each substitute stimulation according to its order of submission to the gaming application. For instance, sequence numbers can be generated for the substitute stimulations to track the order in which they were submitted to the gaming application. In this embodiment, the substitute stimulations do not need to be updated with sequence numbers or identifiers so long as the order of gaming action results submitted by the gaming application to the AMS application remain in the same order as the substitute stimulations were originally submitted.

For example, if a first stimulation sent to the gaming application by the AMS application is a command to shoot, and a second stimulation sent to the gaming application is a command to shoot again, then so long as the gaming application provides a first game action result for the first shot, followed by a game action result for the second shot, then the substitute stimulations will not require updating with sequence numbers since the game action results are reported in the order that the stimulations were sent. If on the other hand, the game action results can be submitted out of order, then updating the stimulations with sequence numbers or another suitable identifier would be required to enable the AMS application to properly track and correlate stimulations and corresponding gaming action results.

Referring back to step 722, if the detected stimulation(s) do not match an association in the profile(s), then the AMS application proceeds to one of steps 744 or 746 in order to track the stimulations of the accessory as described above. In another embodiment, tracking of original stimulations or substitute stimulations can be bypassed by skipping steps 744 or 746 and proceeding to step 770 of FIG. 7B.

Figure 7A:
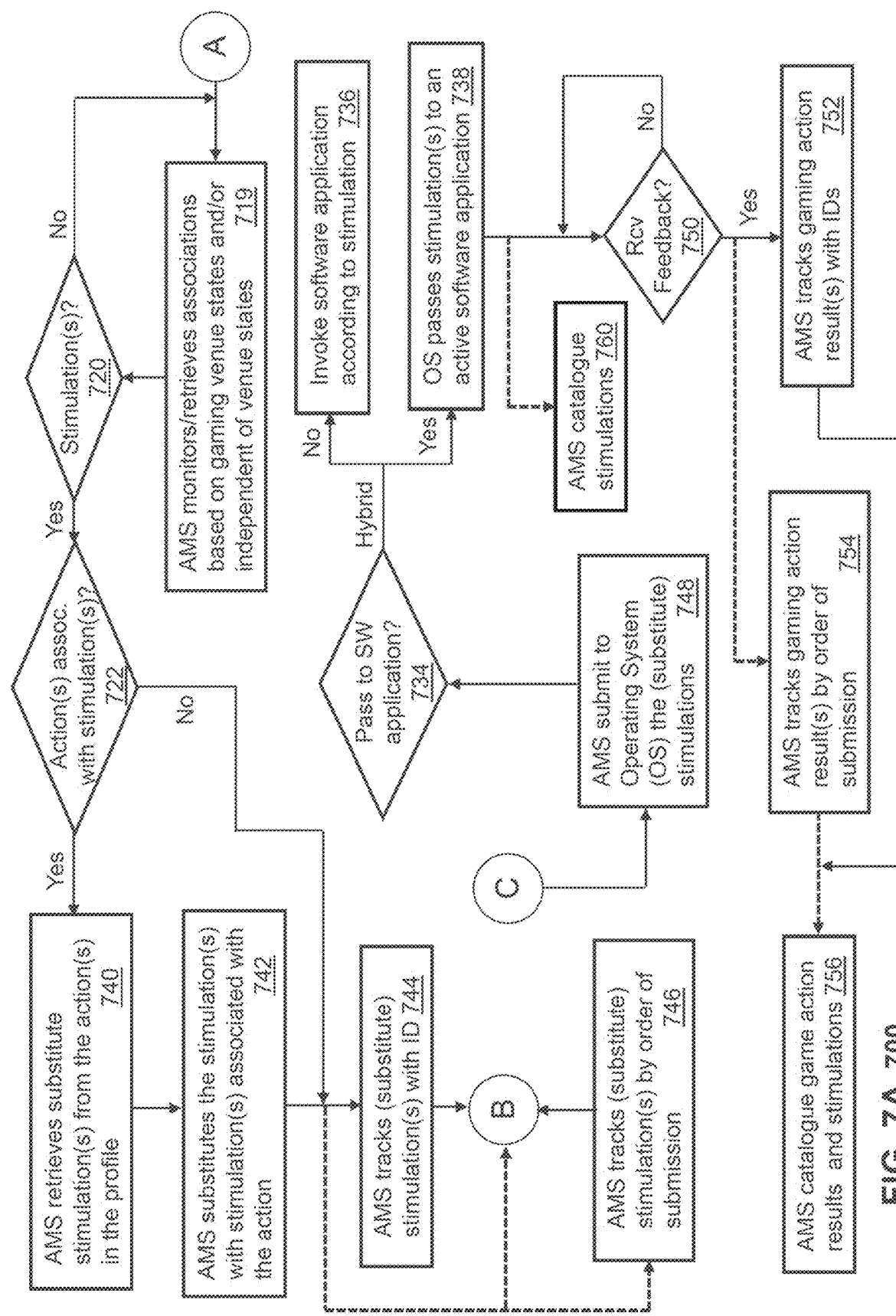
FIG. 7A depicts an illustrative embodiment of a third method utilized in the subject disclosure.
Figure 7B:
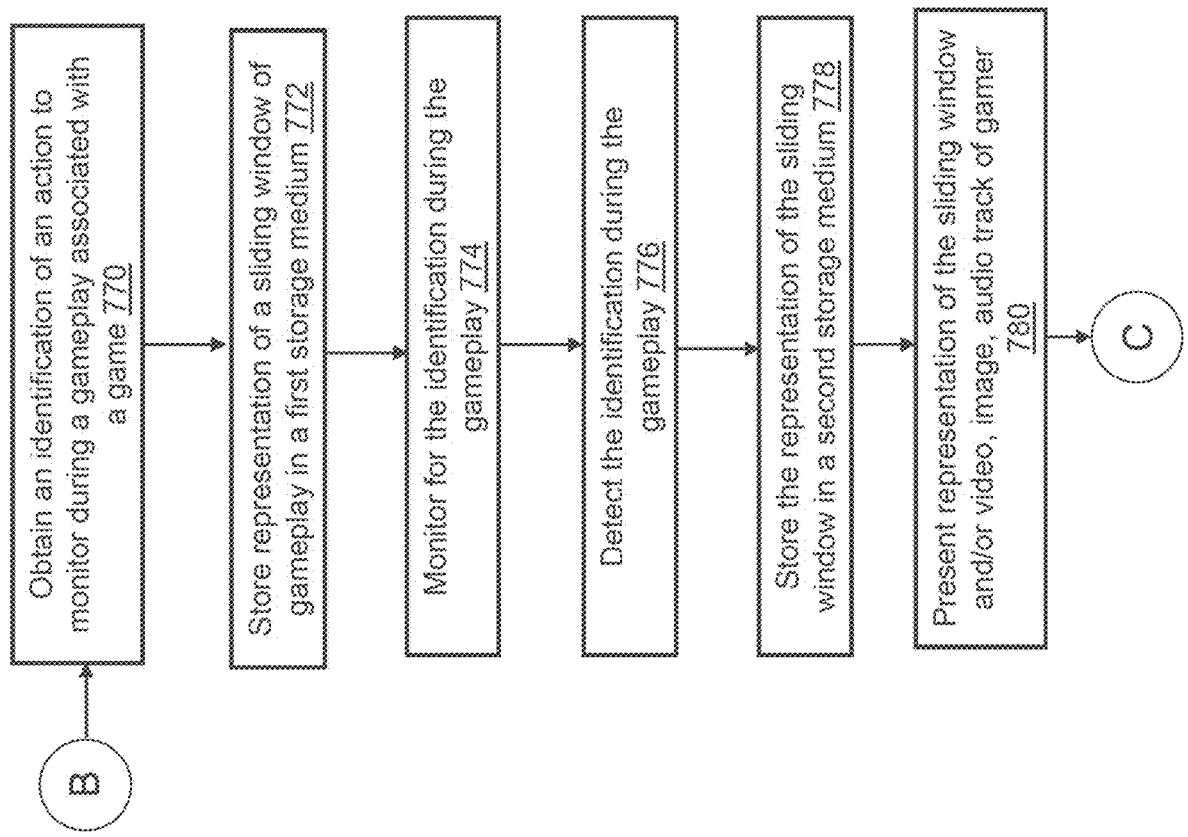
FIG. 7B depicts an illustrative embodiment of a fourth method utilized in the subject disclosure.

Once the stimulations received in step 720 have been substituted with other stimulations at step 742 responsive to a detected association or maintained unchanged responsive to detecting no association with substitute stimuli, and (optionally) the AMS application has chosen a proper tracking methodology for correlating gaming action results with stimulations, the AMS application can proceed to step 770 of FIG. 7B. Referring to FIG. 7B, at step 770, the AMS application can obtain an identification of an action to monitor during a gameplay associated with a game. The identification of the action may include a specification of a sound volume level associated with a user (e.g., a gamer). The identification of the action may include a specification of a number of user inputs exceeding a threshold. The number of user inputs may include a number of messages that are submitted, an identification of a content of the messages, an identification of an emoji, or a combination thereof. The identification of an action may include a gaming action provided by the game— see FIGS. 8-9 and accompanying descriptions.

Figure 12:
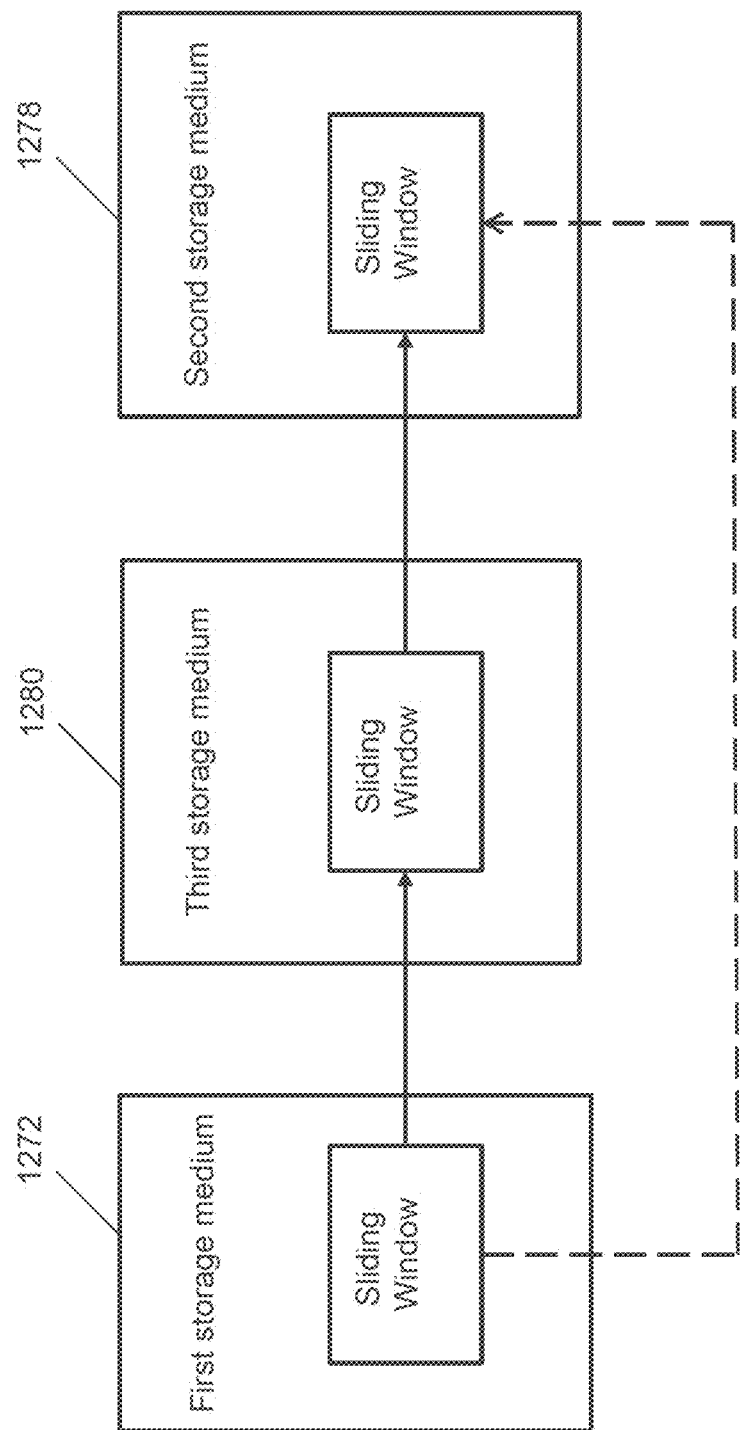
FIG. 12 depicts the storage media for storing a representation of a sliding window in accordance with aspects of this disclosure.

At step 772, the AMS application can store a representation of a sliding window of the gameplay in a first storage medium (e.g., first storage medium 1272 of FIG. 12). The storage of step 772 may occur in real-time during the gameplay. The representation of the sliding window of the gameplay may include a video, an image, an audio track, or a combination thereof. The first storage medium may include a buffer of a graphics card, a random-access memory, or a combination thereof.

Figure 11:
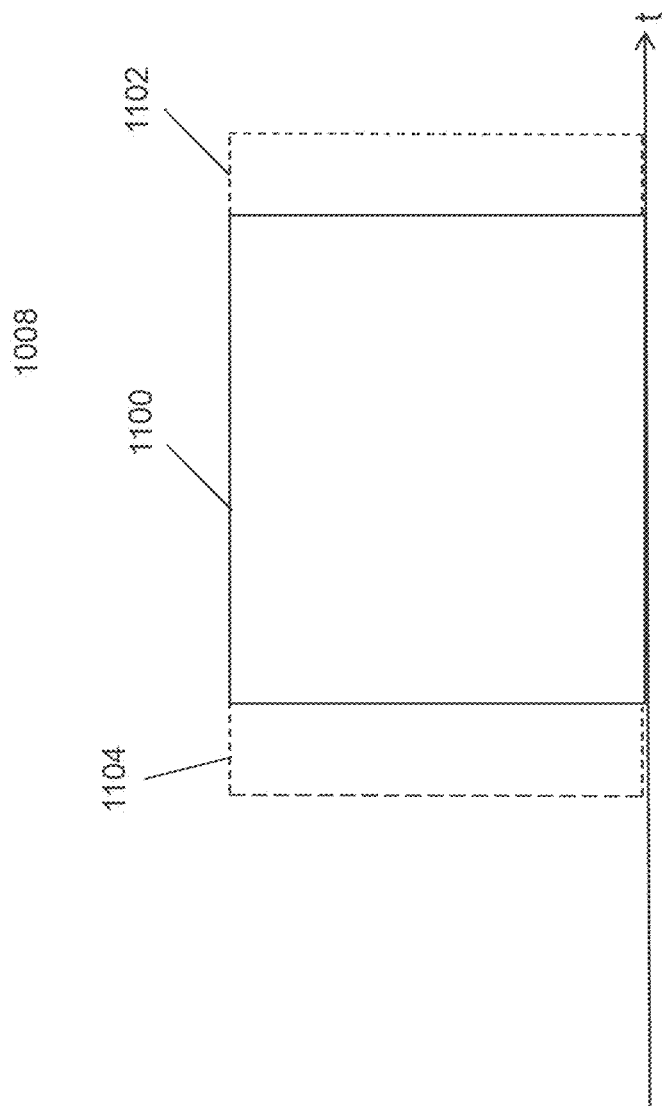
FIG. 11 depicts an illustrative diagrammatic representation of a sliding window in accordance with aspects of this disclosure.

The sliding window may be of a substantially fixed duration, such that the sliding window progresses as the user/gamer continues to play a game. For example, and briefly referring to FIG. 11, a sliding window 1100 (as a function of time t) is shown. As gameplay progresses, a new/supplemental representation of the gameplay may be added as shown via reference character/dashed portion 1102. In order to accommodate storage of the portion 1102, another portion 1104 may be deleted/overwritten. In the embodiment shown in FIG. 11, the portion 1104 to be deleted/overwritten corresponds to the oldest/earliest-in-time portion of the window 1100. In some embodiments, a portion other than, or in addition to, the oldest portion may be identified for being deleted/overwritten. Still further, in some embodiments the sliding window 1100 may be of a variable duration. For example, the duration/length of the sliding window may be a function of network traffic, a capability of a device (e.g., storage capacity), user/gamer inputs, etc.

Referring back to FIG. 7B, at step 774, the AMS application can monitor for the identification of the action during the gameplay.

At step 776, the AMS application can detect the identification during the gameplay responsive to the monitoring. In some embodiments, whether an event has occurred or not, as reflected by the detection of step 776, may be based on a comparison of game action with one or more thresholds. Such thresholds may be specified by users/gamers (e.g., in accordance with user inputs/preferences), may be predetermined based on one or more rules/configurations associated with a game, etc.

At step 778, the AMS application can store at least a portion of the representation of the sliding window of the gameplay in a second storage medium. The second storage medium may be the same as, or different from, the first storage medium. The second storage medium may include a server associated with a social media platform, a server associated with a virtual machine, a memory contained within a common housing as the first storage medium, a network element (e.g., a router, a gateway, a switch, etc.), or a combination thereof.

The storing of step 778 may include storing a video of a gamer, an image of the gamer (e.g., a thumbnail or icon representation of the gamer), an audio track of the gamer, or a combination thereof.

The storing of step 778 may include presenting a prompt (potentially responsive to the monitoring of step 774), placing a copy of the representation of the sliding window of the gameplay in a third storage medium, which may be different from the first storage medium and/or the second storage medium, receiving a user input in response to the prompt, and storing the copy in the second storage medium responsive to the user input.

The placement of the representation/copy of the sliding window of the gameplay in the third storage medium may free/alleviate the first storage medium, such that the first storage medium can continue capturing gameplay/action as the gameplay continues subsequent to the detection of step 776. Also, the placement of the representation/copy of the sliding window of the gameplay in the third storage medium may free the user/gamer of not having to commit to placing the representation/copy of the sliding window of the gameplay into more permanent storage (e.g., the second storage medium). For example, placement in the third storage medium may facilitate editing or review operations of the representation/copy of the sliding window prior to uploading the same to the second storage medium.

In some embodiments, the placing of the copy of the representation of the sliding window of the gameplay in the third storage medium may include initiating a timer to store a second sliding window of the representation after detecting the action, thereby resulting in an updated representation of the sliding window of the gameplay. Responsive to detecting an expiration of the timer, the updated representation may be stored in the third storage medium. A length of the timer may be based on a user input.

In some embodiments, the storing of step 778 may include storing a new representation of the sliding window of the gameplay in the first storage medium during the gameplay after placing the copy in the third storage medium; in some embodiments, the storage of the new representation may coincide with a step that is separate from step 778.

At step 780, the AMS application may present (e.g., simultaneously present) the representation of the sliding window and/or the video, image, and/or audio track of the gamer, or a combination thereof. In some embodiments, a user/gamer may generate media that may be shared on one or more platforms (e.g., social media platforms) as a game is occurring, where the media may include the representation of the sliding window and/or the video, image, and/or audio track of the gamer, or a combination thereof. Alternatively, the user/gamer may generate the media following the conclusion of the game in order to avoid distractions during the game.

One or more of the steps shown in conjunction with FIG. 7B may be executed more than once. For example, subsequent to storing the representation of the sliding window of the gameplay in the second storage medium as part of step 778, a second representation of the sliding window of the gameplay may be stored in the first storage medium (as part of a second execution of step 772). The storing of the second representation of the sliding window of the gameplay may overwrite at least a portion of the representation of the sliding window of the gameplay in the first storage medium as described above.

Figure 7C:
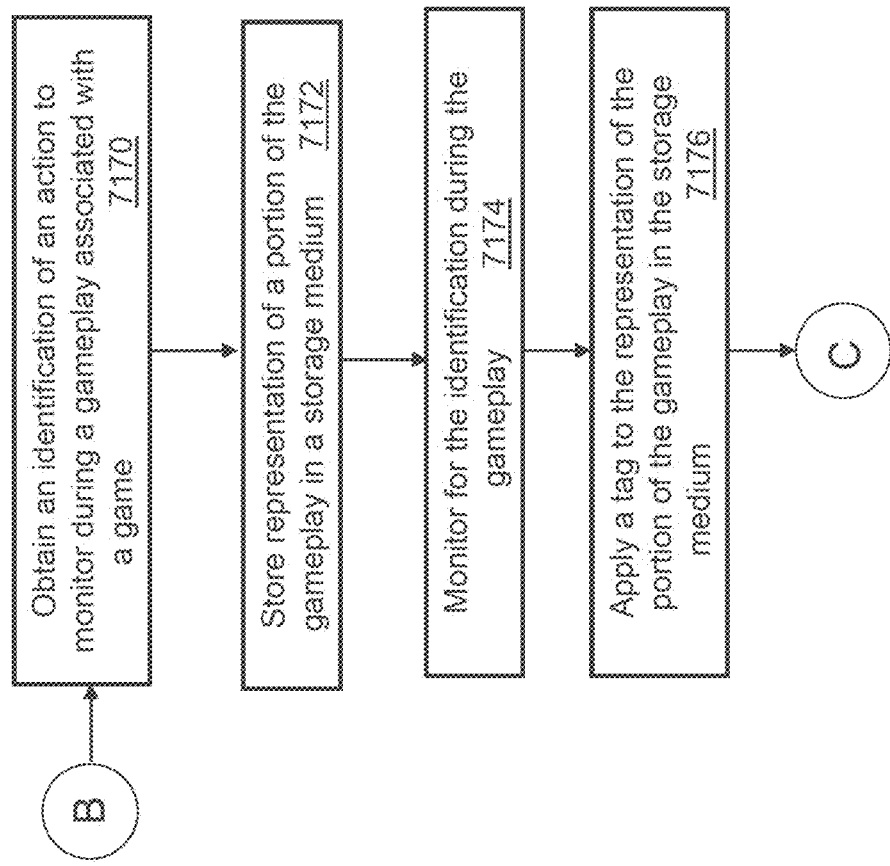
FIG. 7C depicts an illustrative embodiment of a fifth method utilized in the subject disclosure.

FIG. 7C illustrates another embodiment of a method that may be executed in conjunction with the flow shown in FIG. 7A. As shown in FIG. 7C, in step 7170 the AMS application can obtain an identification of an action to monitor during a gameplay associated with a game. The identification of the action may include a specification of a number of actions per unit time.

In step 7172, the AMS application can store a representation of a portion of the gameplay in a storage medium.

In step 7174, the AMS application can monitor the gameplay for the identification of the action.

In step 7176, the AMS application can apply a tag to the representation of the portion of the gameplay in the storage medium responsive to the monitoring.

The representation of the portion of the gameplay may include a first video clip that occurs prior to an occurrence of the action and a second video clip that occurs subsequent to the action. A first-time duration of the first video clip, a first resolution of the first video clip, a second time duration of the second video clip, and a second resolution of the second video clip may be based on one or more user preferences, network traffic, a device capability, etc.

The representation of the portion of the gameplay may include a video clip. The tag may include a watermark that is applied to the video clip. The watermark may include the identification of the action. The tag may include metadata that is associated with the video clip. The metadata may be searchable via a search engine. The metadata may include a selectable link that, when selected, causes a client device to obtain the video clip.

Figure 7D:
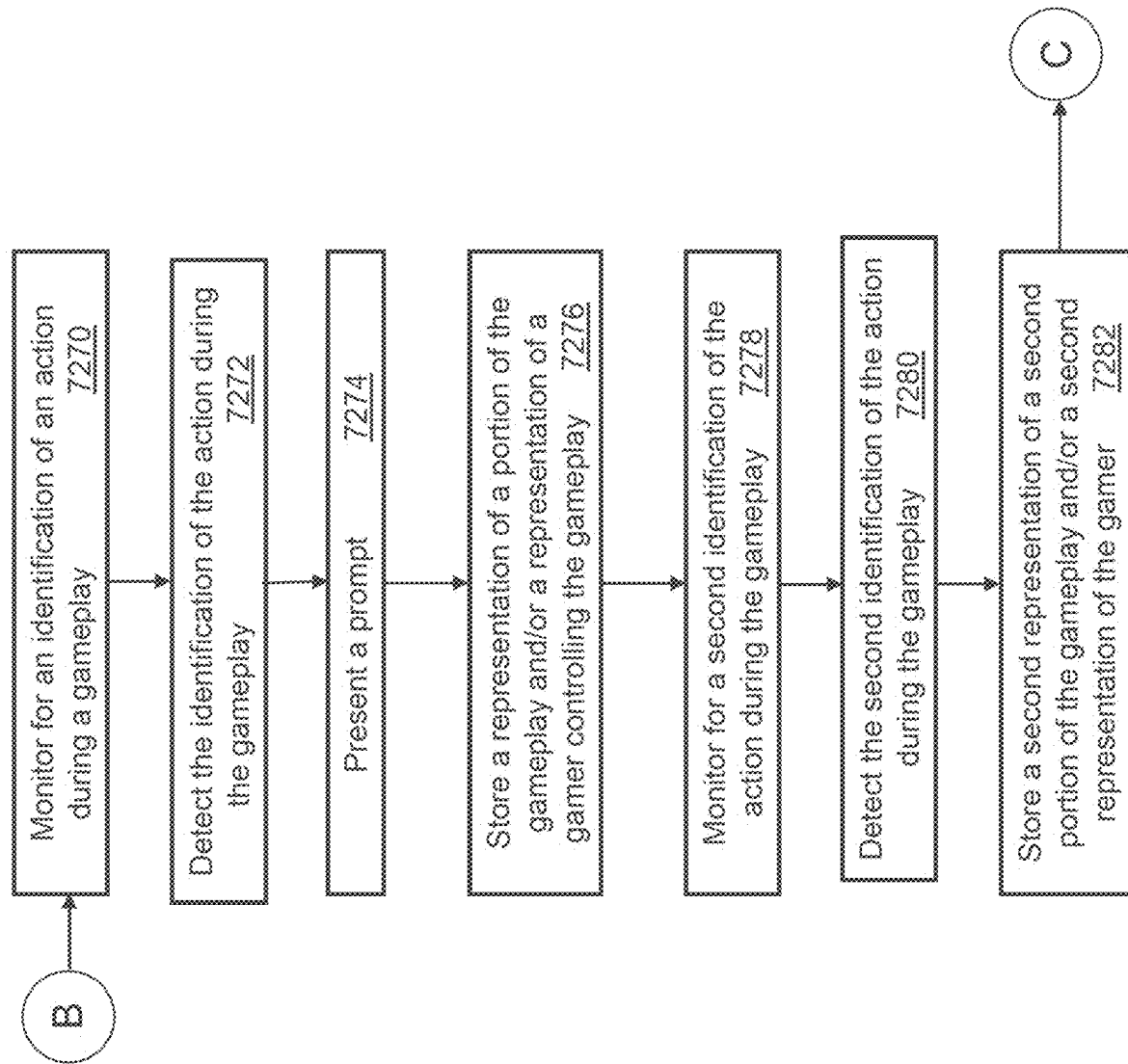
FIG. 7D depicts an illustrative embodiment of a sixth method utilized in the subject disclosure.

FIG. 7D illustrates another embodiment of a method that may be executed in conjunction with the flow shown in FIG. 7A. As shown in FIG. 7D, in step 7270 the AMS application can monitor for an identification of an action during a gameplay.

In step 7272, the AMS application can detect the identification of the action during the gameplay responsive to the monitoring.

In step 7274, the AMS application can present a prompt responsive to the detecting.

In step 7276, the AMS application can store a representation of a portion of the gameplay, a representation of a gamer controlling the gameplay, or a combination thereof, in a storage medium according to a user-generated input associated with the prompt.

In some embodiments, machine-learning/artificial intelligence may be applied to identify portions of a gameplay that are memorable or are of interest to a user (e.g., a gamer). For example, responsive to the user-generated input associated with the prompt in step 7276, the AMS application can monitor for a second identification of the action (or an alternative action) in step 7278.

In step 7280, the AMS application can detect the second identification of the action (or the alternative action) during the gameplay responsive to the monitoring for the second identification.

In step 7282, the AMS application can store a second representation of a second portion of the gameplay, a second representation of the gamer, or a combination thereof, in the storage medium without presenting a second prompt.

Once the AMS application at step 748 supplies to the OS of the computing device 206 a gaming action (i.e., one or more stimulations) from the method of FIG. 7B, the method of FIG. 7C, the method of FIG. 7D, or a combination thereof, the AMS application can proceed to step 734. The gaming action supplied to the OS at step 748 can be the unadulterated "original" gaming action of step 720, or an alternative gaming action generated by steps 744 or 746. At step 734, the OS determines whether to invoke in step 736 a software application identified in the stimulation(s) (e.g., gamer says "turn on team chat", which invokes a chat application), whether to forward the received stimulation(s) to the gaming software application in step 738, or combinations thereof.

Contemporaneous to the embodiments described above, the AMS application can monitor in step 750 for game action results supplied by the gaming application via API messages previously described. For instance, suppose the stimulation sent to the gaming application in step 738 is a command to shoot a pistol. The gaming application can determine that the shot fired resulted in a miss of a target or a hit. The gaming application can respond with a message which is submitted by way of the API to the AMS application that indicates the shot fired resulted in a miss or a hit. If IDs such as GUIDs were sent with each stimulation, the gaming application can submit game action results with their corresponding GUID to enable the AMS application to correlate the gaming action results with stimulations having the same GUID.

For example, if the command to shoot included the ID "1234", then the game action result indicating a miss will include the ID "1234", enabling the AMS application in step 752 to correlate the game action result to the stimulation having the same ID. If on other hand, the order of game action results can be maintained consistent with the order of the stimulations, then the AMS application can correlate in step 754 stimulations with game action results by the order in which stimulation were submitted and the order in which game action results are received. In step 756, the AMS application can catalogue stimulations and game action results. In another embodiment, the AMS application can be adapted to catalogue the stimulations in step 760. In this embodiment, step 760 can be performed as an alternative to steps 750 through 756. In another embodiment, step 760 can be performed in combination with steps 750 through 756 in order to generate a catalogue of stimulations, and a catalogue for gaming action results correlated to the stimulations.

Figure 7E:
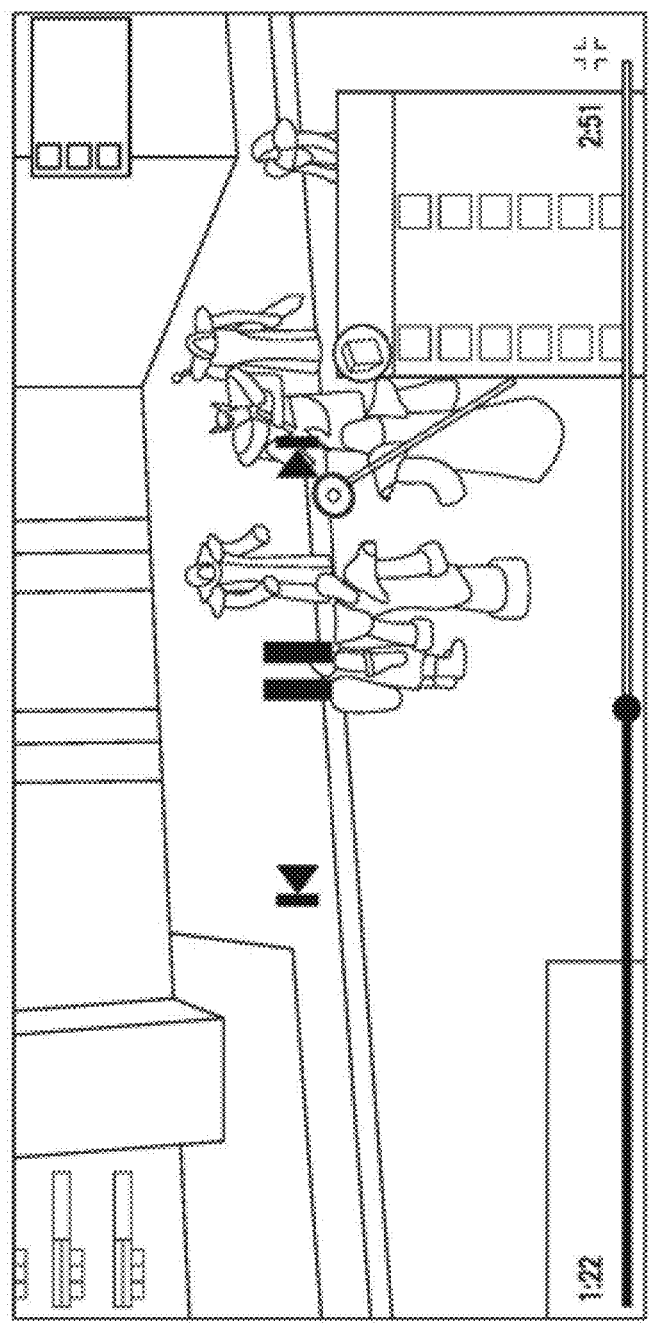
FIGS. 7E-7G depict illustrative embodiments of interfaces associated with a gameplay of a game.

FIG. 7E illustrates an interface that may be used to present at least a portion of a gameplay associated with a game. Various controls/commands, such as for example VCR types/styles of controls/commands, may be presented as a part of the interface to facilitate a recording or capture of one or more portions of the gameplay.

Figure 7F:
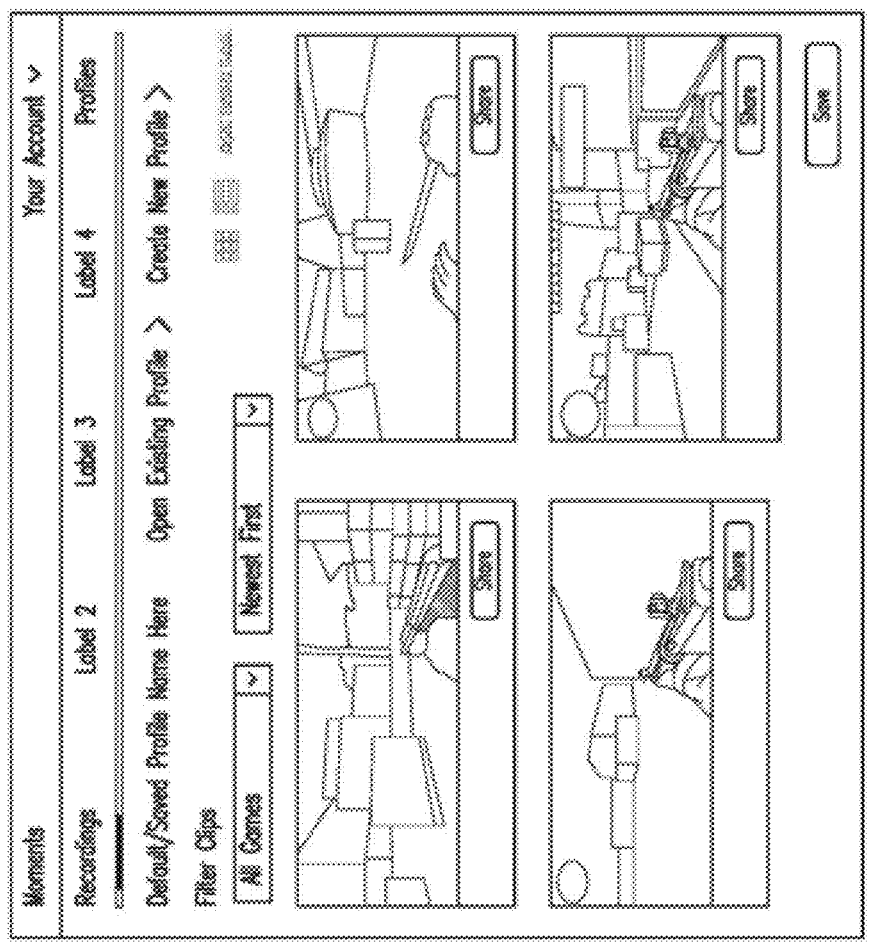

FIG. 7F illustrates an interface that may provide control over a recording or sharing of one or more representations (e.g., clips) of a gameplay associated with a game. Various controls, such as for example a "share" button or the like, may be provided to enable a user (e.g., a gamer) to post or otherwise share the representation(s). In some embodiments, editing controls may be provided to allow the user to customize the representation prior to, or subsequent to, sharing the representation.

In some embodiments, a user/gamer may have an ability to supplement the representation of the gameplay with commentary that describes, for example, what the user's thought process was during the captured/represented portion of the gameplay. In this respect, and assuming that the user/gamer is viewed or otherwise characterized as an expert in the game, a sharing of the representation of the gameplay may serve as a tutorial for novice users.

Figure 7G:
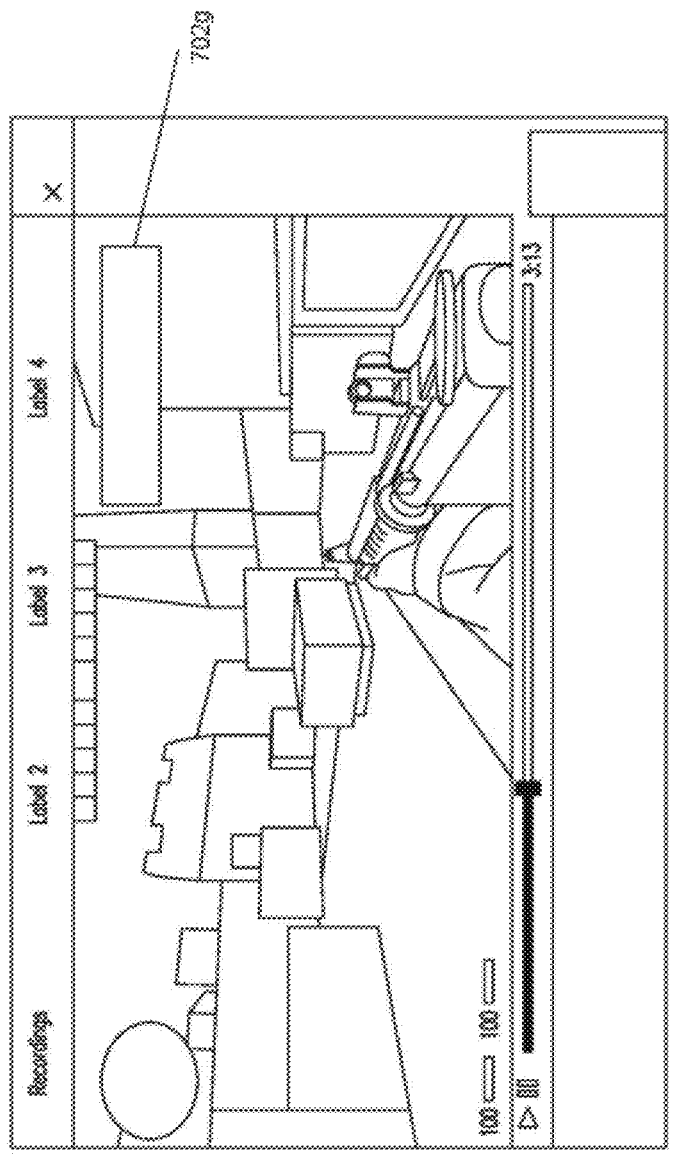

FIG. 7G illustrates an interface that may present a tag 702g (e.g., a watermark and/or metadata) associated with a representation of a gameplay. The tag 702g may include data acquired/obtained during the gameplay, such as for example a statement or other indication of results obtained by the gamer during the gameplay. Such a statement or other indication may be received via, e.g., a microphone, a keyboard, a mobile device, a computing/gaming console, etc.

The methods described herein (e.g., the methods described above in conjunction with FIGS. 7A-7D) may incorporate additional aspects. For example, in some embodiments a clip may be generated based on a user defined keybind (on a keyboard, mouse, or controller). Keybinds to trigger the clipping of a buffer to save to a local file system may be customized (e.g., may be based on user preferences). The gamer will be able to choose: the actual key to bind to the action, and the time slice to save (N seconds before and N' seconds after).

In some embodiments, clips may be auto-generated based on some event, such as for example a detected event, an audible input (e.g., screaming), messages associated with a chat client, etc. In some embodiments, default settings may be provided, and those settings may be at least partially overridden/replaced based on affirmative user inputs and/or based on artificial intelligence/machine-learned user preferences.

In some embodiments, one or more filtering techniques may be applied to remove content from a representation of a gameplay that is not of interest. Such filtering may be based on one or more user inputs/preferences, may be learned over time via machine learning/artificial intelligence, etc. If multiple events/actions that are being monitored for happen within a threshold amount of time (which may coincide with a buffer time), an event/action endpoint may be extended to create one long time slice/representation of the gameplay. Alternatively, separate representations may be generated in some embodiments.

In some embodiments, tagging (e.g., watermarking) may be overlaid on a representation (e.g., a video) of a gameplay. A watermark may have a given level of transparency associated with it to avoid obscuring/blocking the representation of the gameplay. One or more logos may be applied as part of the tagging. In some embodiments, a watermark may pulsate or otherwise fade in-and-out. In this respect, dynamic watermarks may be used. The use of a dynamic watermark may serve to draw additional additional/incremental attention to the watermark, which may be useful for promotional/marketing/branding purposes Aspects of sharing the representation of the gameplay may be controlled via one or more control parameters. Such control parameters may condition the sharing on a size of the representation (e.g., a video length), the content of the representation (e.g., controls may be present to limit a dissemination of the representation in view of intellectual property rights or other rights), etc. In some embodiments, a sharing of the representation of the gameplay may be limited to users that the gamer (or other entity) authorizes. For example, the sharing may be based on identifying a contact (e.g., a friend) of the gamer in one or more applications (e.g., a phone application, an email application, a text message application, a social media application, etc.).

In some embodiments, audio from the game can be monitored and analyzed on-the-fly or nearly instantaneously to generate game events. In addition, sounds that occur during a game can be analyzed to generate notices to one or more game participants; these notices can include live clips of the gameplay (sometimes referred to as moment clips), and/or statistics related to one or more players' performance, equipment, health status, etc.

Figure 7H:
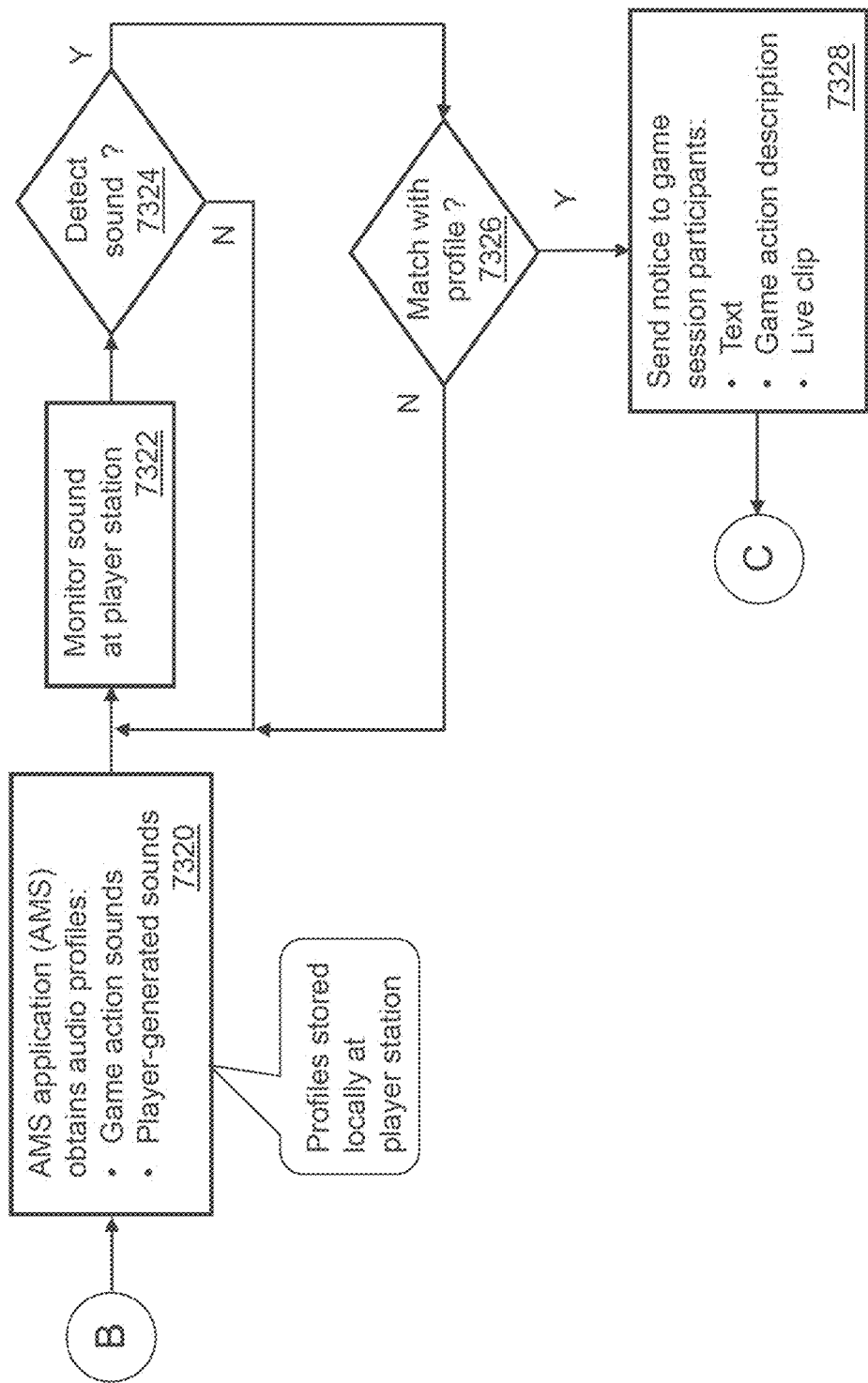
FIG. 7H depicts an illustrative embodiment of a method for automatic triggering of a notification to one or more gameplayers based on a detected sound, in accordance with aspects of the subject disclosure.

Referring to FIG. 7H, at step 7320, the AMS application can obtain one or more audio profiles (e.g. spectral profiles) of sounds that may be received from a gaming software application at a player's station during a gameplay associated with a game. The sounds may correspond to game action (for example, machine-gun fire, explosives detonating, etc.) or be generated by the player (for example, the player saying specific words during a game session). Game action sounds can be based on the player's actions (for example, the player shooting) or on another player's actions (for example, the other player detonating an explosive). In an embodiment, the audio profiles are stored locally at the player's station. In other embodiments, the audio profiles can be stored on a server or gaming console executing the gaming software application associated with the game.

The AMS application monitors sounds generated at the player's station (step 7322). In an embodiment, the AMS application can distinguish between sounds emitted by the gaming software application and presented audibly by the player's station and sounds produced in the environment of the player. (For example, in player station or equipment 7411 of FIG. 7J, if a sound 7419 detected via microphone 7414 has a similar profile and is in large part contemporaneous with a sound 7418 emitted from speaker 7413, the sound is understood as a game sound; otherwise, a player environment sound, which can be a sound produced by the player.) In a particular embodiment, the player station includes a spectral filter that can be tuned to detect player environment sounds with known characteristics.

When a sound is detected (step 7324), its spectral profile is analyzed and compared with the audio profiles. In an embodiment, the monitoring can include a comparison to determine a correlation; the correlation can be based on a threshold of similarity of characteristics of the detected sound to characteristics of a reference sound in the audio profiles. If the profile of the detected sound matches a stored profile (step 7326), a gaming event can be identified (e.g., explosion detected). In an embodiment, the gaming event can be distributed as a notice corresponding to the detected sound that is distributed to other participants in the game session (step 7328). In additional embodiments, the gaming event can trigger detection of an image on the display 7415 of the player station to further analyze the significance of the gaming event and generate further information that may be useful to other players (e.g., explosion detected, but health of player near explosion has not been affected). Such enhanced information can be conveyed in the notice to other players. In further embodiments, the notice can be triggered on detection of a displayed image and/or a game-produced sound, in combination with a player's speech, which can be conveyed with the notice. In other embodiments, the AMS the gaming event can cause the AMS to generate a gaming action that can be sent to the game and/or the players (e.g., initiate shield protection for affected player, send message to teammates that player's shield has been initiated due to an explosion). The gaming action can be pre-stored and associated with the detected sound and/or image recognition at the time of the sound via the AMS application interface 100 of FIG. 1.

The notice referred to early can take several forms, in accordance with embodiments of the disclosure. The AMS application can send a text message such as "Player A taking fire" or "Bomb detonated at Player A." In an embodiment, this message can be shown on the display of the player station, superimposed on the gaming video being presented; in another embodiment, the message can be sent to a different player device. The AMS application can also analyze the current state of the game action as seen by the player, and provide additional information (e.g., statistics) regarding the game action associated with the detected sound; for example, "Bomb detonated near player A, player A's health has diminished by x, bomb type is b, player A is engaged with n opponents."

In additional embodiments, the gaming event detected by sound (or combination of sound and imaging) can trigger a recording of a video clip before and after the gaming event as described in the embodiments of FIGS. 7A-7G. The notice can be included in the video clip representing the gameplay occurring at the player's station at the time the sound is detected (that is, a live clip with respect to the detected sound). In some embodiments, the live clip is automatically generated when the sound is detected. The AMS application can distribute the live clip as part of the notice (for example, text "bomb near player A" superimposed on the live clip). In an embodiment, the AMS application generates the text notice by performing image processing of the live clip.

The notice can also include a sequence of two or more video clips (for example, a live clip combined with a clip of game action from 30 seconds earlier). In an embodiment, the triggering sound and/or image is analyzed to determine which video clips are to be combined and distributed to other participants.

In a further embodiment, the AMS application shares the player's live clip (and/or additional clips in a sequence) with another player upon request by that player. Alternatively, the AMS application can select one or more other players for sharing the video clip(s), based on analysis of the triggering sound (or combination of sound/image/speech) and statistics regarding the player and other players. For example, a sound can trigger analysis of the player's health status, equipment status (e.g. remaining ammunition) and location, correlated with corresponding data regarding other players; the notice can then be sent to the closest player having resources that can be shared.

In an additional embodiment, the AMS application can analyze the game action shown in the live clip together with recent movements by the player's avatar, and provide recommendations associated with the detected gaming action (for example, "Run east 100 yards").

Figure 7I:
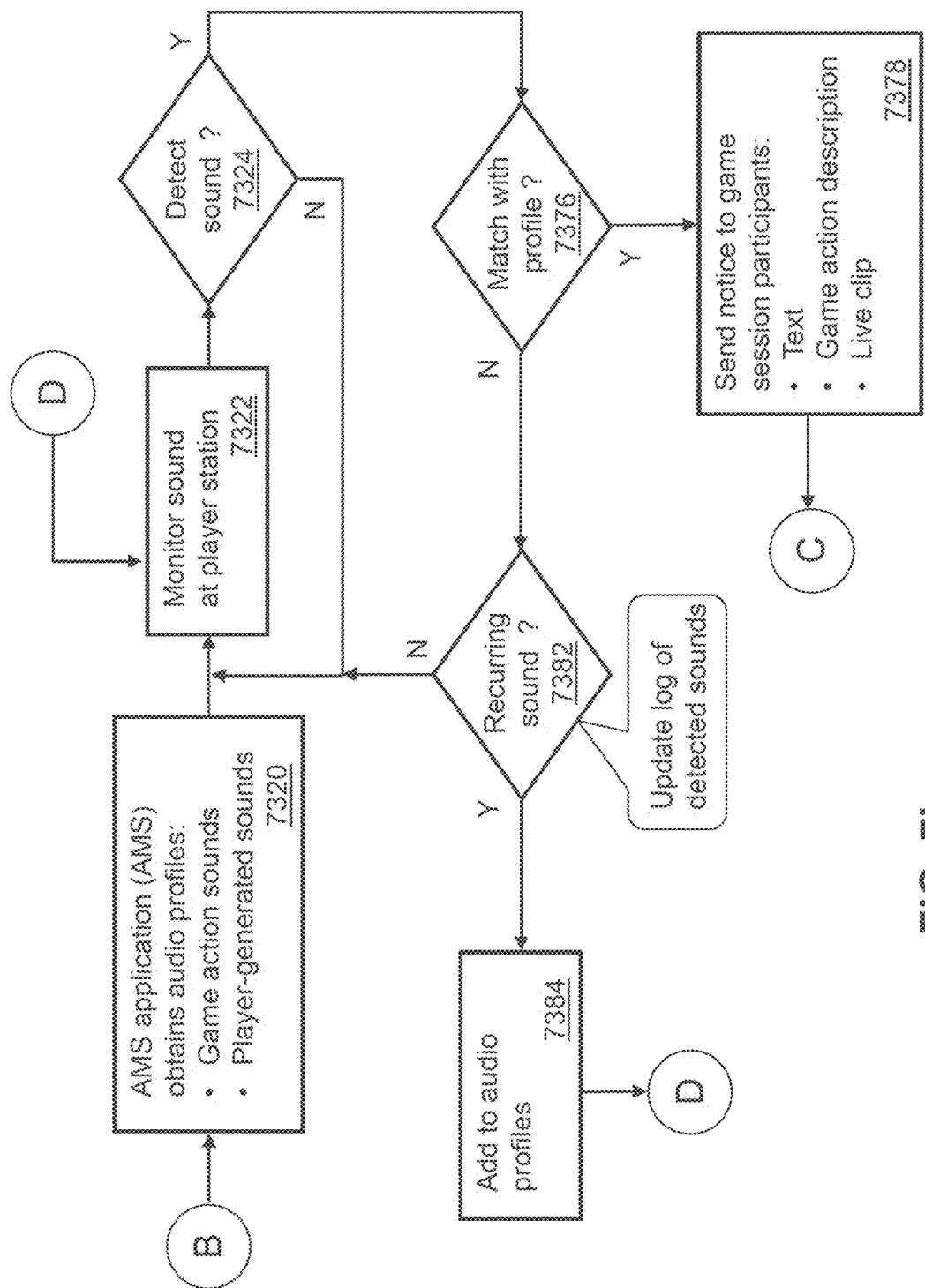
FIG. 7I depicts an illustrative embodiment of an additional method for automatic triggering of a notification to one or more gameplayers based on a detected sound, in accordance with aspects of the subject disclosure.

Referring to FIG. 7I, the AMS application can maintain a log of sounds detected during a game session. If a detected sound does not have a profile matching the stored audio profiles (step 7376/N) but has recurred during the game session (step 7382/Y), the AMS application can add the profile for that sound to the stored audio profiles (step 7384). In an embodiment, the recurring sound has its profile added after it has been detected a prescribed number of times. The AMS application can analyze the clips corresponding to the recurring sound to identify the sound, so that the profile of the sound can be stored with a text label identifying the sound.

Figure 7J:
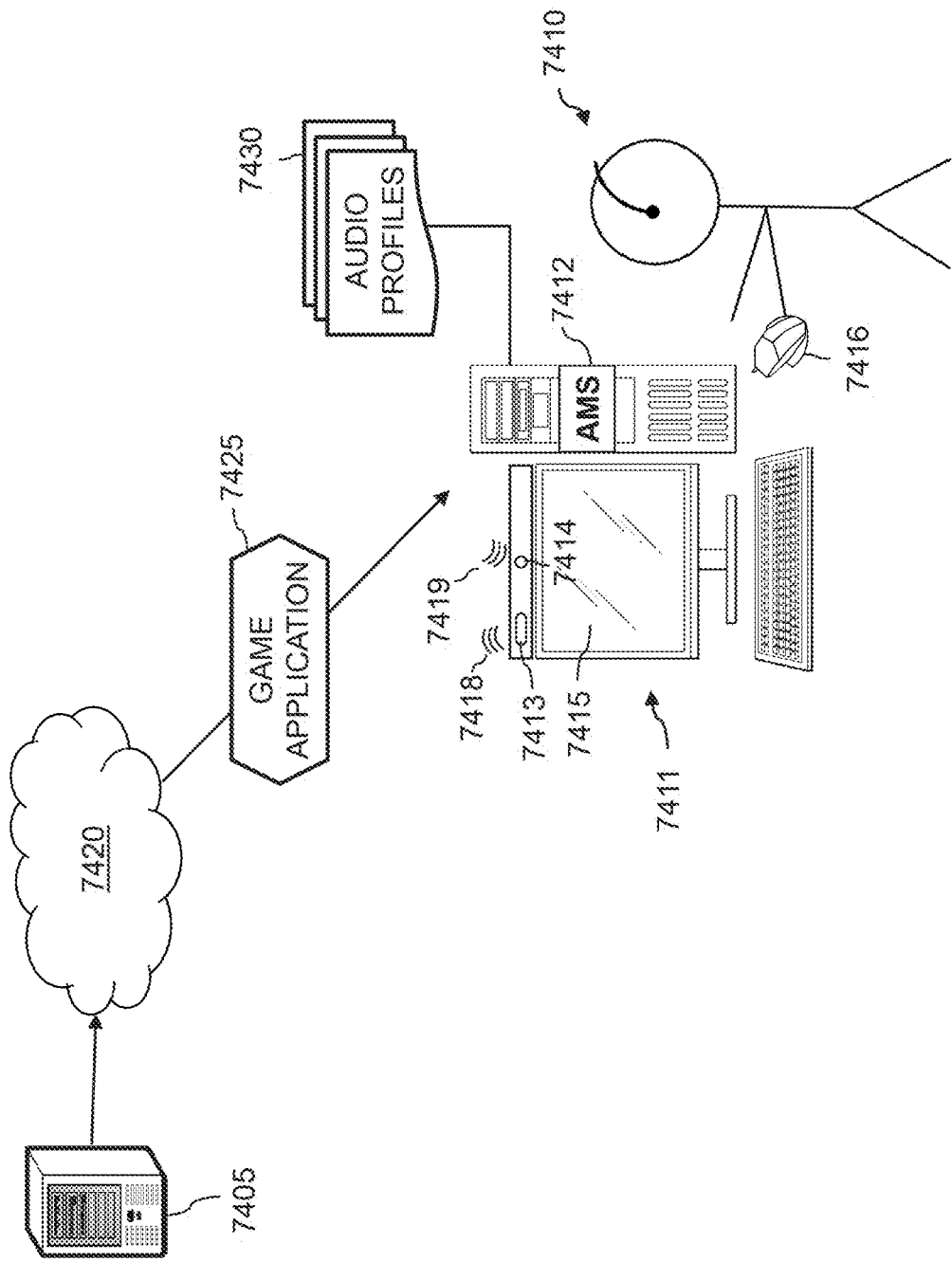
FIGS. 7J and 7K schematically illustrate a system operating at least in part according to the methods of FIGS. 5, 6, 7A-7C and 7H-7I.
Figure 7K:
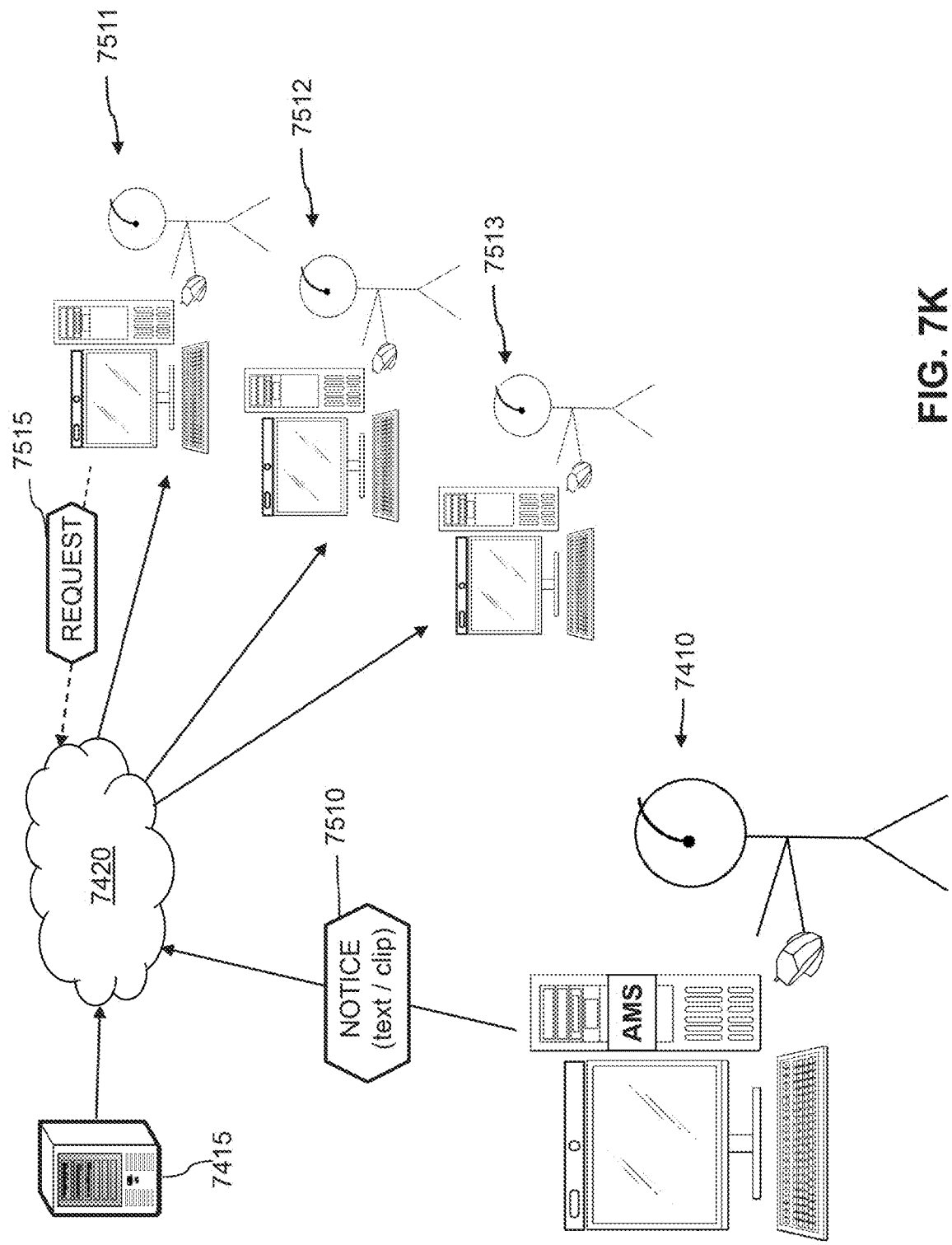

FIGS. 7J and 7K schematically illustrate a system operating at least in part according to the methods of FIGS. 5, 6, and 7A-7C. As shown in FIG. 7J, a player 7410 uses equipment 7411 (generally referred to as a player station), which includes a local processing system, for playing a game; in this embodiment, AMS application 7412 and game application 7425 execute on the player station. Game application 7425 can be downloaded from a game server 7405 via a network 7420. Player 7410 can engage with the game action using any of several accessories including, for example, a mouse 7416.

In this embodiment, the player station stores audio profiles 7430 for game-action sounds (e.g. sound 7418 from speaker 7413) and player-generated sounds 7419 (e.g. words spoken by the player) detected by microphone 7414. As shown in FIG. 7K, a notice 7510 regarding a detected sound can be distributed via network 7420 to equipment of other players 7511, 7512, 7513 participating in the game session. In an embodiment, the notice includes a live clip associated with occurrence of the sound. In a further embodiment, the live clip is sent to equipment of a player in response to a request (e.g. request 7515 from equipment of player 7511).

Figure 7L:
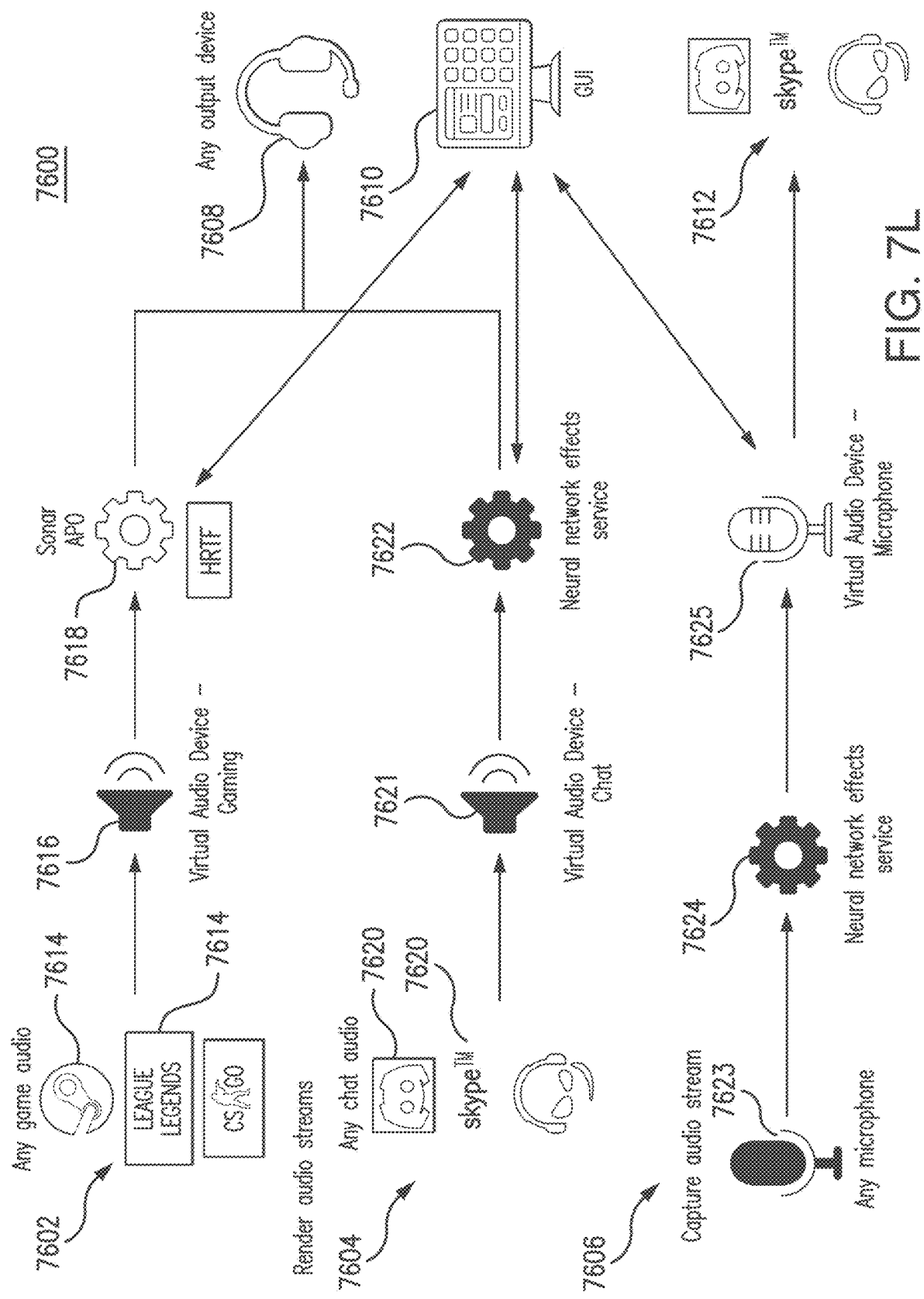
FIG. 7L depicts an illustrative embodiment of a block diagram for an audio processing system for a gaming system in in accordance with aspects of the subject disclosure.
Figures 1, 7L:
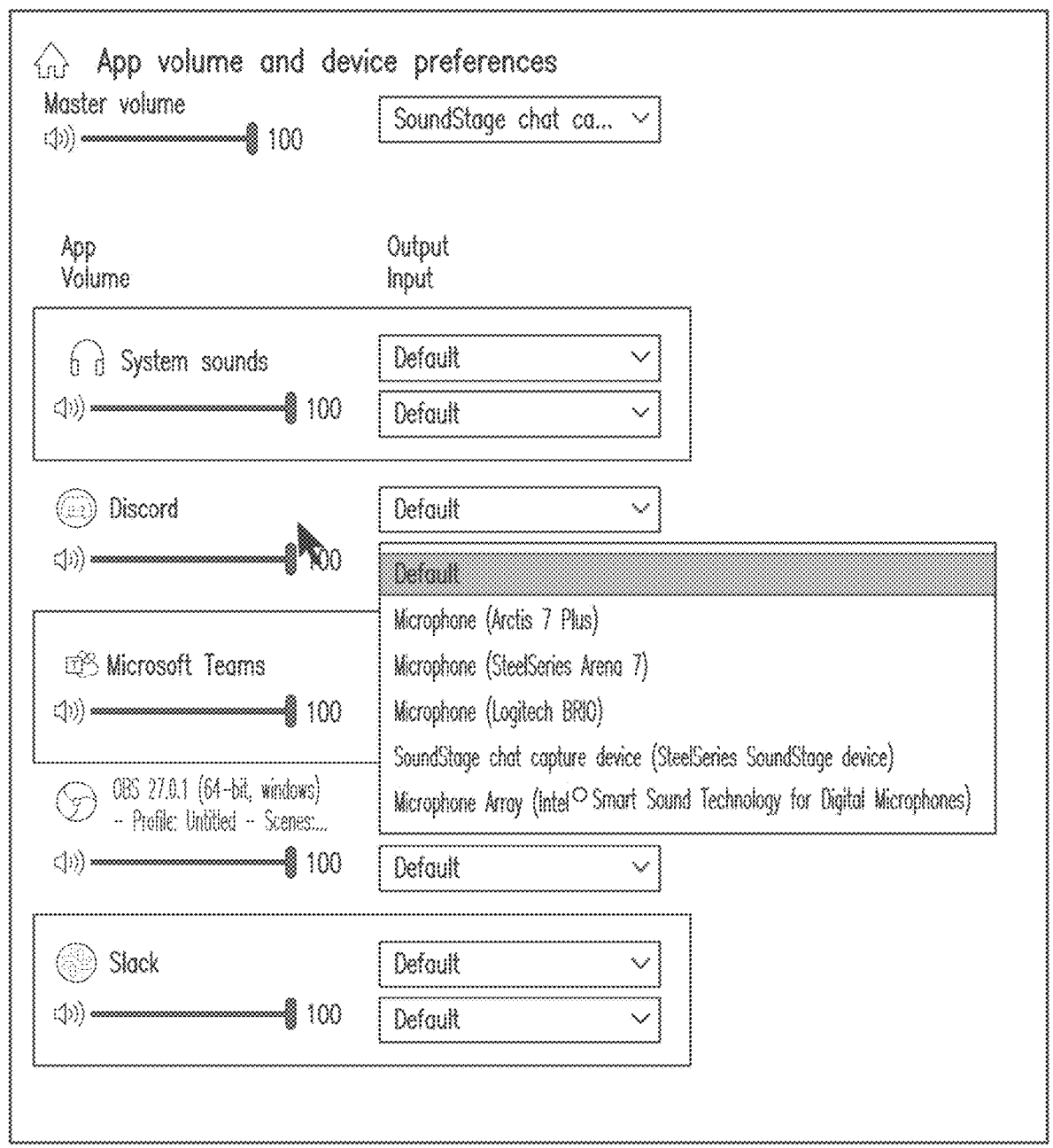
Figures 2, 7L:
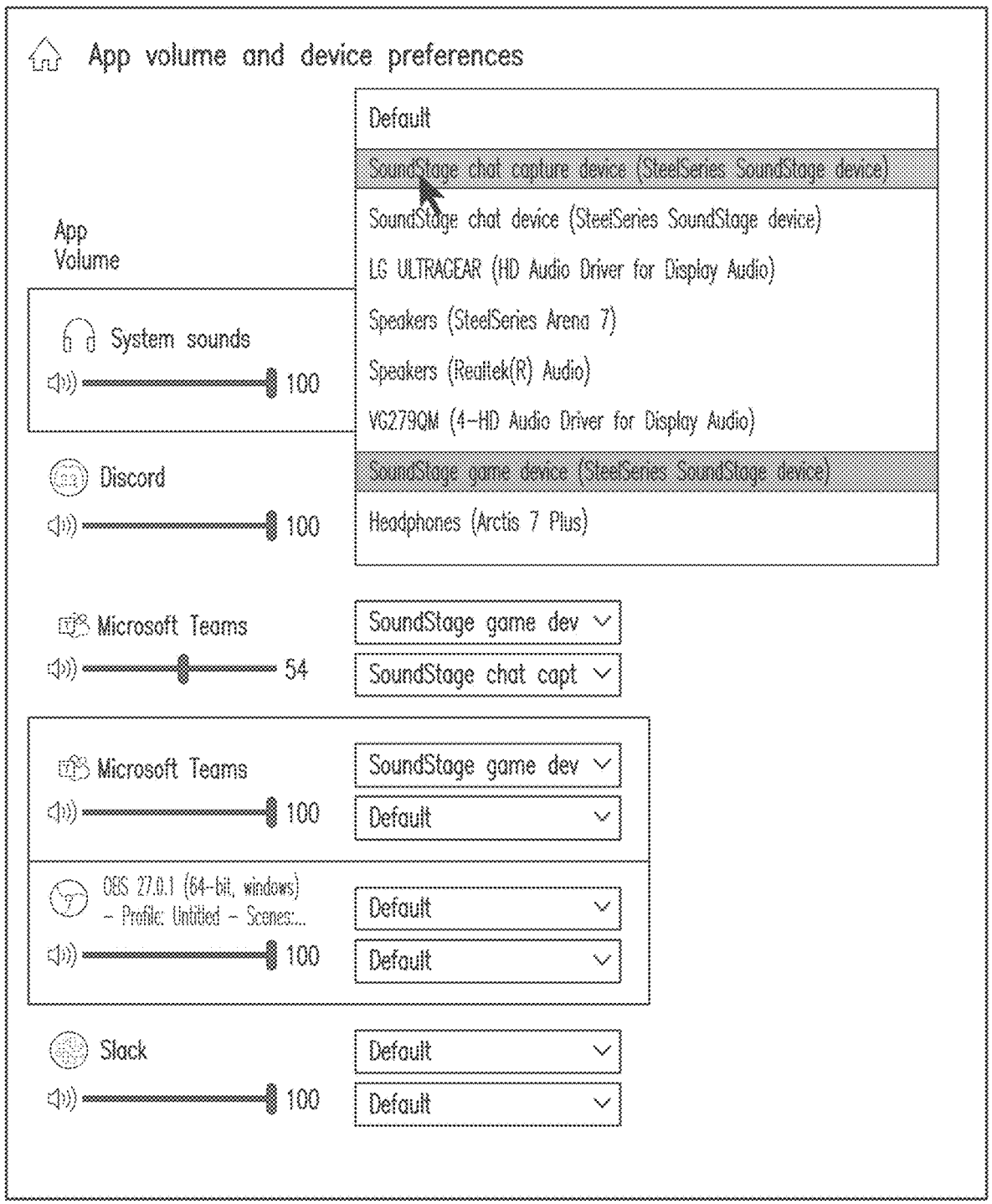

FIG. 7L depicts an illustrative embodiment of a block diagram for an audio processing system 7600 for a gaming system in in accordance with aspects of the subject disclosure. The audio processing system 7600 may cooperate with a gaming system to provide audio mixing and equalization for multiple audio streams associated with the gaming system. In embodiments, the gaming system may be embodiment as an accessory such as gaming controller 115 or computing device 206 (FIG. 2, FIG. 3). The computing device 206 operates according to an operating system (OS) for controlling various functions of the computing device 206 including input of data and other information and output of data or other information. The audio processing system 7600 further cooperates with the OS of the computing device to control audio processing, including mixing and equalization of audio streams associated with the computing device 206.

The audio processing system 7600 includes a plurality of audio input channels including, in this embodiment, a game audio input channel 7602, a chat audio input channel 7604 and a capture audio channel 7606. Further, the audio processing system 7600 includes one or more audio output devices 7608, a graphical user interface (GUI) 7610 and remote audio devices 7612. Other embodiments may include additional or alternative features and functions.

The game audio input channel 7602 operates under control of the GUI 7610 to select one or more audio streams from game audio source 7614 and to control audio processing of the selected audio streams in the game audio processing module 7618. Further, the game audio input channel 7602 operates under control of the GUI 7610 to route processed audio of the game audio input channel 7602 to an output device 7608. The game audio input channel 7602 includes a game audio input source 7614, a gaming virtual audio device 7616, and an audio processing module 7618. Other embodiments may include other or alternative features or functions. The game audio source 7614 may be, for example, a gaming system, one or more application programs running on a device such as computing device 206 and other sources accessed by a user of the gaming system, such as a network source. In the illustrated embodiment, game audio source 7614 may be an application or online source such as Steam® for gaming software and applications (available online at steampowered.com) or League of Legends® or Counter-Strike:Global Offensive (CS GO)®. The audio from the gaming system may include game sounds associated with video displayed on a video display device of the computing device 206. In the case of a war simulation game, for example, the game audio input stream 7602 may include sounds of gun shots, footsteps of teammates or opponents, explosions, vehicle noises, and others.

The game audio input stream 7602 may also include audio from other sources operating as game audio source 7614. Some applications generate audio and may be active on a computing device 206 along with the gaming system. For example, a gamer may be listening to music while playing a game of the gaming system. The game audio input stream 7602 may include the music audio stream from a music application. Further, an audio stream may be received from a remote location, over a network such as the public internet. For example, the game may be watching a movie provided by an online provider such as Netflix® or other source. The game audio input stream 7602 may include the audio received over the network.

In some applications, the game audio input stream 7602 includes multichannel audio or surround sound. Multichannel audio may include stereo audio with sound separation into right (R) and left (L) channels. Stereo audio may readily be provided to speakers built-in to a gaming device such as computing device 206. Stereo audio may also be readily provided to headphones worn by a gamer or other user.

Some applications such as games or videos produce surround sound audio. For example, surround sound audio may include techniques for enriching the fidelity and depth of sound reproduction by using multiple audio channels from multiple speakers that surround the listener, referred to as surround channels. Surround sound audio may use four to seven or more independent audio channels and speakers placed in front of and behind the listener in order to surround the listener with sound. Surround sound audio may be produced according to a standard which specifies encoding and decoding of audio data. One example of a surround sound standard is referred to as 5.1 surround sound. The 5.1 standard calls for six speakers including center (C) in front of the listener; front left (FL) and front right (FR) in front of the listener at angles of thirty degrees off center to the listener; left surround (Ls) and right surround (Rs) at angles of 100 to 120 degrees off center to the listener; and a subwoofer, the position of which is not specified. The 5.1 surround sound standard is published as Recommendation ITU-R BS.775-3 (August 2012 by the International Telecommunications Union (ITU). Another example of surround sound is referred to as 7.1 surround sound. 7.1 surround sound is similar to 5.1 surround sound but with four surround channels instead of two, the rear left (RL) and rear right (RR) at angles of 135 to 150 degrees off center to the listener; the side left (SL) and side right (SR) at angles of 90 to 110 degrees off center to the listener. The 7.1 surround sound standard is published as Report ITU-R BS.2159-7, February 2015, by the ITU.

Surround sound audio is typically directed to a listener position where the audio effects work best. The surround sound encoding presents a fixed or forward perspective of the sound field to the listener at this location. The technique enhances the perception of sound spatialization by exploiting sound localization. Sound localization refers to a listener's ability to identify the location or origin of a detected sound in direction and distance. In a surround sound system, sound localization is achieved by using multiple discrete audio channels routed to an array of loudspeakers. Each respective audio channel is routed to a respective loudspeaker.

Multi-channel or surround sound audio can enhance the enjoyment for a listener. This is particularly true for a listener enjoying a video, film or audio such as a concert in a home theater experience. This is also particularly true for a gamer participating in a game using a gaming system on computing device 206.

The gaming virtual audio device 7616 provides device routing for the game audio source 7614. The gaming virtual audio device 7616 may form an audio logical device. The gaming virtual audio device 7616 may be a device used for example for recording the received audio data or for sending the received audio data on a network. In contrast to a virtual audio device, a real audio device is a physical device such as a laptop computer audio system or a Bluetooth speaker. On a computer such as a laptop computer forming the computing device 206, an operating system will expose a digital device. The operating system will see the digital device as an addressable endpoint. There is no real, physical system behind the addressable endpoint, including no hardware and no firmware. The gaming virtual audio device 7616 is merely a device in the sense of the operating system. The gaming virtual audio device 7616 may present itself to the operating system of the computing device 206 as a sound card or other physical device. It may merely be an address to which audio data is written by the processing system under control of the operating system. The audio data may be subsequently read and processed by other devices. However, the gaming virtual audio device 7616 is a virtual device because there is no physical device associated with it.

In an embodiment, the gaming virtual audio device 7616 may be configured as a portion of code stored in memory for performing suitable functions such as controlling a processing system. The gaming virtual audio device 7616 may receive multiple audio streams of the game audio source 7614 from the game audio input stream 7602 and combine them to form a target audio stream. The gaming virtual audio device 7616 is configured to route the target audio stream to the audio processing module 7618.

In an embodiment, the gaming virtual audio device 7616 includes a source code that embeds a functionality capable of routing the target audio stream to the audio processing module 7618. In practice, the gaming virtual audio device 7616 re-emits the audio data received on its audio receiver endpoint in the form of the plurality of first audio streams on an audio emitter endpoint that will be read by the audio processing module 7618. In some embodiments in conjunction with the Windows operating system the audio endpoint receiver of the gaming virtual audio device 7616 typically corresponds to the so-called Windows operating system audio endpoint sink, and the audio endpoint emitter of the gaming virtual audio device 7616 typically corresponds to the so-called Windows operating system audio endpoint source.

The audio processing module 7618 enables custom digital signal processing effects. In some embodiments, the audio processing module 7618 may be embodied as a Windows audio processing object (APO). In the Windows® operating system, for example, audio processing objects (APOs) provide software based digital signal processing (DSP) for Windows audio streams. An APO is a COM host object that contains an algorithm to provide a specific DSP effect referred to as an audio effect. Examples of APOs include graphic equalizers, reverb, tremolo, acoustic echo cancellation (AEC) and automatic gain control (AGC). APOs are COM-based, real-time, in-process objects. The APO provides programmable audio processing.

The chat audio input stream 7604 includes one or more chat audio sources 7620, a chat virtual audio device 7621 and a chat neural network effects service 7622. The chat audio input stream 7604 operates under control of the GUI 7610 to select one or more audio streams from the chat audio sources 7620 and to control audio processing of the selected audio streams in the chat neural network effects service 7622. Further, the chat audio input stream 7604 operates under control of the GUI 7610 to route processed audio of the chat audio input stream 7604 to an output device 7608.

In accordance with various aspects described herein, a gamer using computing device 206 to participate in a game or gaming application may communicate verbally with one or more teammates or others using a chat channel. For example, the teammates may use a voice over internet protocol (VoIP) application to communicate with each other. Examples of suitable applications include the Skype® application and the TeamSpeak® application. In other examples, the gaming application may include a built-in voice communication channel. The gamer or other user may access the GUI 7610 or the operating system of the computing device 206 to select one or more chat audio sources 7620 for communication. Audio from the chat audio sources 7620 is provided to the audio processing system 7600 at the chat audio input stream 7604 and may include voice conversation by teammates of the gamer or other user associated with the audio processing system 7600.

The chat virtual audio device 7621 operates on principles similar to those described herein for the gaming audio device 7616. The chat virtual audio device 7621 may be embodied as a module including software code. The chat virtual audio device 7621 may operate in response to control inputs from the GUI 7610 to select one or more of the more chat audio sources 7620. The chat virtual audio device 7621 routes an audio stream from the more chat audio sources 7620 to a selected destination such as the neural network effects service 7622 in response to control data from the GUI 7610. In some embodiments, multiple instances of the chat virtual audio device 7621 may be used to access and route multiple respective audio streams from multiple respective chat audio sources 7620.

The neural network effects service 7622 provides audio processing of the user audio stream from the chat audio input stream 7604. In some embodiments, the neural network effects service 7624 implements an artificial intelligence routine for customizing one or more audio streams such as the audio stream from the chat audio sources 7620. For example, the neural network effects service 7624 may implement an artificial intelligence-based noise cancellation for the user audio stream from the microphone 7623 that operates to remove background noise originating in the environment of the user or gamer. The neural network effects service 7622 responds to control information from the GUI 7610 to tailor audio processing in the audio stream received from the chat virtual audio device 7621. FIGS. 7M-7T depict an illustrative embodiment of a GUI that may embody the GUI 7610. Further, the GUI 7610 provides control information to route audio stream from the neural network effects service 7622 to one or more output devices 7608.

The capture audio stream 7606 includes a microphone 7623, a neural network effects service 7624 and a microphone virtual audio device 7625. The capture audio stream 7606 corresponds to audio originating with a gamer or user interacting locally with the gaming system on the computing device 206. For example, the user may interact with one or more gaming accessories such as a gaming console to participate in the game. As noted, the user may access other audio sources such as music and video including audio from a local application or over a network such as the internet. As part of the interaction, the user provides spoken audio input which may be chat shared with gaming teammates, for example. Chat or other conversation from the teammates is received at the chat audio input stream 7604. Similarly, the reverse channel with chat or other conversation from the gamer to teammates is provided on the capture audio stream 7606.

The microphone 7623 may include any microphone or other device for capturing audio locally with the user. In an example, the user wears headphones or a headset equipped with a microphone. In another example, a laptop computer or other computing device 206 includes a microphone for capturing user audio. The user audio stream from the microphone 7623 is routed and processed according to the operating system of the computing device 206.

The neural network effects service 7624 provides audio processing of the user audio stream from the microphone 7623. In some embodiments, the neural network effects service 7624 implements an artificial intelligence routine for customizing one or more audio streams such as the user audio stream. For example, the neural network effects service 7624 may implement an artificial intelligence-based noise cancellation for the user audio stream from the microphone 7623 that operates to remove background noise originating in the environment of the user or gamer. Further, the neural network effects service 7624 responds to control information from the GUI 7610 to tailor audio processing in the user audio stream received from the microphone 7623. FIGS. 7M-7T depict an illustrative embodiment of a GUI that may embody the GUI 7610.

The user may wish to adjust how the user sounds on team chat to teammates or others who may hear the user The GUI 7610 may be used to adjust processing by the neural network effects service 7624 or other audio processing system to adjust how the user sounds to others. For example, some users want to have their voice sound a little deeper to others. Some users may want their vice to sound a little clearer to others, such as by adding noise reduction to the microphone audio stream. In another example, a user may select a pre-set audio processing configuration such as a broadcaster pre-set, which modifies the user's voice to sound like a professional broadcast audio stream. In yet other examples, the user's voice may be completely modified to sound different, such as a male user who wishes to sound female or a very young user who wishes to sound very old. In another example, a female user may modify her voice to sound male to avoid harassment that can occur online. The user may choose to add effects such as compression to remove relatively high frequencies or relatively low frequencies. Moreover, the user may choose to apply parametric equalization to the user's voice audio stream to further tailor the user's output audio. This may improve intelligibility of the user's voice. In another example, the user may add an accent or remove an accent, such as the user who adds an Australian accent to sound more charming or intelligent to American teammates. As indicated, the user may be provided with a number of selectable pre-set audio modifications that may be applied by the neural network effects service 7624. The selectable pre-set audio modifications may be accessed and selected by actuation of the GUI 7610.

The microphone virtual audio device 7625 operates similarly to those described herein for the gaming virtual audio device 7616. The microphone virtual audio device 7625 may be embodied as a module including software code. The microphone virtual audio device 7625 may operate in response to control inputs from the GUI 7610 to select one or more of the more destinations for an audio stream from the neural network effects service 7624.

Thus, the GUI 7610 provides control information to route an audio stream from the neural network effects service 7622 to remote audio devices 7612. In the example, the remote audio devices 7612 may include any of the chat audio sources 7620, such as a VoIP application. Examples of suitable VoIP applications include the Skype® application and the TeamSpeak® application. Others may be specified, as well.

The audio processing system 7600 may create virtual audio devices such as the gaming virtual audio device 7616, the chat virtual audio device 7621 and the microphone virtual audio device 7625. Such virtual audio devices may be accessed in the Windows operating system. Applications can be assigned to the virtual audio devices. The virtual audio device may be assigned names or other designations and may be actively selected by the user or gamer. In the example of FIG. 7L, a single virtual audio device 7616 is illustrated for processing audio from games such as Steam as well as audio streams from video sources such as the Twitch® live video streaming service or a sports video program as well as audio streams from audio sources such as the Spotify® audio streaming service. In other embodiments, a respective virtual audio device may be established for each respective audio stream handled by the audio processing system 7600.

In embodiments, the audio processing system can be running on a device such as computing device 206 and processing audio from some or all open applications on the device. For example, if five applications are current running on the device. If three applications of the five open applications are routed to the same virtual audio device 7616 and audio processing module 7618, the three applications will have the same effects applied, such as volume and equalization and filtering. Similarly, the other two applications, if routed to a different virtual audio device analogous to virtual audio device 7616 and a different audio processing module analogous to audio processing module 7618, the other two applications will have the same effects applied. Thus, the virtual audio device 7616 and audio processing module 7618, and analogous devices for other audio streams, may form a switching module for mapping or routing audio streams from applications or other sources to any audio destination such as audio output devices 7608, the graphical user interface (GUI) 7610 and the remote audio devices 7612.

FIG. 7L-1 and FIG. 7L-2 illustrate Windows® operating system controls of a user interface for selecting device preferences. In particular, FIG. 7L-1 and FIG. 7L-2 illustrate control of audio routing within a Windows device such as computing device 206. A user may access the Windows Control Panel to control audio stream routing. In FIG. 7L-1 and FIG. 7L-2, various audio sources are illustrated including in this example, System sounds, Discord, Microsoft Teams, OBS 27.0.1 and Slack. System sounds refers to audio generated internally by the Windows operating system. Discord, Microsoft Teams, Open Broadcaster Software (OBS) and Slack are application programs for sharing audio and video within the computing device 206 and between the computing device 206 and other devices over a network. For example, in a gaming environment, teammates may chat or communicate verbally using a feature of the game or they may use a third-party app such as Discord or Slack.

The Windows control panel of FIG. 7L-1 and FIG. 7L-2 allows the user to control association of audio sources and audio destinations. The user may select an input device and an output device for each application. In the example of FIG. 7L-1, an audio stream from the Discord application is selected to come from a Default input. Further, in the example of FIG. 7L-2, an audio stream from the Discord application is selected for routing to a destination designated as SoundStage chat capture device (SteelSeries SoundStage device). In other examples, the applications listed on the left of FIG. 7L-1 and FIG. 7L-2 may include other applications for music, streaming video, broadcast television and other sources.

The operating system of the computing device 206, in this example, the Windows® operating system, may thus be used to map audio streams from audio sources to audio destinations. The audio sources include games, applications, network locations and any other source of audio to the computing device. Mapping the audio streams may further include mapping or routing particular audio streams to a particular audio processing module 7618 such as APO or neural network effects service 7622.

In some embodiments, the audio processing system 7600 may automatically characterize audio events occurring in the game audio stream, the chat audio stream, the microphone audio stream or some combination of these. In some embodiments, machine learning techniques may be used to characterize or profile audio events in the audio stream to identify a predetermined audio event such as a footstep or a gunshot associated with another player. In an example, the live game audio stream may be provided to a neural network. The neural network may be trained using any suitable data such audio from other games or conversations. The training data may be tagged, for example, to identify predetermined audio events such as a gunshot or a footstep. Different characteristics may be further trained and identified, such as a footstep on wet pavement or a gunshot with ricochet. Once trained and provided with the live audio, the neural network or other processing module may produce an indication when the predetermined audio event has occurred. In some embodiments, the indication is a value corresponding to the probability that the predetermined audio event has occurred. If the probability exceeds a threshold, such as 75 percent or 95 percent, the audio processing system may conclude that the predetermined event has been detected.

In response to detecting the predetermined audio event, the audio processing system may take further steps to enhance or adjust the audio corresponding to the predetermined audio event. In an example, the audio processing system may automatically adjust a parametric equalizer to emphasize spectral components of the predetermined audio event. For example, if a footstep is detected, the spectrum may be adjusted in the parametric equalizer to emphasize to the listener, the player, the sound of the footstep. Further, if the player is using a headset or other audio equipment that provides directionality or other surround sound effect, the audio may be automatically adjusted to emphasize the direction of origin of the predetermined event. For example, if the footstep in the game comes from behind the player, the audio of the footstep in the surround sound arrangement will emphasize the direction so that the audio from behind is louder or clearer and the footstep is more distinct. Other sounds from that area may be suppressed to emphasize the footprint. In a video game in which the player has an associated avatar, the directionality of the sound may be processed according to the position and orientation of the avatar in the game.

In other embodiments, a graphical user interface or other visual interface may be activated to provide the player with a visual indication of the detected predetermined audio event. For example, the graphical user interface may flash text advising of "footstep behind you," "possible gunshot detected to your right." The nature of the visual indication may be based on the nature of the detected audio event and the probability or likelihood of detection, plus any other information that can be derived from the audio stream.

Figure 7M:
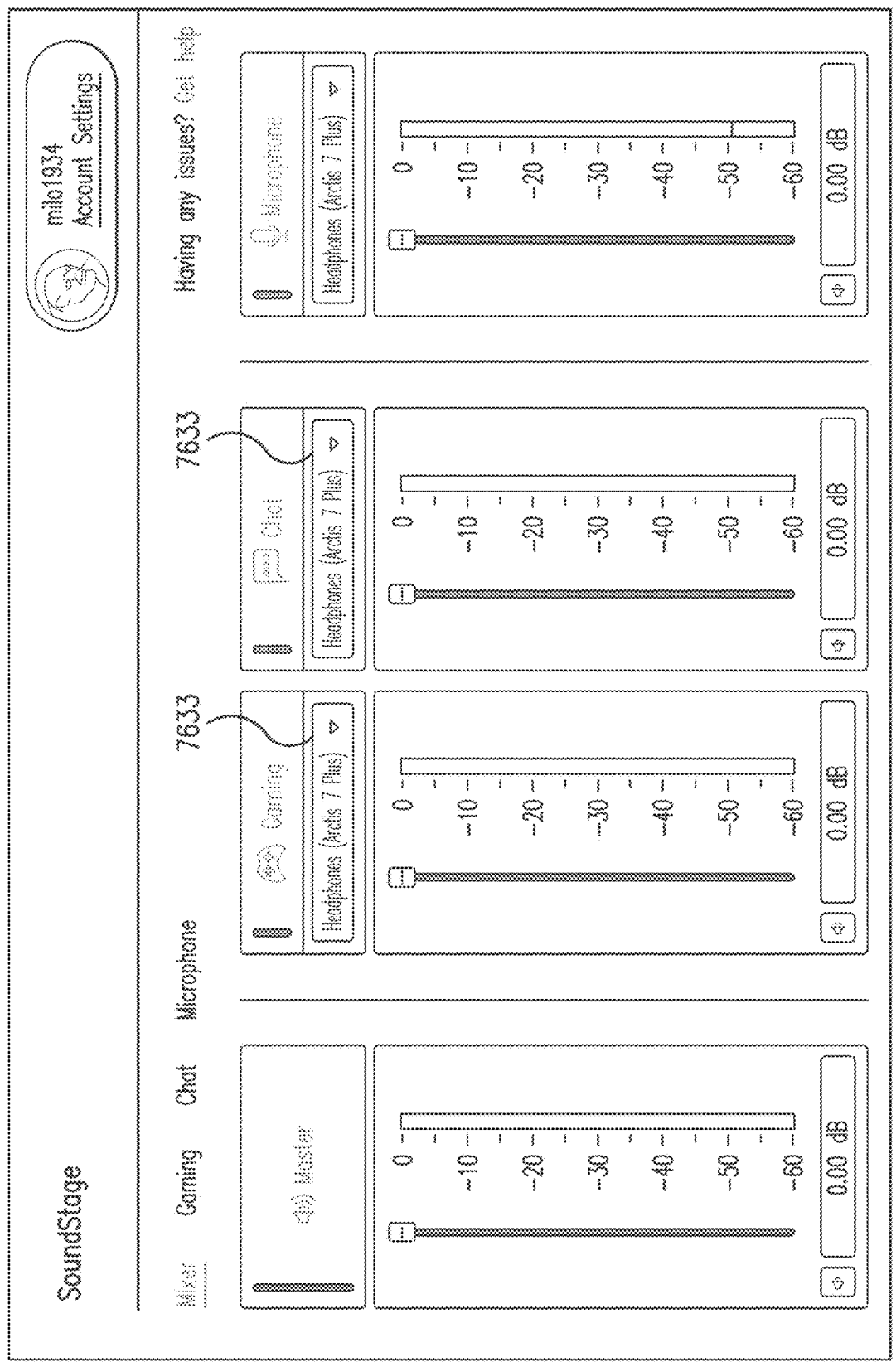
Figures 1, 7M:
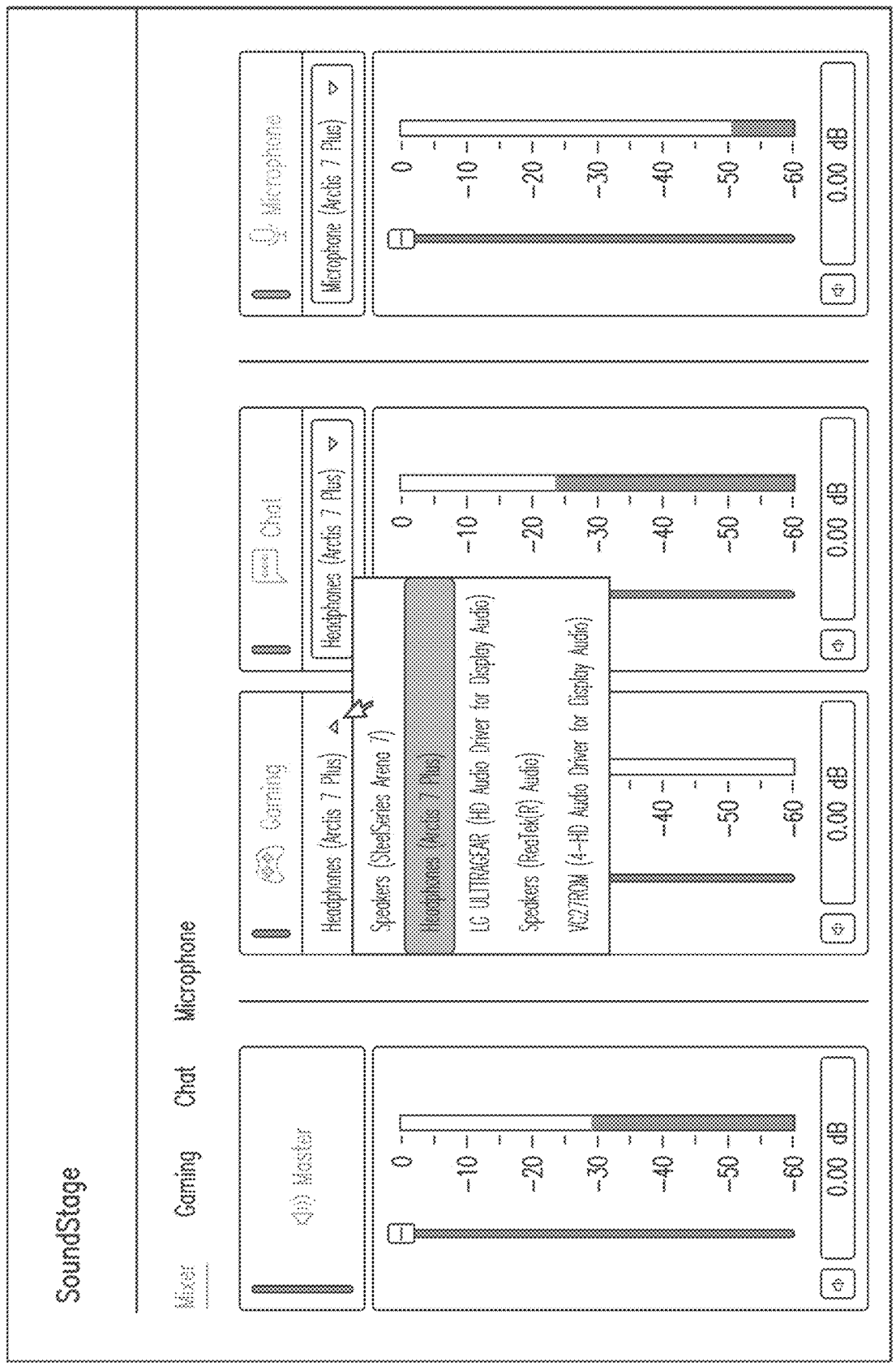
Figures 2, 7M:
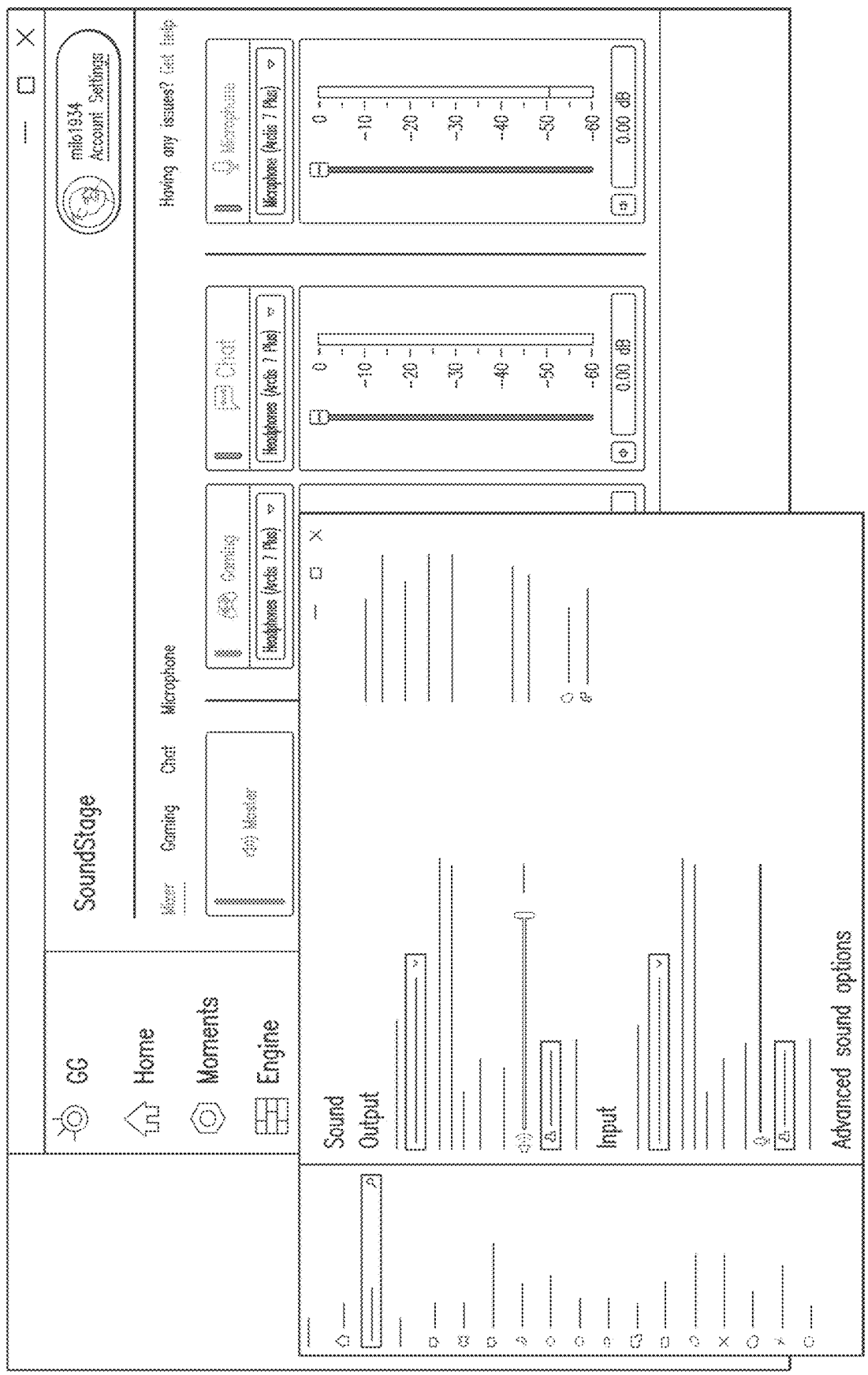
Figures 3, 7M:
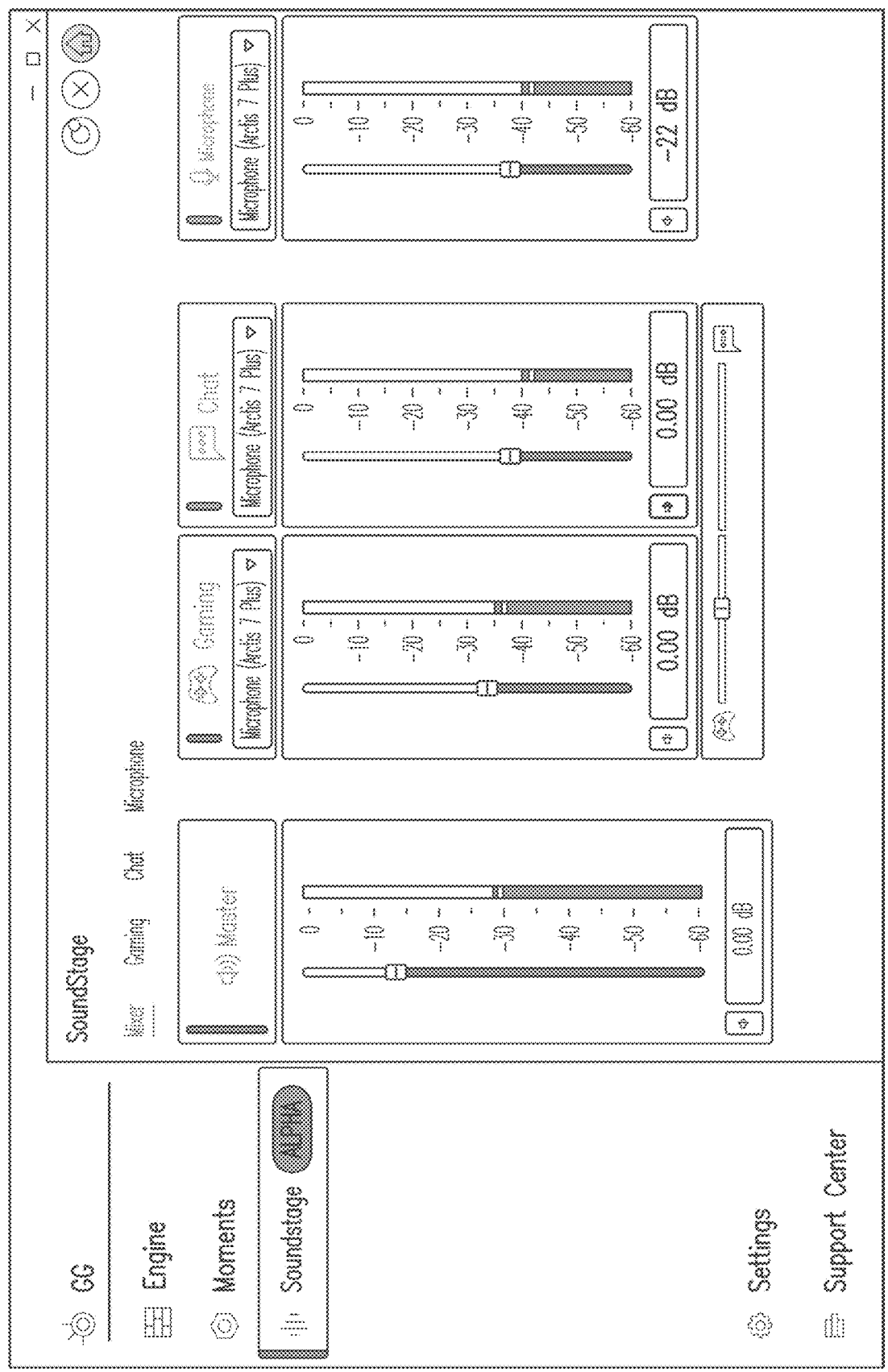

Further, in some embodiments, the GUI 7610 may be used to control the association of audio sources and audio destinations. FIG. 7M and FIG. 7M-1 illustrate an example in which the GUI 7610 of the audio processing system 7600 may be used to access the Windows Control panel to manage audio stream configurations. In the illustrated embodiment, the Windows Control panel image is produced on a display screen which displays the GUI 7610. In other embodiments, a custom graphical user interface display (not shown) may be produced with suitable controls enabling a user to access and modify mapping or routing of particular audio streams. Any suitable interface controls may be provided including mouse-based controls, touch-based controls on a touch-sensitive screen and voice-based controls.

In some embodiment, the audio processing system 7600 may automatically detect one or more audio sources and one or more audio destinations and automatically route audio streams from source to destination. In some embodiments, the audio processing system 7600 may pre-populate a routing matrix which can then by modified manually by the user, such as by accessing one or more pop-up menus similar to those illustrated in FIG. 7L-1 and FIG. 7L-2 or similar to those illustrated in FIG. 7M-1 or 7M-2. The audio processing system 7600 may select a group of audio applications known to be the most popular applications and pre-populate the menus with those applications. For example, the most popular voice over internet protocol (VoIP) applications may be selected as defaults. In another example, if the user is known to have a preference for an application, the audio processing system 7600 may select the preferred application as a default. The user can access the GUI 7610 and modify the selection as desired. The default selections for audio routing and audio processing are automatically selected for the user upon start-up of the gaming system or other applications to simplify and streamline the process for the user. The user starts the game and his preferred audio settings are established automatically. Moreover, if the user has different preferences for different games or different types of games, or for different types of applications such as music, video and streaming video, the audio processing system 7600 automatically detects the type of game or type of application and selects the user's preferred settings for each audio stream. Information defining the user's preferred settings may be stored at any convenient location such as locally at the computing device 206 or remotely at a server or other storage location accessible over a network such as the public internet. The user's preferred setting may be part of a profile or configuration file of the user.

In some examples, the audio processing system 7600 may apply a head related transfer function (HRTF). HRTF is a methodology used to generate virtual surround sound. It may be used to simulate virtual objects in a virtual surround environment using two speakers. Human sound localization may depend on the HRTF in the frequency domain and a head-related Impulse Response (HRIR) in the time domain. The HRTF relates to an acoustical footprint from a location in space to the ear of a person. A soundwave traveling from a location in space to the ears of a person will be modified due to acoustical reflection and diffraction phenomena by the listener's body, shoulders, head and ear pinnae. The HRTFs contain the so-called localization cues, i.e. the information used by the human brain to decode the direction of a sound event. Hearing a sound is affect by interaural time differences (ITD) and interaural level differences (ILD). These are mainly due to an acoustical head-shadowing effect. They enable lateral localization (left/right) by the listener, but they do not provide enough information to precisely locate a sound source.

The HRTF includes various spectral cues used by the user to localize sound. These include notches and peaks in the audio spectrum. These are primarily due to reflection on the listener's shoulders (low frequency) and reflection or diffraction by the ear pinnae of the listener (high frequency). Such spectral cues provide information used by the brain of the listener to decode the front/back and up/down location of a sound source.

Spatial sound over headphones uses HRTFs to simulate a sound source at a precise location around the listener. Most conventional spatial sound or virtual surround sound solutions use one unique generic HRTF profile, developed from one unique person or a dummy head. In an example, if S(f) is the signal of the sound source, the stereo signal playback by the headphones is obtained by filtering it with the appropriate left HRTF and right HRTF. This may be described as follows:

$$S_L(f)=S(f)*HRTF_L(f, \text{direction person})$$

$$S_R(f)=S(f)*HRTF_R(f, \text{direction person})$$

for the left (L) ear or channel and right (R) ear or channel, respectively.

A generic HRTF profile cannot fit every listener, the localization cues will be the right ones for some listeners, but not for others. The localization cues are dependent on the anatomy of the listener. The typical drawback of using a generic HRTF profile is that the front/back and up/down localization is distorted. For example, sounds intended to be heard in the front of the listener are heard by the listener in the rear of the listener. Acquiring a personal HRTF for a user is cumbersome, expensive and requires substantial time and equipment, and is not realistic in most instances. Some conventional approaches to HRTF customization include use of pictures of the listener's ears to derive an adapted HRTF profile or allowing a user to select among tweaked versions of a single HRTF profile.

FIG. 7L-3 illustrates a process for listener selection of a HRTF profile for use by the user. The technique of FIG. 7L-3 employs a version of A/B testing to allow the user to select an HRTF that sounds best to the listener. In the process illustrated in FIG. 7L-3, several HRTF profiles are presented to the user. The user is guided through a series of A/B comparison tests to select the best or most appropriate HRTF for that user. The HRTF is then applied to an audio processing system such as the audio processing system 7600 of FIG. 7L.

In the example embodiment, the listener is presented with a series of eight HRTF profiles. Eight profiles are arbitrarily chosen. Any suitable number can be used. In FIG. 7L-3, the HRTF profiles are labelled A1, B1, A2, B2, A3, B3, A4 and B4. Each HRTF proposal in the example is based on different a HRTF developed for another person and is related to different morphologies, or persons with varying anatomy that will affect the HRTF. In the example embodiment, the eight HRTF profiles are representative of a large variety of morphologies or persons.

The process of FIG. 7L-3 is a guided selection by the user of a best or optimal or closest-fit HRTF profile. The process may be described as a tournament of several A/B listening tests. Thus, in the first round 7626 of the tournament, the user is presented with a listening test and comparison between HRTF profile A1 and HRTF profile B1. Further, in the first round 7626, the user is presented with a listening test and comparison between HRTF profile A2 and HRTF profile B2. Still further in the first round 7626, the user is presented with a listening test and comparison between HRTF profile A3 and HRTF profile B3 and a listening test and comparison between HRTF profile A4 and HRTF profile B4.

Any suitable listening test may be provided. In some embodiments, audio test files are presented to the listener that highlight common perceptive drawbacks such as front/back discrimination difficulties. In the example, the listener first hears one or more audio test files as modified by HRTF profile A1 and the same one or more audio test files as modified by HRTF profile B1. The user selects or indicates whether profile A1 or profile B1 sounded better or more realistic or more natural to the listener, focusing preferably on the ability of the listener to spatially locate sounds played in the one or more audio test files. The selected profile, A1 or B1, is judged a winner of the first round 7626. The user continues with the other A/B tests of the first round, including profile A2 versus profile B2; profile A3 versus profile B3; and profile A4 versus profile B4. For each A/B test of the first round 7626, a winner advances to the second round 7627.

The A/B testing process is repeated for the second round 7627. The four winners from the first round 7626 are subjected to two A/B tests and two winners of the second round 7627 are advanced to the final round. Again, the winner of each A/B test is the HRTF profile that is judged best by the listener for that listener, focusing on spatial location of sounds of the audio test files. A final round 7628 is conducted with a similar A/B test and an ultimate winner HRTF profile is selected as the best or optimal HRTF profile for the listener among the eight HRTF profiles that were initially selected.

Throughout the process illustrated in FIG. 7L-3, the user may interact with a graphical user interface such as the GUI 7610 of FIG. 7L. The graphical user interface may provide written or audible instructions to the listener to lead the listener through each A/B test and through each round including the first round 7626, the second round 7627 and the final round 7628. Directions and guidance may be as detailed as necessary for the listener. Generally, the process of FIG. 7L-3 needs to be performed a single time to select an optimal HRTF profile for the listener.

Using a tournament format for selecting an optimal HRTF profile for the listener simplifies a process of selecting a best-fit or optimal HRTF profile for the listener. The tournament format reduces the number of A/B listening tests required of the user to identify the best fit for this listener. The listening tests allow the listener to make an HRTF profile selection that is the best fit for that listener, by directly comparing with another HRTF profile. As the tournament advances through the first round 7626, the second round 7627 and the final round 7628, the HRTF profiles should generally be closer to the actual ideal HRTF profile for this particular listener. The winner of the final round 7628 is unlikely to be precisely the ideal HRTF profile for this listener but is likely to be a good fit and the best fit from a wide selection of eight pre-selected HRTF profiles.

Once an HRTF profile for a user has been established, such as by the process illustrated in FIG. 7L-3, the HRTF profile may be used in the audio processing system 7600 of FIG. 7L. In some embodiments, the game audio input stream 7602 includes audio processing to establish HRTF processing. HRTF processing may be applied, for example to audio streams encoded with 5.1 surround sound or 7.1 surround sound to provide the virtual surround sound effect when the user listens through two stereo speakers. For example, the audio processing module 7618 may include an HRTF module operative to enable HRTF processing for the audio stream received from game audio, movie or video audio, and other streams to create a virtual surround sound effect for the user. The HRTF processing may be applied after audio processing including parametric equalization and other functions. The user may activate and control the HRTF module and HRTF processing using the GUI 7610 or in any other suitable manner.

FIGS. 7M-7T depict an illustrative embodiment of a graphical user interface display of an audio processing system for a gaming system in accordance with aspects of the subject disclosure. A user of the audio processing system 7600 of FIG. 7L can interact with the graphical user interface to control aspects of the audio processing system 7600. In the exemplary embodiment, the user may participate in gameplay with the gaming system with other players including teammates. For example, the user may interact with a personal computer, laptop computer or other device that implements the gaming system and is in data communication with a network such the public internet. The gaming system generates an audio stream of gaming audio that is presented to the user through an audio output system such as headphones. The player and the teammates of the player converse together in an audio stream referred to as gaming chat. The gaming chat audio stream is received by the user's computer and is presented to the user through an audio output system such as headphones. The user generates an audio stream by speaking into a microphone, for example as part of the gaming chat. The speech of the user is converted to data by the microphone and communicated over the network to teammates of the user.

FIG. 7M depicts an illustrative embodiment of a mixer panel 7630 of the graphical user interface. The mixer panel 7630 includes an audio stream selector 7631, a series of audio stream controllers 7632 and a series of output selectors 7633. Other embodiments may include other features in addition to those illustrated in FIG. 7M.

The audio processing system of FIG. 7L is configured to process three separate audio streams, Game, Chat, Microphone. Each audio stream is processed independently from the others. In the mixer panel 7630, the user can assign a different audio device, such as a headset, speakers, microphone, or others, to each respective audio stream and tune finely the volume of the respective audio stream. Furthermore, the user also has a master volume. Separately processing the respective audio streams allows the user to finely tune the game sound without impacting teammates' voice audio on the chat audio stream.

The audio stream selector 7631 allows the user to select and control an audio stream. The audio stream selector 7631 may be used to select for display the mixer panel 7630, a gaming audio control panel, a chat audio control panel and a microphone audio control panel. The audio stream selector 7631 may be used, for example to select using a mouse or other accessory, or by touching a touch-sensitive screen, to select a particular audio stream. In the illustrated embodiment, the mixer panel 7630 enables volume control over three separate audio streams of the gaming system, including a gaming audio stream, a team chat audio stream and a user's microphone audio stream, as well as a master audio volume. The user may select a particular audio stream and, using a mouse for example, may drag the volume slider control for the selected audio stream to a desired level. In this manner, the relative volume of each separate audio stream may be tailored to the user's preferences or needs at a given time. The master volume slider allows the user to control overall game audio volume from all sources.

The output selectors 7633 are embodied as a pop-up menu that may be selected by the user with a mouse or other accessory. The pop-up menu is populated by the system with the audio devices that the operating system of the computer has identified. FIG. 7M-1 shows an example of selecting an audio output device on a pop-up menu. Generally, recognized audio devices include speaker systems and microphone systems that are detected by the operating system.

One of the recognized audio devices is designated as the default audio devices. By default, the Windows® operating system has a default multimedia device. The default multimedia device is the stream used for gaming. The dropdown menu of the output selectors 7633 may be used to control where audio output is directed. To select chat, the user can use the menu to select where to users wants to redirect the audio, such as headphones, speakers, audio driver. On the output selectors 7633, the list of a dropdown menu is populated from known windows audio devices. Windows has a default audio communication device. The audio processing system sets Chat as the Windows default audio communication device and all the audio from the Chat audio stream gets routed to the audio selected in the dropdown. In this example, the user does not choose where the audio comes from but chooses where y the audio is redirected to. The game itself outputs audio to the default Windows setting, which may be set by the Windows operating system control panel.

Figure 7N:
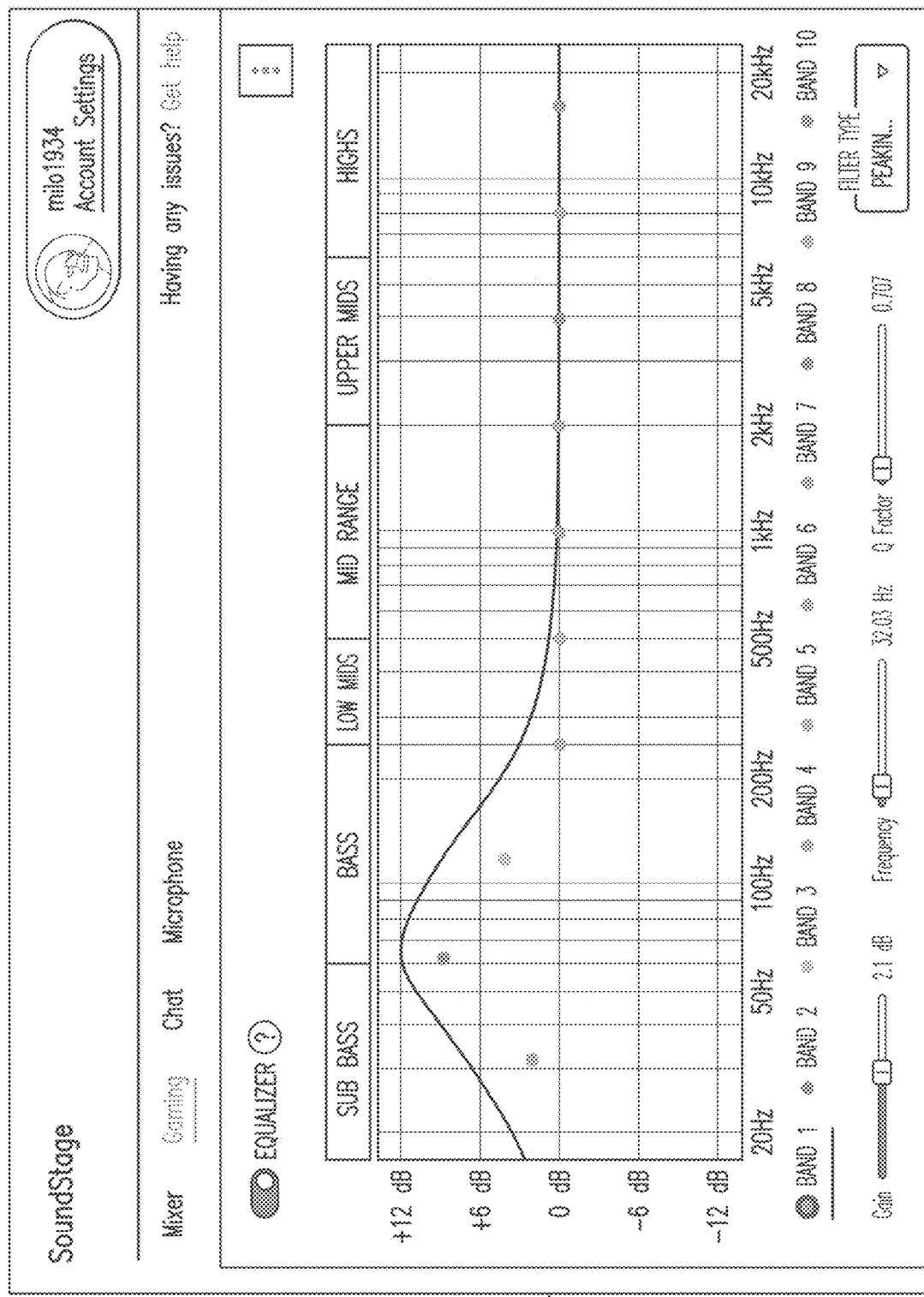
Figures 1, 7N:
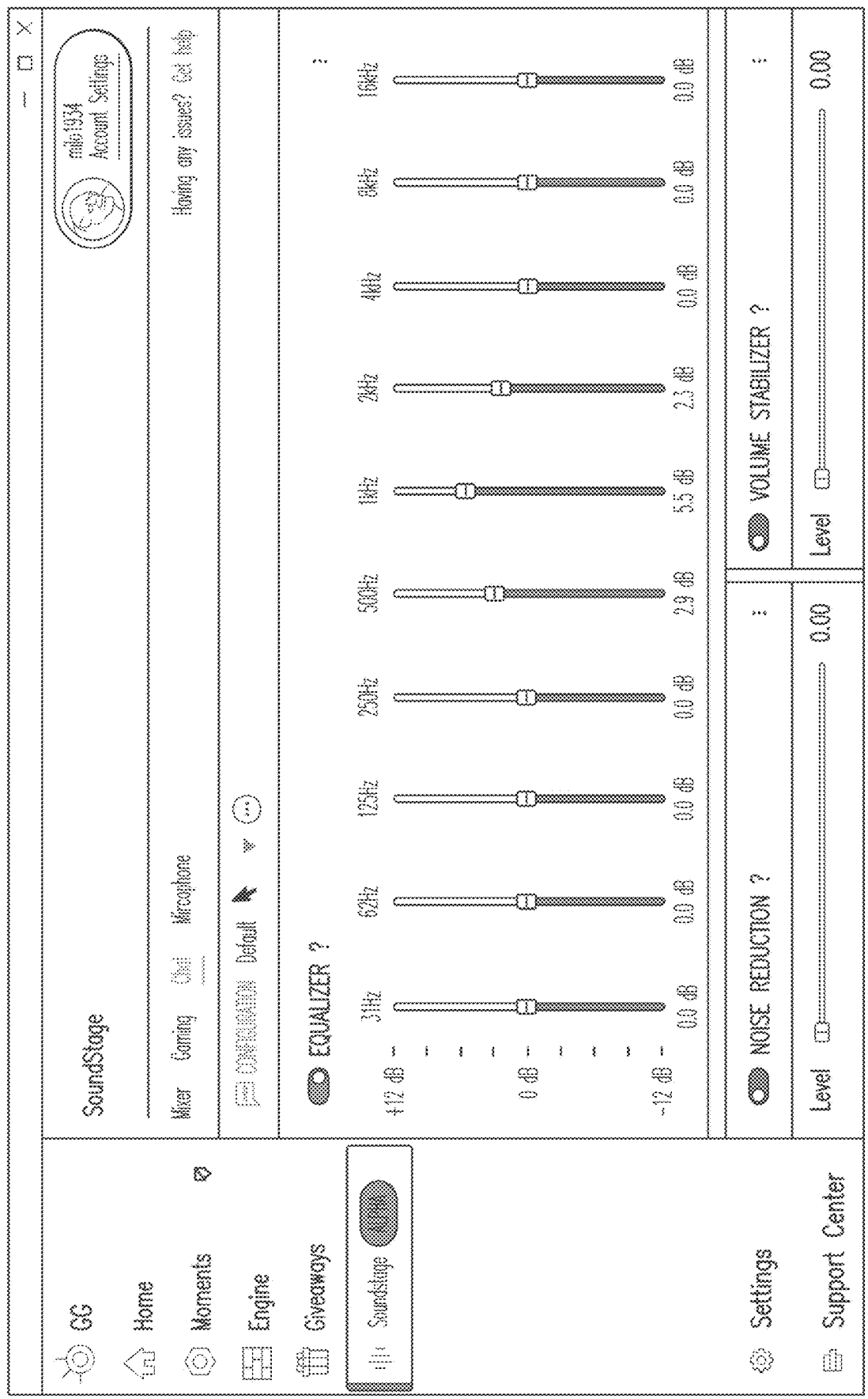
Figures 2, 7N:
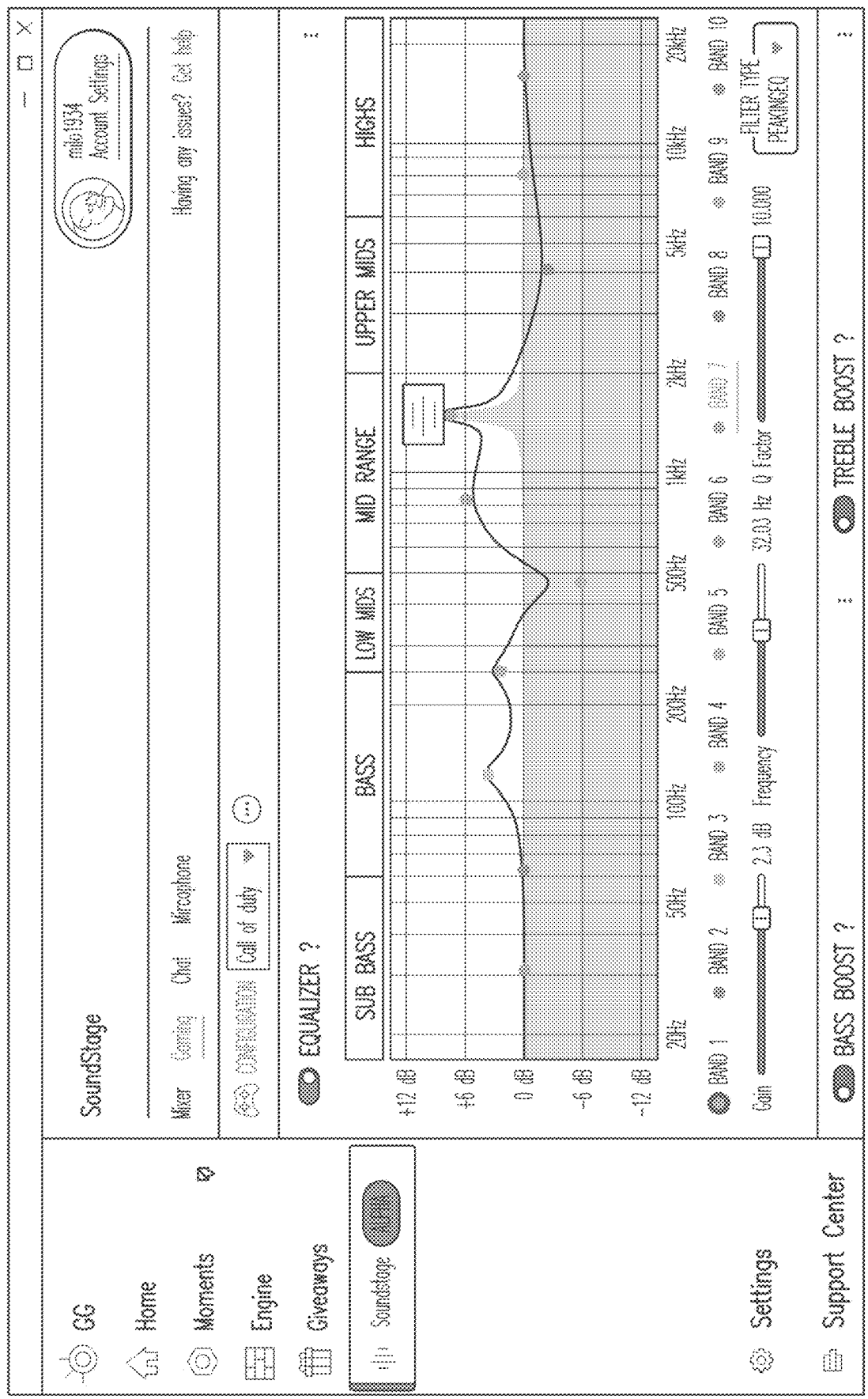
Figures 3, 7N:
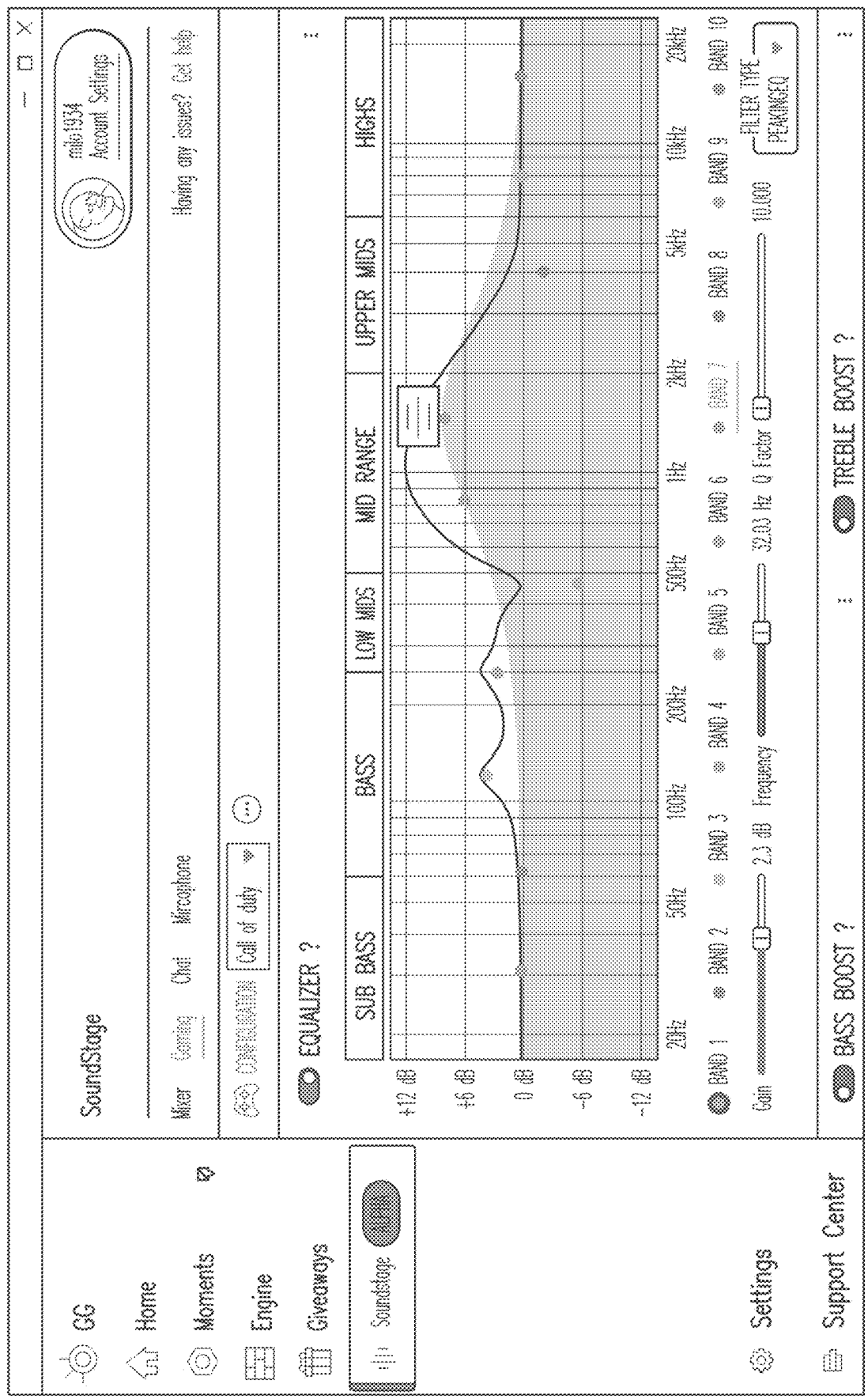
Figure 70:
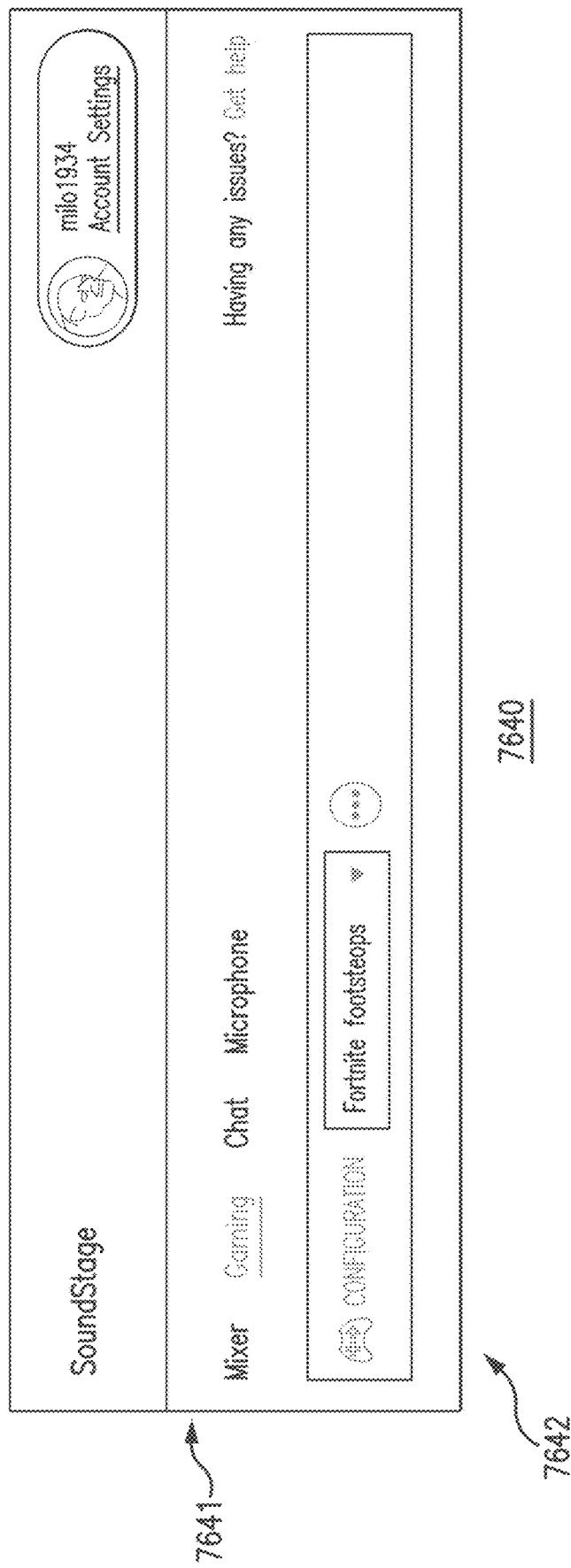

FIG. 7M-2 shows an example of selecting sound input and sound output options in a device with a Windows® operating system. Other devices may be selected through actuation of the pop-up menu of the output selectors 7633. In the illustrated example of FIG. 7M, an Arctis 7 Plus headphone system is selected as the output device for the gaming audio stream, the chat audio stream and the microphone audio stream. Using the output selectors 7633, the user may route the audio streams to different output devices. FIG. 7M-3 illustrates mixing of different audio levels for the gaming audio stream, the chat audio stream and the player's microphone audio stream. FIG. 7N-1 illustrates Thus, the mixer panel 7630 enables separate audio processing for each of the game audio stream, the chat audio stream and the microphone audio stream. By interacting with the graphical user interface including the mixer panel 7630, the user can independently control the volume and audio effects of each of these streams.

FIG. 7N depicts an illustrative embodiment of a parametric equalizer 7635 of the graphical user interface. An equalizer is a tool by which the user can adjust and control the sound to improve audio during gameplay or other situations. The equalizer allows the user to hear more or less of the sound from a specific frequency range. Adjusting each frequency lets the user hear more of what the user wants to hear and less of what does not want to hear.

The parametric equalizer 7635 provides an interactive but easy to use, professional level 10-band parametric equalizer (EQ) for complete customization on the user's gaming audio stream. The gaming audio stream includes the audio stream of game sounds generated by the gaming system to accompany game visuals. For example, the user can lower the sound of explosions produced by the game and increase the important sounds of footsteps and reloading produced by the game so that the user can better understand activities of opponents in game. The parametric equalizer allows the user to boost or cut the sound over custom frequency bands according to a set of parameters, giving precise control. In particular, for a selected frequency band, the user can select the center frequency, the amplitude, the bandwidth and the filter type. Any tuning will be applied to the user's sound and visible on the graph on the fly or substantially in real time. In some embodiments, the tuning will affect only the game audio stream. Other audio streams won't be affected.

The graphical user interface allows the user to interact with the display on a display screen of the user's device using a mouse or other accessory. In the parametric equalizer 7635, the center frequency can be shifted by the user to any value between 20 Hz and 20 kHz by dragging on the graph one of the available band dots or by selecting a band (from 1 to 10) and then using the frequency slider. Once selected, the amplitude of the band can be tuned up to +12 dB or down to −12 dB directly on the graph or with the gain slider.

In the graphical user interface illustrated in FIG. 7N, the user may select one of the dots corresponding to a frequency band or filter and adjust the gain applied by a respective filter by dragging the dot up or down vertically on the display screen. A value higher on the screen corresponds to a higher gain for that filter. The continuous line in the graphical user interface shows the actual frequencies that are being applied or curves out between the dots. Selecting the dots allows the user to move the line. Curve smoothing is applied between adjacent dots to create a smooth frequency curve. FIG. 7N-1 illustrates an example of adjusting the parametric equalizer 7635 for the chat audio stream to improve the intelligibility of teammates speech conveyed to the user over the chat audio stream.

In the illustrated embodiment, the parametric equalizer 7635 includes a parameter selector 7636, an equalization selector 7637 and a filter type selector 7638. The parametric equalizer 7635 implements a series of filters for controlling audio processing. Using the features of the parametric equalizer 7635, the user can independently adjust the gain, frequency, quality (Q) factor and apply audio filters for up to 10 data points or frequency bands to customize the game audio.

The parameter selector 7636 enables the user to select a parameter to control on the graphical user interface. The user interface is divided into a series of frequency bands of the audible spectrum. In the example of FIG. 7N, the frequency bands are centered at 20 Hz, 50 Hz, 100 Hz, 200 Hz, 500 Hz, 1 kHz, 2 kHz, 5 kHz, 10 kHz and 20 kHz. These center frequencies are exemplary only. Center frequencies may be selected to emphasize certain regions of the audible spectrum, such as relatively low frequencies. The selection may be based on the particular audio content of the game being played or some aspect of the game being played. For example, in a game involving players walking and shooting, relatively low frequency sounds carry substantial information that is useful to the gamer to understand unseen action of the game.

In the illustrated embodiment, the user can separately control the gain of a selected frequency band. Each respective frequency band corresponds to respective filter of the series of filters that form the parametric equalizer 7635. In the illustrated example, a frequency slider is actuated to select a frequency at 32.03 Hz and a gain slider is selected to adjust the gain at 32.03 Hz to a value of 2.1 dB. Moreover, a Q factor slider may be actuated to adjust the Q factor of each respective filter. The Q factor slider adjusts the Q factor value for each individual filter. The Q factor is related to the breadth of frequencies modified by the filter. A narrow filter bandwidth corresponds to a smaller Q factor value and means the gain is being applied to a smaller range of frequencies. A broader filter bandwidth corresponds to a larger Q value.

Once a frequency band is selected, the bandwidth of the frequency band can be widened or narrowed with the Q factor slider. Generally, the amplitude is inversely related to the Q Factor. In a gaming context, the Q factor is generally useful for three types of filters, including a peak filter, a notch filter and a band pass filter. For these filters, the higher the value of Q factor, the narrower the curve or the bandwidth affected by the filter. A peak filter with a low Q factor will be useful to control the timber of the sound, for example, if the user wants to add bass to give a more powerful sound or feel to a car engine. A peak filter with a high Q factor will be useful to highlight or de-emphasize a certain frequency, for example, if the user wants to highlight a bomb sound in a particular game such as CS:Go.

As noted, the Q factor is a parameter that relates the filter's center frequency to its bandwidth. FIG. 7N-2 illustrates adjustment of a Q factor for a filter with a relatively narrow bandwidth. The Q factor has a value of 10.00. FIG. 7N-3 illustrates adjustment of a Q factor for a filter with a relatively wide bandwidth. The Q factor has a value of 0.5. FIG. 7N-2 and FIG. 7N-3 also illustrate an example in which, as a mouse or other accessory is used to select a filter for adjustment, current values of gain, frequency and Q factor for the selected filter are displayed on the screen near the cursor to simplify adjustment by the user and to increase precision of adjustments by the user.

The filter type selector 7638 allows the user to select among different available filter types for use in the parametric equalizer. Once selected, for each band, the filter type can be chosen in the in a filter type dropdown menu. In the example, filter types available include bypass, lowpass, high pass, peak, low shelving, high shelving filters. Other filter types may be specified including combinations of filters. In a gaming context, a peak filter with a low Q factor, a low shelf filter, or a high shelf filter may be useful to enhance the entertainment feeling for the user. Further, peak filter with a high Q factor and a notch filter may be useful to give a competitive advantage to a gamer in a gameplay situation. In many applications, a band pass filter is not useful during a game session. However, a band pass filter can be very useful to search for the frequency of a specific sound. For example, a user may want to know what frequency is associated with footsteps in the game audio stream. The band pass filter allows the user to listen to only a small frequency region or band of frequencies.

Once the parametric equalizer has been used to establish a set of preferences for audio processing for the gaming audio stream, the chat audio stream and the microphone audio stream, the established values may be stored by the user for subsequent use. The user may store data for a single audio stream, or the user may store data for multiple audio streams. The data may be stored on the user's computer or may be communicated over a network for storage at a remote location such as in the cloud. The data may be retrieved for editing or other modification. In some embodiments, the user may share a profile or configuration with another gamer. This may be done in any convenient manner. Further, the profile or the configuration may be specific to a particular game that the user plays among multiple games. Thus, the user may store a first configuration or profile for the Fortnite game and store a second configuration or profile for the World of Warcraft game.

FIG. 7O illustrates an exemplary embodiment of a graphical user interface in which the user may apply a predetermined configuration or profile to a respective audio stream. The graphical user interface includes a configuration selector 7640. The configuration selector 7640 includes an audio stream selector 7641 and a configuration pop-up menu 7642. The user may use the mouse or another accessory to select an audio stream of interest for applying a profile or configuration. In the example embodiment, the user may select the mixer, the gaming audio stream, the chat audio stream or the microphone audio stream for application of a configuration. Once the audio stream of interest is selected, the user may use a pop-up menu to select a predetermined profile or configuration for the selected audio stream. In the example, for the gaming audio stream, the user has selected a configuration titled "Fortnite footsteps" which may include data defining a set of audio settings for the parametric equalizer that improve the clarity of footsteps heard by the user in the game play. Adjusting the frequency, gain and Q factor of a set of filters may greatly improve the user's ability to discern footsteps during gameplay.

Thus, using the graphical user interface, the user may create, duplicate, edit and delete configurations for each unique audio stream. This allows the user to change audio stream effects with just one touch to select a predetermined configuration, without having to again select each specific filter setting. In embodiments, the configurations can be set up and applied to each separate audio stream to maximize the personalization for each gamer.

In some embodiments, the audio processing system will automatically retrieve and implement a user's configurations when a game is launched by the user. For example, the user provides identification information such as logging in to a game application or web site. Based on the identification information or other information the user provides, the audio processing software may select the user's pre-stored configurations for the game. In some embodiments, the process of retrieving the user's pre-stored configurations may be done automatically based on user information or other information. In other embodiments, the user may be prompted to select a set of configurations or a profile. In still other embodiments, the user may have to actively locate and apply the user's pre-stored set of configurations for a game or the user's profile for the game.

In other examples, a group of pre-set configurations may be made available to users for some games, or to some users of some games. For example, the manufacturer may design a set of profiles or configuration files that a user may access and select for application to the user's audio processing system. Access to the pre-set configuration files may be on a subscription basis for example. Further, gamers may prepare and store in a common location a library of profiles or configurations for different games and different preferences. The stored profiles may be retrieved, modified and improved by members of a gamer community to enhance the enjoyment of the group.

Figure 7P:
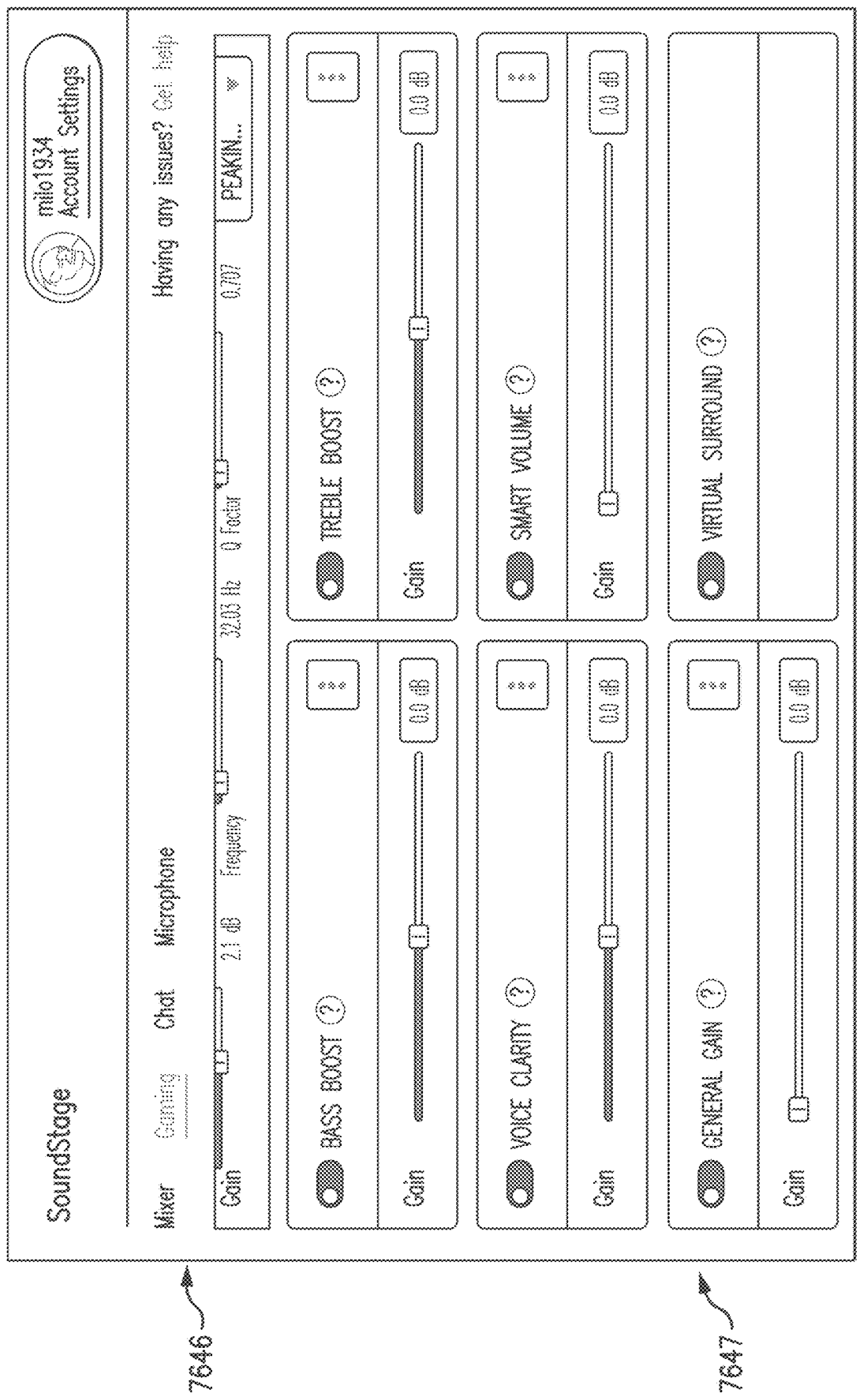

FIG. 7P illustrates an exemplary embodiment of a graphical user interface in which the user may apply basic audio rendering presets for quick and easy audio effects applied to each individual audio stream. The graphical user interface includes a gaming audio render effects selector 7645. The gaming audio render effects selector 7645 in the example includes an audio stream selector 7646 and an audio adjustment panel 7647. Other examples may include other adjustments or features.

The audio stream selector 7646 allows the user to select an audio stream for application of the audio rendering presets. In the example, the user may select between the mixer, the gaming audio stream, the chat audio stream and the microphone audio stream.

The audio adjustment panel 7647 includes a set of sliders that may be actuated by a user with a mouse or other accessory. Each of the sliders is associated with an audio adjustment. Each of the sliders is also associated with an on-off selector that may be actuated by the user on the graphical user interface to enable or disable particular audio adjustments. In the example embodiment, the available audio adjustments include bass boost, treble boost, voice clarity, smart volume, general gain and virtual surround.

Tuning the bass boost audio adjustment allows the user to boost or cut low frequencies. In an example, the bass frequencies are around 80 Hz. This may have the effect of making more or less audible deep, low frequency sounds in the gaming audio stream such as explosions and engines. The bass boost audio adjustment can be tuned through the slider in a range from +12 dB to −12 dB in the example.

Tuning the treble boost audio adjustment allows the user to boost or cut high frequencies. In an example, the treble frequencies are around 8000 Hz. This may have the effect of making more or less audible high frequency sounds in the gaming audio stream like footsteps, gunshots or whistles. For example, this can give the user a real advantage in shooting games. The treble boost can be tuned through the slider in a range from −12 dB up to +12 dB in the example.

The voice clarity audio adjustment identifies and treats the dialogs or voices in the audio stream produced by the game. That means that tuning the voice clarity through the slider enables the user to boost or cut the speech in games, movies and incoming communications. The voice boost audio adjustment can be tuned through the slider in a range from −12 dB up to +12 dB in the example.

Some audio streams have very large dynamic range, or the difference between the loudest sounds and the softest sounds. The smart volume audio adjustment automatically makes small adjustments and helps maintain a steady volume in the fame for the user. For example, if the user is constantly adjusting the volume on the user's computer while playing games or listening to music, the smart volume will solve address the problem. The user may tune the impact of this audio effect on your sound through the slider in a range from 0 to 1 in the example.

The general gain audio adjustment simply allows the user to adjust overall sound volume. Such a feature is useful when the audio source volume is low. The general gain audio adjustment can be tuned through the slider through a range from 0 dB up to +12 dB in the example. Also, the general gain audio adjustment does not allow system limits on audio volume or gain to be exceeded.

The virtual surround sound audio adjustment may be used in arrangements that include a stereo device such as a headset, or notebook computer internal speakers. In one embodiment, a multichannel audio stream such as 5.1 channel audio or 7.1 channel audio is available, switching ON the virtual surround audio adjustment re-creates a multichannel three-dimensional audio listening experience over the user's stereo headphones or speakers. When actuated ON, the virtual surround sound audio adjustment operates to virtualize the multichannel game audio stream from the game engine, or any other media content, and mix the audio stream to retrieve a multichannel listening experience over the user's stereo headphones or speakers. On the other hand, if a multichannel audio stream, such as stereo content, is not available, switching ON the virtual surround sound audio adjustment operates to expand the stereo sound for a wider sound stage.

In another example, if the user's audio device is a multichannel device such as a home theater system, and if a multichannel audio stream such as 5.1 channel or 7.1 channel audio is available, switching ON the virtual surround sound audio adjustment will virtualize the multichannel audio stream on left and right speakers. In embodiments, only left and right speakers will output sound. In this situation, it may be preferable not to activate the virtual surround sound audio adjustment since a real surround sound effect is available. In this case, if a multichannel audio stream is not available, such as stereo content, switching ON the virtual surround sound audio adjustment operates to expand the stereo sound for a wider sound stage. Only left and right speakers may output sound in this example.

Figure 7Q:
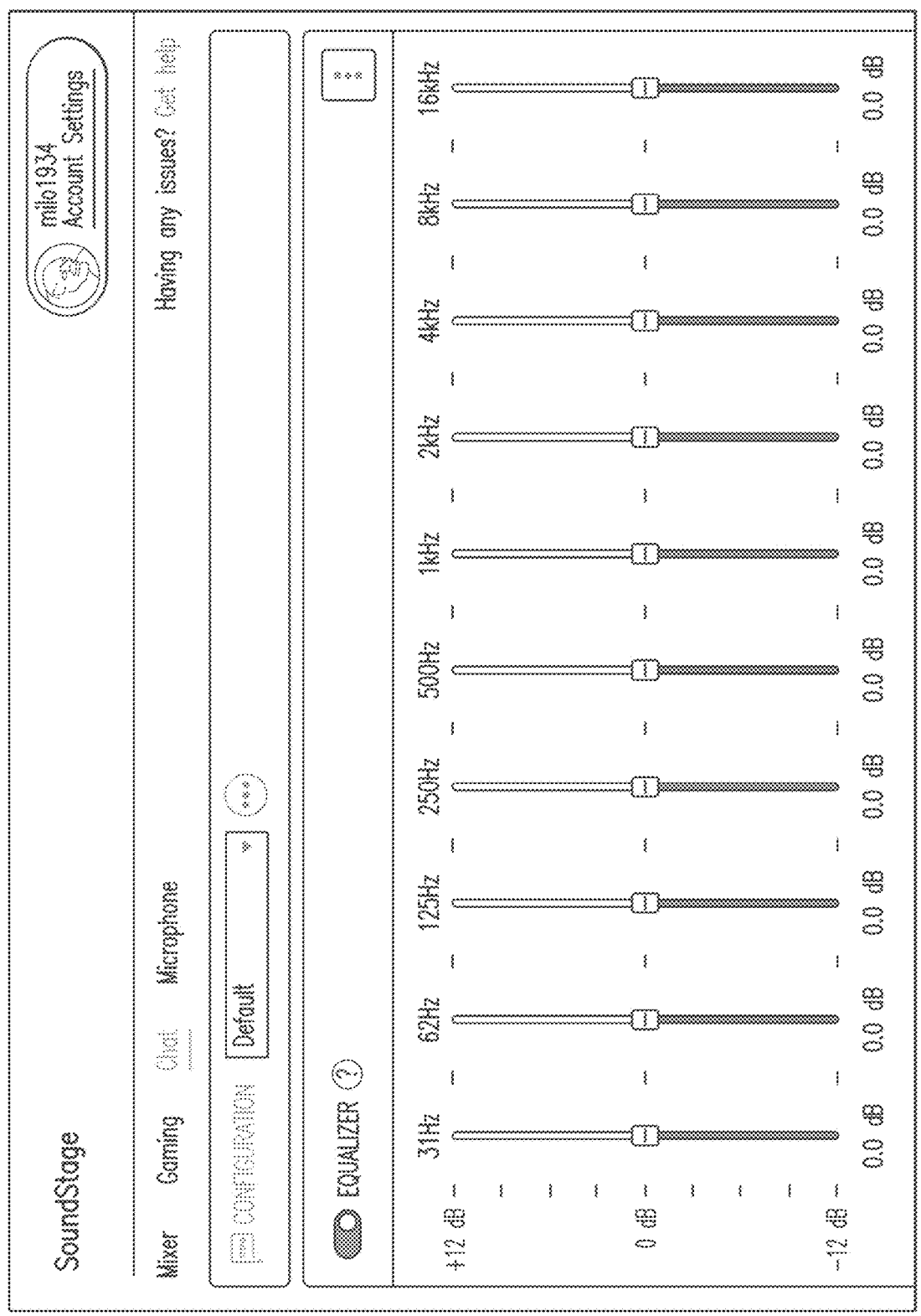

FIG. 7Q illustrates an exemplary embodiment of a graphical user interface including a chat equalizer 7650. The chat equalizer 7650 in the example is embodied as a ten-band graphic equalizer for the team chat audio stream. The chat equalizer 7650 includes an audio stream selector 7651, a series of audio stream controllers 7652. Other embodiments may include other features in addition to those illustrated in FIG. 7Q.

The audio stream selector 7651 allows the user to select an audio stream for application of audio equalization. In the example, the user may select between the mixer, the gaming audio stream, the chat audio stream and the microphone audio stream. The chat audio stream is selected in FIG. 7Q. The chat equalizer allows the user to tailor the audio of the team chat to improve the way in which the user hears teammates or others speaking on the chat audio stream. In a typical embodiment, a game is played on a gaming system with two or more players working together as teammates. Each player has access to a microphone and speakers, such as an integrated headset wearable by the player. The players may use the microphone and speakers to converse with each other or more generally to share speech and non-speech voiced audio. The chat audio stream may include non-speech such as screams or laughter. The audio stream controller 7652 allows the user to adjust gain upward and downward across ten frequency bands.

In the illustrated embodiment, the chat equalizer 7650 includes a configuration selector 7653. The user may create and store one or more configurations or profiles. For example, after the user adjusts the audio stream controller 7652 to tailor sound processing for the chat audio stream according to the user's preferences, the user may save the data that device the current adjustments. The data may be saved as a profile file or configuration file and may be saved locally or remotely. A saved profile may be shared among users or may be part of a library of available configurations. A profile may be retrieved and edited by the user. The configuration selector 7653 in the example includes a pop-up menu that, when actuated by the user, displays available profiles or configurations. In some examples, a profile or configuration may be designated as a default profile and load automatically when the game is started. A profile may be established for a respective game according to user preferences.

Figure 7R:
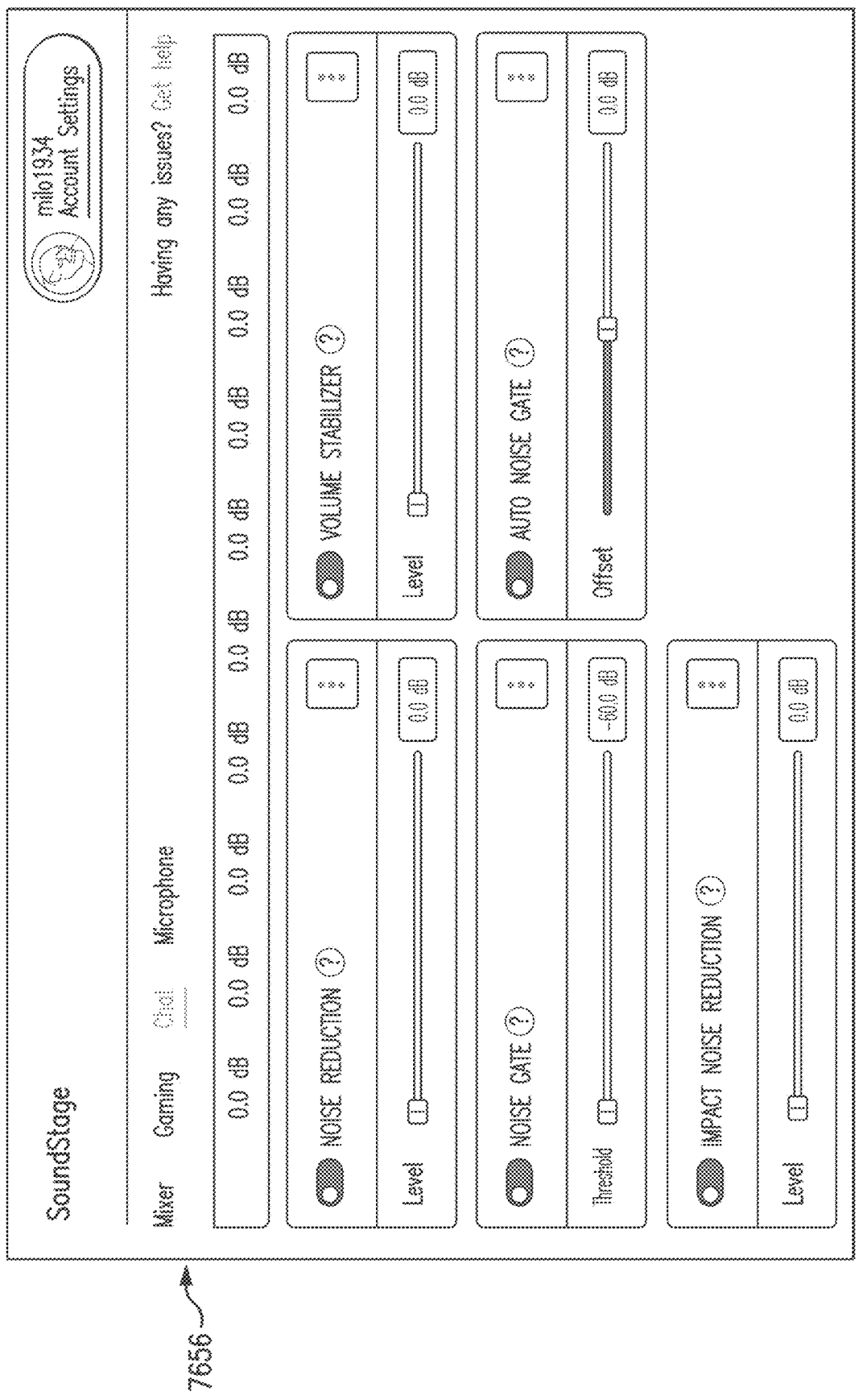

FIG. 7R illustrates an exemplary embodiment of a graphical user interface in which the user may apply basic audio rendering presets for quick and easy audio effects applied to the chat audio stream. The graphical user interface includes a chat audio render effects selector 7655. The chat audio render effects selector 7655 in the example includes an audio stream selector 7656 and an audio adjustment panel 7657. Other examples may include other adjustments or features.

The audio stream selector 7656 allows the user to select an audio stream for application of the audio rendering presets. In the example, the user may select between the mixer, the gaming audio stream, the chat audio stream and the microphone audio stream. In the illustrated example, the chat audio stream is selected.

The audio adjustment panel 7657 allows the user to select and adjust a variety of aspects of the chat audio stream. In the illustrated example, the user has access to a noise reduction audio adjustment, a volume stabilizer audio adjustment, a noise gate audio adjustment, an automatic noise gate audio adjustment and an impact noise reduction audio adjustment.

The noise reduction audio adjustment operates to remove static noise from the user's sound by cleaning up spoken words and sentences. This audio adjustment is particularly useful to remove constant noise like personal computer fans. The user may tune the effect of the noise reduction audio adjustment through the slider from 0, appropriate for a quiet environment, to 1, appropriate for a noisy environment.

The smart volume audio adjustment automatically makes small adjustments and helps maintain a steady volume, particularly when the chat audio stream has a relatively high dynamic range. The smart volume audio adjustment eliminates the need for the user to constantly adjust a computer's volume during gameplay or listening to music. The user may tune the impact of the smart volume audio adjustment on user sound through the slider, over a range from 0 to 1.

For a given a volume threshold, the noise gate audio adjustment operates to cut off any sound behind it. If sound is above a predetermined noise gate threshold, the audio processing system lets pass all the sound. In other words, the sound is allowed through the gate. On the other hand, if the sound is below the predetermined noise gate threshold, the sound does not pass through the gate. The predetermined noise gate threshold can be changed with the threshold slider in the range −60 dB −10 dB. This effect can be particularly useful if the user perceives an annoying or distracting noise which is way behind the conversation level.

For a given volume threshold, the noise gate audio adjustment will cut off any sound behind it. The auto noise gate audio adjustment automatically computes the predetermined noise gate threshold according to detected background noise. In embodiments, the auto noise gate audio adjustment requires the noise gate audio adjustment to be ON, i.e., both audio adjustments must be activated. The auto noise gate audio adjustment operates automatically. However, the user has a layer of control over the auto noise gate audio adjustment with the offset slider which allows the user to apply a gain over a range from −20 dB to +20 dB) on the top of the computed threshold. The auto noise gate is useful if the user needs a noise gate, but the user is uncertain about which threshold to use.

The impact noise reduction audio adjustment operates to detect and suppress impact noises from the user's chat audio stream or input device. The impact noise reduction audio adjustment is useful in reducing the noise coming from sources such as keystroke on a keyboard or noise from mouse clicks.

Figure 7S:
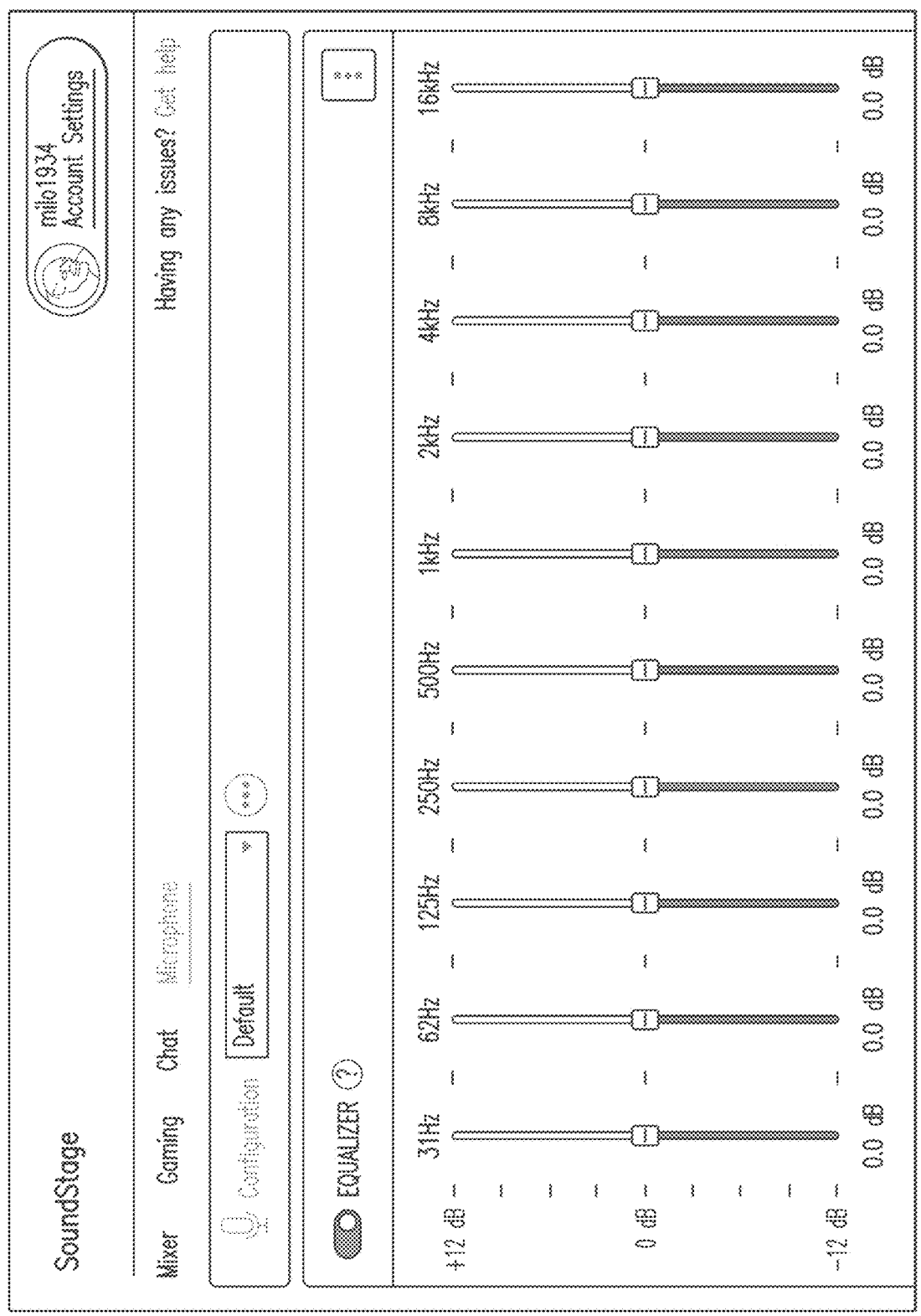

FIG. 7S illustrates an exemplary embodiment of a graphical user interface including a microphone equalizer 7660. The microphone equalizer 7660 in the example is embodied as a ten-band graphic equalizer for equalizing the user's microphone audio stream. The microphone equalizer 7660 includes an audio stream selector 7661 and a series of audio stream controllers 7662. Other embodiments may include other features in addition to those illustrated in FIG. 7S.

The audio stream selector 7661 allows the user to select an audio stream for application of audio equalization. In the example, the user may select between the mixer, the gaming audio stream, the chat audio stream and the microphone audio stream. The microphone audio stream is selected in FIG. 7S. The microphone equalizer allows the user to tailor the audio of the user's microphone provided to the team chat to improve the way in which teammates or others hear the user speaking on the chat audio stream. In a typical embodiment, a game is played with two or more players working together as teammates. Each player has access to a microphone and speakers. The players may use the microphone and speakers to converse with each other in the chat audio which may include non-speech such as screams or laughter. The audio stream controller 7662 allows the user to adjust gain upward and downward across ten frequency bands.

In the illustrated embodiment, the chat equalizer 7650 includes a configuration selector 7663. Similar to profiles for the game audio stream and chat audio stream, the user may create and store one or more configurations or profiles. For example, after the user adjusts the audio stream controller 7662 to tailor sound processing for the microphone audio stream according to the user's preferences, the user may save the data that device the current adjustments. The data may be saved as a profile file or configuration file and may be saved locally or remotely. A saved profile may be shared among users or may be part of a library of available configurations. A profile may be retrieved and edited by the user. The configuration selector 7663 in the example includes a pop-up menu that, when actuated by the user, displays available profiles or configurations. In some examples, a profile or configuration may be designated as a default profile and load automatically when the game is started. A profile may be established for a respective game according to user preferences.

Figure 7T:
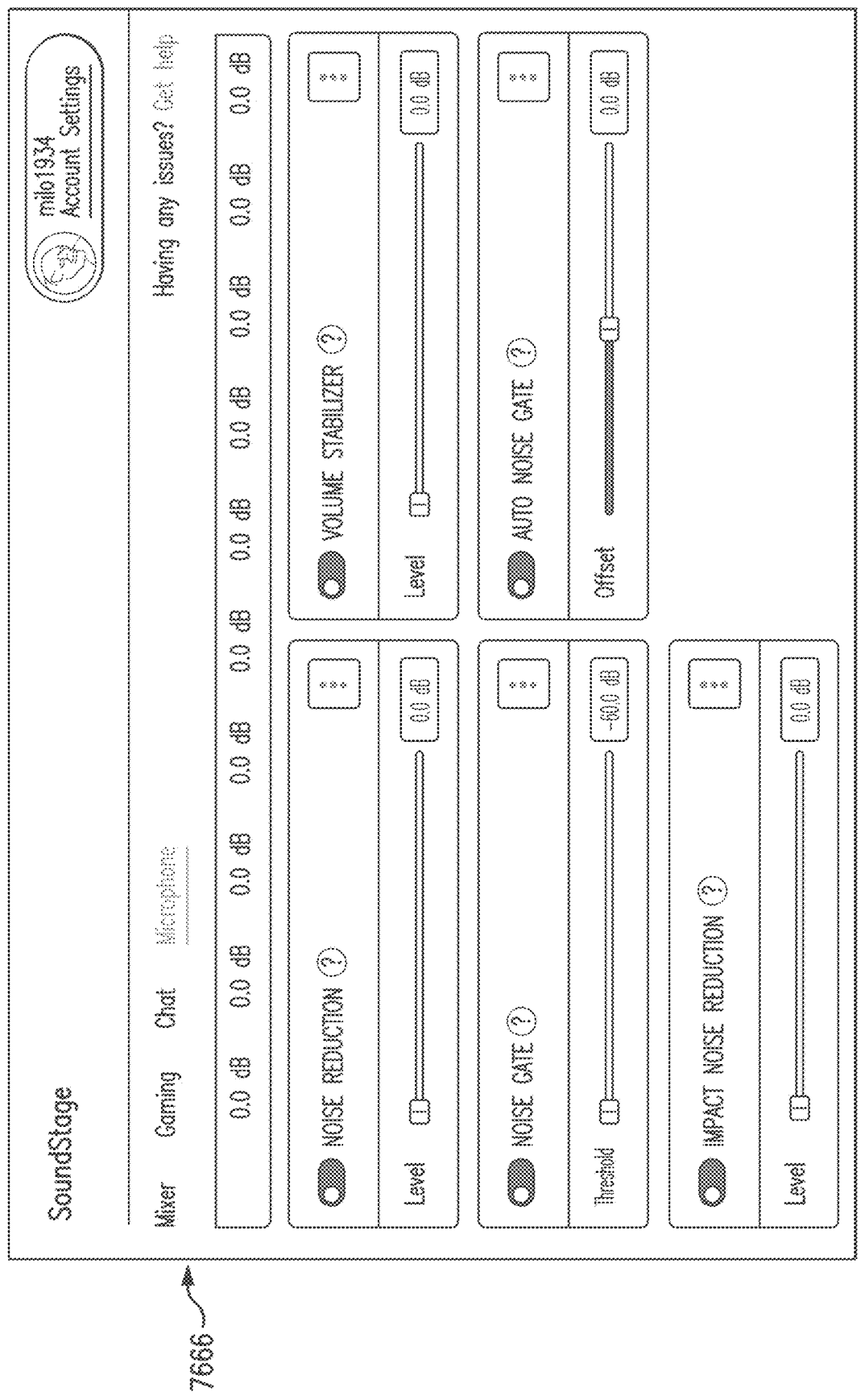

FIG. 7T illustrates an exemplary embodiment of a graphical user interface in which the user may apply basic audio rendering presets for quick and easy audio effects applied to the microphone audio stream generated by the user's own microphone. The microphone audio stream may be shared with teammates, for example, during game play or at other times. In the illustrated example, the graphical user interface includes a microphone audio render effects selector 7655. The chat audio render effects selector 7665 in the example includes an audio stream selector 7666 and an audio adjustment panel 7667. The microphone audio render effects selector 7665 in the exemplary embodiment operates similarly to and includes features like those of chat audio render effects selector 7655 illustrated in FIG. 7R. Other examples may include other adjustments or features.

The audio stream selector 7656 allows the user to select an audio stream among the audio streams processed by the audio processing system for application of the audio rendering presets. In the example, the user may select between the mixer, the gaming audio stream, the chat audio stream and the microphone audio stream. In the illustrated example, the microphone audio stream is selected.

The audio adjustment panel 7667 allows the user to select and adjust a variety of aspects of the microphone audio stream. In the illustrated example, the user has access to a noise reduction audio adjustment, a volume stabilizer audio adjustment, a noise gate audio adjustment, an automatic noise gate audio adjustment and an impact noise reduction audio adjustment.

The noise reduction audio adjustment operates to remove static noise from the audio stream created by the user's microphone by filtering or cleaning up spoken words and sentences. This audio adjustment is particularly useful to remove constant noise like personal computer fans or other persistent noises in the space with the user that might be picked up by the user's microphone. The user may tune the effect of the noise reduction audio adjustment through the slider from 0, appropriate for a quiet environment, to 1, appropriate for a noisy environment.

The smart volume audio adjustment automatically makes small adjustments and helps maintain a steady volume, particularly when the microphone audio stream has a relatively high dynamic range. The smart volume audio adjustment eliminates the need for the user to constantly adjust a computer's volume during gameplay or while listening to music. The user may tune the impact of the smart volume audio adjustment on microphone audio through the slider, over a range from 0 to 1.

For a given a volume threshold, the noise gate audio adjustment operates to cut off any sound behind it. If sound is above a predetermined noise gate threshold, the audio processing system lets all the sound pass. In other words, the sound is allowed through the gate. On the other hand, if the sound is below the predetermined noise gate threshold, the sound does not pass through the gate. The predetermined noise gate threshold can be changed with the threshold slider in the range −60 dB −10 dB. This effect can be particularly useful if the user perceives an annoying or distracting noise which is way behind conversation level.

For a given volume threshold, the noise gate audio adjustment will cut off any sound behind it. The auto noise gate audio adjustment automatically computes the predetermined noise gate threshold according to detected background noise. In embodiments, the auto noise gate audio adjustment requires the noise gate audio adjustment to be ON, i.e., both audio adjustments must be activated. The auto noise gate audio adjustment operates automatically. However, the user has a layer of control over the auto noise gate audio adjustment with the offset slider which allows the user to apply a gain over a range from −20 dB to +20 dB) on the top of the computed threshold. The auto noise gate is useful if the user needs a noise gate, but the user is uncertain about which threshold to use.

The impact noise reduction audio adjustment operates to detect and suppress impact noises from the user's chat audio stream or input device. The impact noise reduction audio adjustment is useful in reducing the noise coming from sources such as keystroke on a keyboard or noise from mouse clicks.

FIG. 7U depicts an illustrative embodiment of a method 7670 utilized in the subject disclosure. The method 7670 may be performed by one or more software routines including data and instructions operating on a processing device such as computing device 206. The method 7670 may be performed on a standalone device of a gamer such as a laptop computer or desktop computer. In other embodiments, the method 7670 may be performed by a device located remotely from the gamer, such as in a cloud network or at a gaming server, and accessible by a gamer device.

At block 7672, the method 7670 includes launching a game such as a video game on a device. As noted, this may be done on a device local to a user by initiating a gaming application, for example. Alternatively, in another example, this may be done by accessing a remote web site over a network, or other network resource, to initiate the game. In addition to games such as video games, block 7672 may include initiating any suitable application program for interaction by a user. The user may be termed a gamer who seeks to play the game or other application being launched. The identify of the gamer may be determined based on login credentials or any other information provided. The identity of the game may be determined based on the particular game selected by the user.

In a subsequent operation, a configuration file or user profile is retrieved for use during operation of the game. At block 7674, the method 7670 includes identifying the game and, at block 7676, retrieving a profile associated with the particular game. The identity of the game determined in block 7674 may be used to select and retrieve the configuration file at block 7676. In a parallel path, block 7674' includes identifying the gamer and block 7676' includes retrieving a profile associated with the particular gamer. The identity of the gamer determined in block 7674' may be used to select and retrieve the configuration file at block 7676'. Thus, the profile or configuration file that is retrieved may be keyed to or based on identity of the game launched at block 7672 or the gamer or other user responsible for launching the game. In some examples, the profile or configuration file that is retrieved may be based on both the identity of the gamer and the identity of the game. For example, a particular gamer may have several configuration files stored for different games. The particular configuration file retrieved may be the file for this particular gamer and this particular game. Selection of a particular configuration file may thus be done automatically. In other examples, the selection of a particular configuration file may be done manually by the gamer or other user.

The profile or configuration file or data retrieved at block 7676 or block 7676' may contain any suitable information for customizing the operation, performance or other features of the game. In a particular example, the retrieved profile includes one or more settings for controlling audio processing of one or more live game output audio streams from the game. In some embodiments, the game audio stream includes or is separated into three streams including a gaming audio stream, a gamer chat audio stream and a gamer microphone audio stream. The retrieved profile may include settings for one, two or all three of these streams. In some embodiments, a method or apparatus may include providing the audio streams to a parametric equalizer such as is illustrated in FIG. 7N or other audio processing systems. The data contained in the profile retrieved at block 7676 or block 7676' may contain settings for the parametric equalizer, including filter type, frequency, gain and Q settings, for example. Any other suitable information for controlling audio processing in one or more audio streams may be stored in and retrieved with the configuration file or profile. The data in the configuration file or profile may be stored in any suitable format.

In a first example, the data in the configuration file or profile may include settings or customizations established by the gamer. For example, during previous game play, the gamer may access audio processing features such as the parametric equalizer shown in FIG. 7N to customize particular filters settings or other audio information, such as individual gains for individual frequency bands. The user interface may include graphical user interface elements that may be adjusted by actuation by the user with a mouse, for example. Such graphical user interface elements may be adjusted by the user to establish audio processing settings to customize the audio streams for the particular gamer. The gamer may in turn save those in the configuration file. The configuration file can be stored for subsequent access when the game is initiated in the future.

In a second example, retrieving the profile or the configuration file at block 7676 or block 7676' may include retrieving a standard configuration file including standard audio modifications to a gaming audio stream of the gaming application. For example, the data in the configuration file or profile may include settings representing game-specific standard audio modifications to the audio stream, based for example on the identity of the game launched at block 7672. The standard audio modifications may be established in any suitable manner, such as by a developer of the game, a developer of gaming accessories, by users or gamers, etc.

At block 7678, live game output is received. In exemplary embodiments, block 7678 may include receiving a plurality of game audio input streams from a video game. In the illustrated embodiment, the plurality of audio input streams includes a game output audio stream, a gamer chat audio output stream and a microphone audio output stream. In other embodiments, additional or alternative audio streams may be received. Further, in other embodiments, the received audio streams may originate in a source other than a video game, such as an application program running on the user device or over a network. The received audio stream may include multiple audio streams and block 7678 may include a process of separating the received audio stream into constituent elements. In this example, the game output audio stream includes game sounds such as explosion sounds, sounds of footsteps, music and other sounds tied to the activity occurring in the video game. The gamer chat audio output stream includes spoken audio shared among a group of gamers participating in the game together such as on a team. The gamer chat may include spoken words of speech in multiple languages as well as non-speech sounds such as laughter, shouts or screams. The microphone audio output stream includes spoken audio of a local gamer that is to be shared with other gamers, such as part of the gamer chat. For example, the microphone audio may include spoken words of speech in one or more languages as well as non-speech sounds such as laughter and shouting.

At block 7680, method 7670 includes applying the profile or configuration profile retrieved at block 7676 or block 7676' to the audio streams. This may be done in any suitable form, according to the data contained in the profile or configuration file and according to the audio processing provided for the audio streams. In one example, the configuration file includes settings to control or customize an audio equalizer to modify the audio streams according to user preferences. The settings may operate to improve voice intelligibility, for example, in the gamer chat audio stream, or to modify a gamer's voice in the microphone audio stream. in another example. The settings may control destination of one or more audio streams, such as directing an audio stream to a headset worn by the gamer. The result of block 7680 is a set of one or more processed audio streams.

At block 7682, the processed audio streams are provided to equipment of the gamer and other destinations. In the example, the processed game output audio stream and the processed gamer chat audio stream are provided to selected audio equipment of the gamer specified by one or more audio settings. In an example, the gamer wears a headset with earphones and microphone. The processed game output audio stream and the processed gamer chat audio stream are provided to the earphones of the headset. The processed microphone audio stream received from the headset is provided to other gamers, such as part of the gamer chat heard by the other gamers.

At block 7684, the method 7670 includes providing a graphical user interface or GUI on a display device of a gamer. Any suitable GUI may be provided. One example of a suitable GUI is illustrated in FIGS. 7M through 7T. In exemplary embodiments, the GUI includes a parametric equalizer user interface. Further, the parametric equalizer user interface may allow selection between different input audio streams such as the game output audio stream, the gamer chat audio stream and the microphone audio stream from the microphone of the gamer. The GUI may be displayed on any suitable device for viewing by the gamer, such as a computer display, touch sensitive screen, portable device or others.

Further, the GUI may enable interaction by the gamer and actuation of aspects of the GUI. For example, the gamer may use a mouse or other accessory to interact with various controls of the GUI. Such controls may include slider controls that can be selected and actuated by the mouse or other accessory under control of the gamer. Such controls may include any visual element that may be displayed on the screen and clicked or dragged or otherwise interacted with by the user, either directly on a touch-sensitive screen or indirectly through an accessory such as a mouse.

In an example, the GUI displays a graphic equalizer or parametric equalizer. An embodiment is shown in FIG. 7N. In producing the graphic equalizer, the GUI provides on the display device a plurality of frequency bands, in this example labelled Band 1 through Band 10. Each respective frequency band has a user-selectable center frequency and a user selectable gain. The gamer may use a mouse or other accessory to drag or slide graphical features of the GUI to define the user-selectable center frequency and gain for each respective frequency band. The user interactions with graphical elements displayed on the display device generate data by the GUI which may be interpreted to adjust settings for audio processing. In an example, each frequency band corresponds to a filter provided in conjunction with the GUI to process the audio streams. The interaction by the gamer with the GUI operates to adjust filter settings for the filters of the frequency bands. The output audio streams, including the game audio stream, the game chat audio stream, and the microphone audio stream, may then be modified according to the filters. In other examples, the GUI enables the gamer to select a filter type for each filter, such as high pass or bandpass filter, and to select other filter characteristics such as a filter Q factor.

The display produced by the GUI in block 7684 may be sensitive to the current context of user interaction. For example, the user may select a visual element of the GUI to adjust audio processing settings for the game audio channel. Responsive to this selection, the GUI may display a graphical equalizer, such as displayed in FIG. 7N, with current settings displayed in a graphical format and with selectable elements highlighted. The selectable elements may be presented in different colors, different text fonts, with particular visual effects such as flashing or strobing, etc., in order to improve visibility and functionality of the GUI to adjust settings by the gamer.

In another example of context sensitivity, FIG. 7O illustrates an exemplary embodiment of a GUI in which the user may select a predetermined configuration or profile to a respective audio stream. The GUI displays a set of possible input streams and a pop-up menu for selecting a previously established configuration of audio settings. In the example, the previously established configuration of audio settings is designated Fortnite footsteps to indicate audio settings which have been tailored to accentuate or optimize the ability of the gamer to hear footsteps of an opponent when playing the video game Fortnite. In other examples, the gamer may establish settings and save the settings as a particular configuration file or profile for subsequent retrieval and application through the GUI. Moreover, a retrieved configuration file may be edited using the GUI to adjust the settings of the configuration file, such as individual filter center frequencies or gain values.

The images and information displayed on the GUI may be varied and tailored to the particular context in which the game or gamer are currently operating. In a further example, FIG. 7P illustrates an example of providing, by the GUI on the display device of the gamer, an audio render effects selector for actuation by the gamer to activate and adjust one or more audio effects of an audio stream. In this example, the GUI includes or provides user selectable control over one or more of a bass boost adjustment, a treble boost adjustment, a voice clarity adjustment, a smart volume adjustment, a general gain adjustment and a virtual surround sound adjustment. Each adjustable feature includes a slider that may be selected and actuated by a user to enable and adjust the amount of gain or other audio processing effect. Other examples may be provided, as well, in accordance with other embodiments. The GUI further includes and audio stream selector to select among the gaming audio stream, the gamer chat audio stream and the microphone audio chat.

Thus, in embodiments, the GUI may include an audio mix panel configured to receive audio adjustments for each audio stream of the plurality of audio streams and including a plurality of selectable views for user interaction by the gamer to modify audio processing of each audio stream of the plurality of audio streams. In examples, the plurality of selectable views includes a parametric equalizer, and an audio render effects selector for each audio stream of the plurality of audio streams.

At block 7688, the method 7670 includes receiving gamer audio processing settings from the local gamer. The audio processing settings include data and information for processing one or more of the audio streams received at block 7672. In some embodiments, the audio processing settings may include parametric filter inputs, such as illustrated in FIG. 7N to control gain and other functions a selected frequency ranges across portions of the audible spectrum. In some embodiments, the audio processing settings may include respective volume control settings for the respective audio output streams received at block 7678. In some embodiments, the received audio input settings may include a quality (Q) factor value for one or more filters. In some embodiments, the received audio input settings may include control settings to selectively communicate the respective audio streams received at block 7678 with respective audio devices of the gamer, such as a headset, built-in stereo speakers, a remote speaker system, and others. Any suitable audio processing that may be performed on the audio streams received from the gaming system may be controlled through the audio processing settings received at block 7688.

After receipt of the user input in the form of gamer audio processing settings at block 7688, control returns to block 7680. At block 7680, the audio streams received at block 7678 are processed according to the audio processing settings received at block 7688. Such processing may include adjusting gain values for selected frequencies, adjusting filter response for selected frequencies, adjusting audio volume, as well as adjusting factors such as reverberation or echo. The processes of method 7670 continue during game play.

Figure 7V:
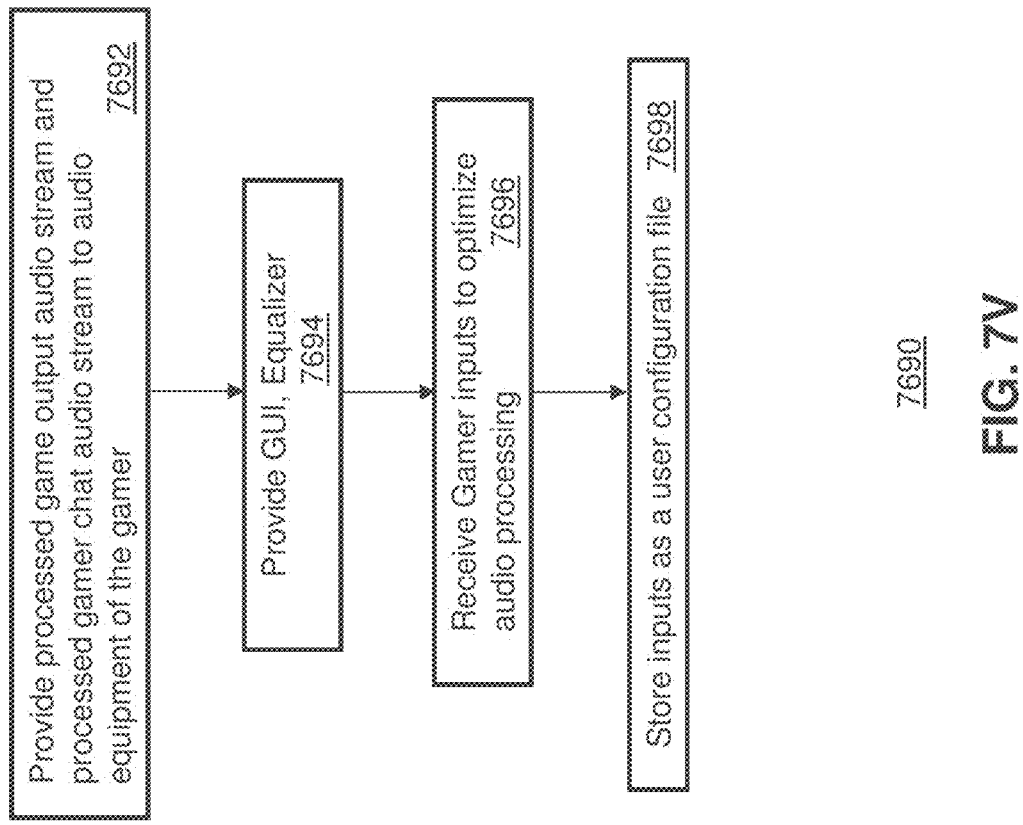

FIG. 7V depicts an illustrative embodiment of a method 7690 utilized in the subject disclosure. In the method 7690, a user may modify or customize audio processing settings for live game audio output and store the modified settings for subsequent access and user. At block 7692, audio from a game or other source is provided to audio equipment of a game player or other user. Block 7692 may incorporate aspects of features of block 7682, FIG. 7U, discussed above. For example, the live game audio output may include one or more audio streams separately controllable by the user. At block 7694, a graphical user interface (GUI) may be provided on a display device of a user such as a computer display. Features of the GUI may be actuated by the user to control or customize the game output audio stream provided at block 7692. In some examples, the GUI may include an audio spectrum equalizer such as a parametric equalizer. Block 7694 may incorporate aspects of features of block 7684, FIG. 7U, discussed above.

At block 7696, gamer or user inputs are received to modify or optimize audio processing. For example, the gamer may use a parametric equalizer provided at block 7694 to customize a game audio stream so that the sound of another player's footsteps is more readily recognizable. This may give the player and advantage during competitive game play. In a further example, the gamer may choose to drastically modify aspects of the gamer's own microphone audio so that the gamer's voice appears to have a very different age or gender or accent. Any other suitable gamer inputs may be received. Block 7696 may incorporate aspects of features of block 7688, FIG. 7U, discussed above.

At block 7698, the gamer inputs received at block 7696 may be stored as a user configuration file. Storage may be in any suitable format or manner. If a profile or configuration file was previously retrieved containing gamer settings, that file may be updated and stored for future use. In another example, rather than update or overwrite an existing file, the user configuration file may be written to a new location with, for example, a different file name so that the previous configuration file and the current configuration file remain available for future use.

The configuration file may be written to any suitable location at block 7698. In a first example, the configuration file or user profile is written locally to the device of the gamer or other user. In a second example, the configuration file is written to a remote location over a network, including the public internet. The configuration file may be stored in a cloud of network elements such as servers accessible over the network. In a third example, the configuration file may be shared with other gamers. For example, a central location may be maintained by a group of gamers such as teammates. They may store shared information such as configuration files in the central location. The shared configuration files become available for others to use, adopt, experiment with, edit and modify and further share as a commonly available resource.

While for purposes of simplicity of explanation, the respective processes are shown and described as a series of blocks in FIGS. 7U and 7V, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 8:
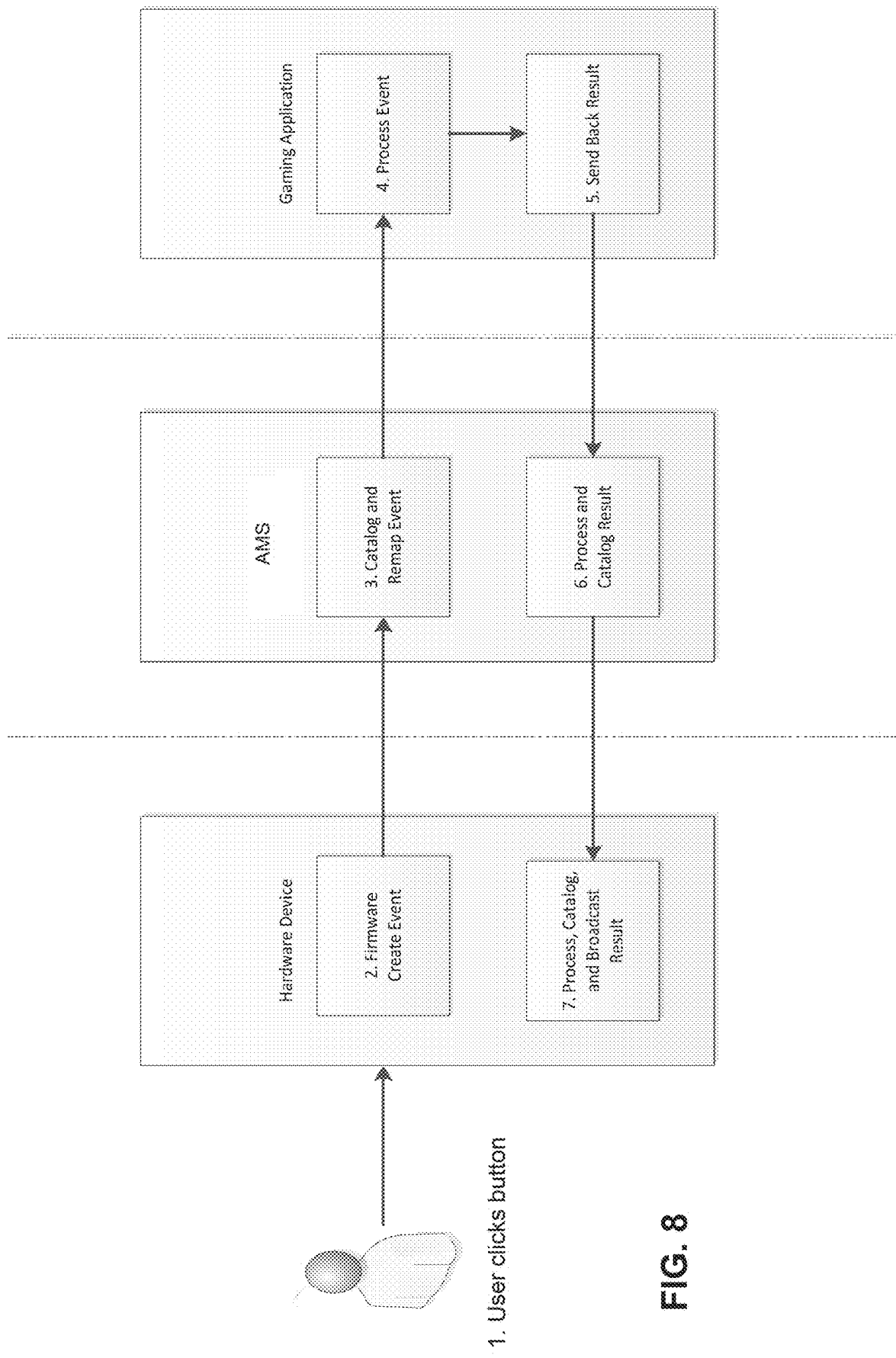
FIG. 8 depicts an illustrative embodiment of a system operating at least in part according to the methods of FIGS. 5-7.
Figure 9:
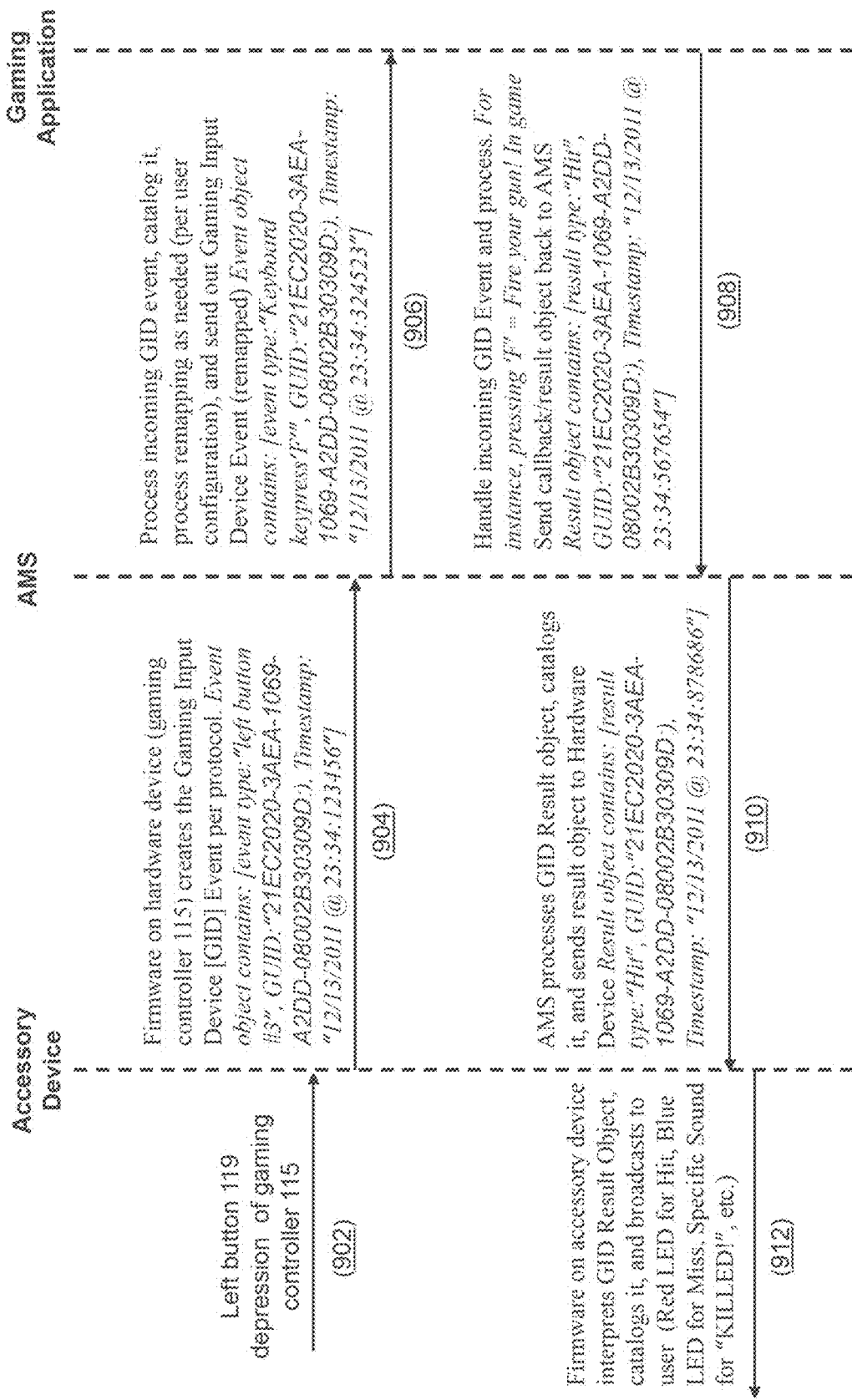
FIG. 9 depicts an illustrative embodiment of a communication flow diagram utilized by the system of FIG. 12.

FIGS. 8-9 illustrate embodiments of a system with a corresponding communication flow diagram for correlating stimulations and gaming action results. In this illustration a user clicks the left button 119 of the gaming controller 115. The gaming controller 115 can include firmware (or circuitry), which creates an event as depicted by event 2 in FIG. 8. The button depression and the event creation are depicted in FIG. 9 as steps 902 and 904. In step 904, the firmware of the gaming controller 115 can, for example, generate an event type "left button #3", and a unique GUID with a time stamp which is submitted to the AMS application. Referring back to FIG. 8, the AMS application catalogues event 3, and if a substitute stimulation has been predefined, remaps the event according to the substitution. The remapped event is then transmitted to the gaming application at event 4. Event 3 of FIG. 8 is depicted as step 906 in FIG. 9. In this illustration, the AMS application substitutes the left button #3 depression stimulus with a "keyboard 'F'" depression which can be interpreted by the gaming application as a fire command. The AMS application in this illustration continues to use the same GUID but substitutes the time stamp for another time stamp to identify when the substitution took place.

Referring back to event 4, the gaming application processes the event and sends back at event 5 a game action result to the AMS application which is processed by the AMS application at event 6. The AMS application then submits the results to the accessory at event 7. Events 4 and 5 are depicted as step 908 in FIG. 9. In this step, the gaming application processes "F" as an action to fire the gamer's gun, and then determines from the action the result from logistical gaming results generated by the gaming application. In the present illustration, the action of firing resulted in a hit. The gaming application submits to the AMS application the result type "Hit" with a new time stamp, while utilizing the same GUID for tracking purposes. At step 910, the AMS application correlates the stimulation "left button #3 (and/or the substitute stimulation keyboard "F") to the game result "Hit" and catalogues them in memory. The AMS application then submits to the accessory (e.g., gaming controller 115) in step 910 the game action results "Hit" with the same GUID, and a new time stamp indicating when the result was received. Upon receiving the message from the AMS application, the accessory in step 912 processes the "Hit" by asserting a red LED on the accessory (e.g., left button 119 illuminates in red or other LED of the gaming controller 115 illuminates in red) to indicate a hit. Other notification notices can be used such as another color for the LED to indicate misses, a specific sound for a hit, or kill, a vibration or other suitable technique for notifying the gamer of the game action result.

Upon reviewing the aforementioned embodiments, it would be evident to an artisan with ordinary skill in the art that the embodiments of the subject disclosure can be modified, reduced, or enhanced without departing from the scope of the claims described below. For example, the AMS application can be executed from an accessory 115 or computing device 206 to perform the embodiments described in the subject disclosure. The AMS application can also be operated from a remote server ("cloud services"). In yet another embodiment, functions of the AMS application can be distributed between devices. In yet another embodiment, the AMS application can be configured to track the performance of a gamer and adapt a threshold as the gamer improves or declines in performance.

For instance, as a gamer's performance improves with a particular gaming action, the threshold associated with the gaming action can be adapted to be less sensitive in detecting an over usage state. Similarly, the sensitivity of the threshold can be increased to promptly identify an over usage state of a gaming action if the gamer's performance declines as a result of an over usage of the gaming action. Additionally, the AMS application can be adapted to add gaming actions to an exclusion table when the gamer's performance substantially improves as a result of using the gaming action being excluded. The exclusion table can also be changed by the AMS application by removing a gaming action from the exclusion table responsive to its excessive use causing a decline in a gamer's performance.

Other embodiments can be applied to the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
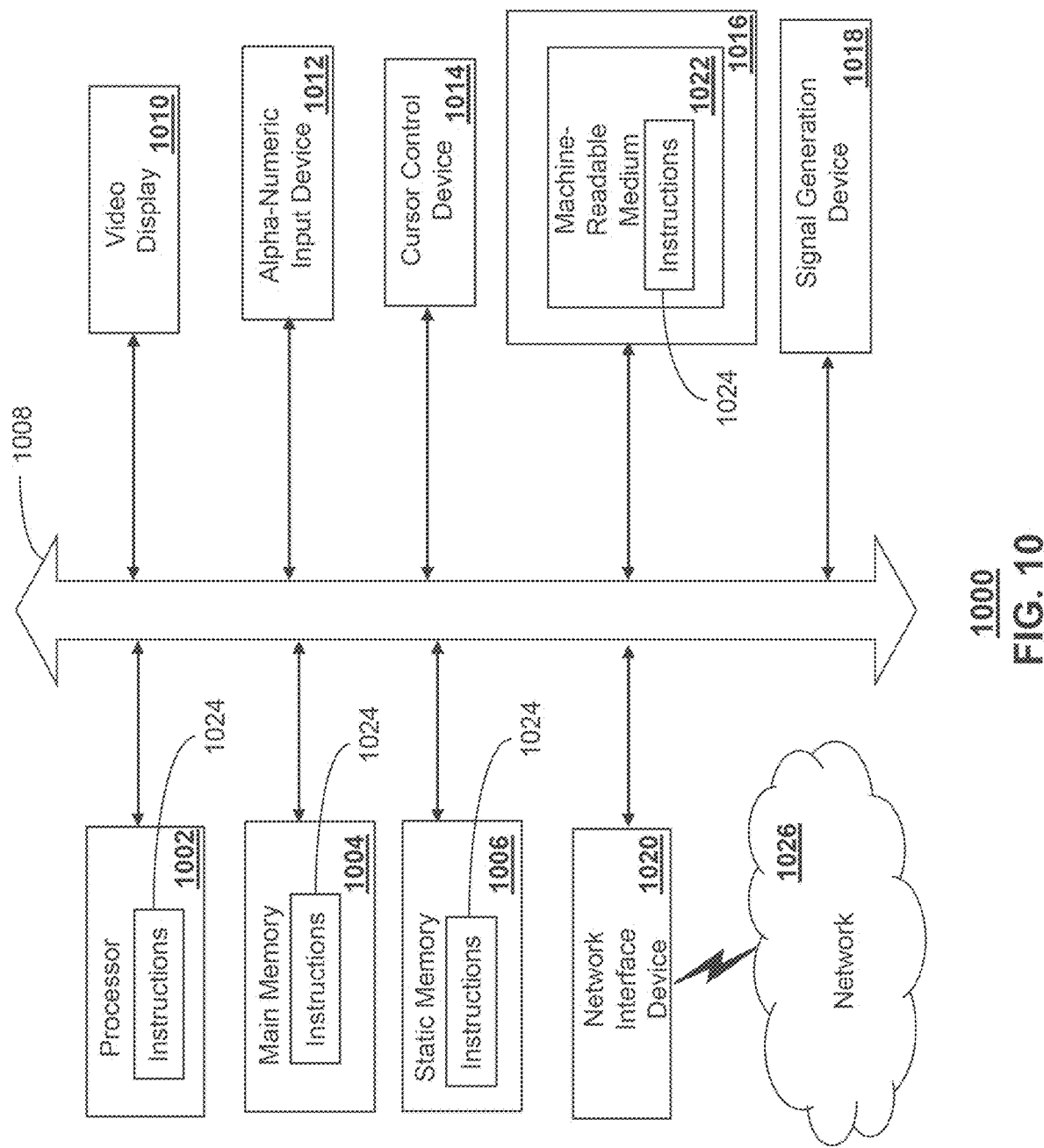
FIG. 10 depicts an illustrative diagrammatic representation of a machine in the form of a computer system within which a set of instructions, when executed, may cause the machine to perform any one or more of the methodologies disclosed herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as an accessory, computing device or combinations thereof. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid-state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software or instructions 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, Wi-Fi, Zigbee®), and long-range communications (e.g., WiMAX, GSM, CDMA, LTE) can be used by computer system 1000.

FIG. 13 depicts system 1300 to identify a group of possible trigger clips in accordance with aspects of this disclosure and FIG. 14 depicts a system 1400 to distribute a group of trigger clips to a group of players in accordance with aspects of this disclosure. Referring to both FIGS. 13 and 14, in one or more embodiments, a computer server 1402 can implement a video game (hereafter video game server 1402) involving several different players 1304, 1306, 1308, 1314, 1316, and 1318 in different locations communicating with each other and the video game server 1402 over a communication network (e.g. Internet). Further, some players 1304, 1306, 1314, and 1316 can comprise one team playing the video game playing against another team of players 1308 and 1318. The gaming devices 1404, 1408, 1412, and 1416 are associated with each player 1304, 1306, 1314, and 1316 of one team.

In one or more embodiments, the video game server 1402 can detect a current trigger during a video game and record a trigger clip. A trigger is an event in the video game that a player may find significant and/or if reviewed, improve player performance in the future. Examples of triggers can include when a player makes a kill, makes a hit, takes a hit, loss of life, fired upon, implements weapon fire, loss of life of another player, change in ammunition, etc. A player may want to review triggers so as to avoid such actions/events (e.g. loss of life, takes a hit, fired upon, etc.) or to continue the actions/events (e.g. makes a kill, makes a hit, etc.) to improve video game performance in the future. A trigger clip is a portion of the video game that is recorded that contains the trigger. As described herein, a video game may have a sliding window of game content that it continuously records portions of the video game. Once the video game server 1402 identifies a trigger, the video game server 1402 can process the recorded sliding window/recorded portion of video game content that contains the trigger as the trigger clip. Further, the trigger clip can be provided and presented to a player for the player's review.

In one or more embodiments, the trigger clip is a recorded portion of the game content from the perspective or point of view of a player. In some embodiments, a trigger can involve one or more players. Thus, a distributed trigger clip may be requested or provided to all players involved in the trigger. That is, a distributed trigger clip is a group of trigger clips provided to each player involved in the trigger. Each trigger clip provided to each player is a portion of game content from the associated player's perspective or point of view. Referring to FIG. 13, a trigger clip 1302 of a war scenario video game can include a first player 1304 on a first team. The trigger clip 1302 can be from the perspective of the first player 1304. The trigger can be the loss of life of a second player 1306 of the first team. Further, the trigger clip 1302 can include a first player 1308 on a second team that is taking cover behind a building 1310. The first player 1304 of the first player may request to clip the trigger of the loss of life of the second player 1306 of the first team because the first player 1304 on the first team is unsure whether he/she killed the second player 1306 on the first team (i.e. loss of life due to friendly fire), or whether the first player 1308 on the second team killed the second player 1306 on the first team (i.e. loss of life due to enemy fire). The first player 1304 may want to review the trigger clip to review whether he/she committed friendly fire, and if so, avoid doing so in the future.

In one or more embodiments, the video game server 1402 can identify that the first player 1304 and the second 1306 on the first team are both involved in the trigger. Thus, the video game server 1402 can generate another trigger clip 1302a from the perspective of the second player 1306. Referring to FIG. 14, when requested by the first player 1304, the video game server can provide the distributed trigger clip, which comprises trigger clip 1302 and trigger clip 1302a. Trigger clip 1302 can be sent to gaming device 1404 associated with the first player 1304 over a communication network (wired, wireless, or a combination thereof) to be presented on display 1406 for review by the first player 1304. Further, trigger clip 1302a can be sent to gaming device 1408 associated with the second player 1306 (wired, wireless, or a combination thereof) to be presented on display 1410 for review by the first player 1306.

Referring to FIG. 13, a third player 1314 and a fourth player 1316 on the first team (same team as first player 1304 and second player 1306) are not involved in the trigger because they are in a different scene/setting 1312 of the video game battling a second player 1318 on the second team in a forest. Referring to FIG. 14, the video game server 1402 would identify that neither the third player 1314 nor the fourth player 1316 would not be provided with the distributed trigger clip because they were not involved with the trigger. Thus, even though the video game server 1402 is communicatively coupled to gaming devices 1412, 1416 and displays 1414 and 1418 associated with players 1314 and 1316 over a communication network (wired, wireless, or a combination thereof), the video game server 1402 would not provide the distributed trigger clip 1302, 1302a to gaming devices 1412 and 1416.

In one or more embodiments, the video game server 1402 can detect or identify a trigger by receiving user-generated input from the first player 1304, the user-generated input indicating to generate a clip according to the event/trigger and the players in involved in the event/trigger. The user-generated input can also include a timestamp. The user-generated input can be provided entering text input, gesture input (using a touchscreen graphical user interface), and/or voice input (involving voice recognition techniques) into the gaming device 1404. Further, the user-generated input provided to the gaming device 1404 is then transmitted to the video game server 1402 for further processing. The video game server 1402 can then record the distributed trigger clip (group of trigger clips) about the timestamp (e.g. 20 seconds before and after the indicated or detected trigger) included in the user-generated input (or detected otherwise) for the trigger/event and for the players indicated in the user-generated input.

In one or more embodiments, prior to detecting a trigger, the video game server 1402 can receive user-generated input (as described herein) indicating different events that are associated with different trigger types. For example, trigger types can include of kill, hit, weapon fire, loss of life of current player, loss of life of another player, and change in ammunition. The video game server 1402 can associate each event with a trigger type according to the user-generated input.

In one or more embodiments, the video game server 1402 can detect a trigger by implementing image recognition techniques to identify or otherwise determine that an event within a portion of game content is a trigger. In other embodiments, the video game server 1402 can access historical game content and identify a previous trigger within the historical game content. That is, the video game server 1402 can analyze historical game content to determine when an event was identified as a trigger according to its trigger type. Based on such a determination, the video game server 1402 can detect a current trigger by determining the current trigger/event is of the same type as the previous trigger.

In one or more embodiments, the detecting of a current trigger can include accessing training game content, acquiring machine learning techniques to identify different trigger from the different event from the training game content. That is, different events that are identified as different triggers in the training game content can be used to train an artificial intelligence engine on the video game server 1402 to acquire machine learning techniques to identify triggers in portions of game content in the future. Further, the detecting of a current trigger can comprise identifying the current trigger by using, or in response to, implementing the machine learning techniques on the portion of game content.

In one or more embodiments, the detecting of a trigger can include detecting a particular sound or utterance or word or statement by a player to identify or otherwise determine that an event within a portion of game content is a trigger. This may be done in any suitable manner including using artificial intelligence or machine learning techniques. In an example, a neural network is trained to estimate, on-the-fly, if there is, for example, a laugh or scream from a player. In an example, on-the-fly operation means within a time delay of less than one second. Time is required by a processing system to accumulate data and process the data. Any suitable neural network may be used. Training data may be audio data from other gameplay that is labelled to identify a laugh or a scream or other utterance or statement that is to be designated as a trigger. The neural network is trained to provide as an output an indication that the trigger has been detected or identified. After training, a portion of an audio stream is provided to the neural network and the neural network generates a value that corresponds to a probability that the trigger has been detected. A processing system may compare the value with a predetermined threshold. If the probability exceeds the predetermined threshold, such as 50 percent or 85 percent or 95 percent, the characteristic may be identified as a significant trigger. The training data may include any sort of audio including conversations, laughter, screaming and other sounds as well, including sounds that are representative of typical sounds.

A system including an audio processing system such as audio processing system 7600 (FIG. 7L) may include a chat audio stream and a microphone audio stream. The chat audio stream may include audio corresponding to conversation and other utterances from gamers such as teammates of a local user. The microphone audio stream may include audio corresponding to conversation and other utterances from the local user, detected by the microphone adjacent to the local user. In a first use case, a neural network, or multiple neural networks, may be trained to detect an occurrence in the chat audio stream or an occurrence in the microphone audio stream and, responsive to the detected occurrence, to cause a subsequent action within the gaming system. In other embodiments, in a second use case, the neural network may operate on a combined audio stream that includes both the chat audio stream and the microphone audio stream. Similarly, in a third use case, a single audio stream includes a combined audio stream that includes the chat audio stream, the microphone audio stream and a game audio stream that includes sounds generated by the game. The training data for either of these use cases is tailored to the particular use case.

In a particular embodiment, a trigger is detected by automatically detecting a laugh or a scream in an audio stream. The laugh or scream can originate with any player. A motivation for such automatic triggering is the notion that, if someone is laughing or screaming, something interesting happened in the game and that should be recorded in a trigger clip. Both audio and video are recorded in the trigger clip.

In some embodiments, a first window of video of a first predetermined time duration is recorded before the occurrence of the trigger and a second window of a second predetermined time duration, that may be different from the first predetermined time duration, is recorded following the occurrence of the trigger. The nature of the detected trigger, such as a laugh or a scream, can be used to select the duration of the trigger clip. For example, a laugh detected as a trigger may cause a 30 second trigger clip having a duration of 30 seconds to be recorded and a scream detected as a trigger may cause a trigger clip having a duration of 60 seconds to be recorded. In some embodiments, any aspect of detecting a trigger, identifying a trigger or the duration of the trigger clip associated with a specific trigger may be user selectable, such as through a graphical user interface such as GUI 7610 (FIG. 7L).

In some embodiments, one or more players has a webcam or other device collecting video of the player or the player's environment. The video stream from the webcam can be provided to a neural network to identify a video trigger in a manner similar to the identifying an audio trigger in an audio stream. The neural network may be trained with appropriate data that is labelled to identify the trigger of interest. In further embodiments, both an audio stream and a video stream may be monitored in a multimodal approach to identify a trigger event. For example, a video neural network will produce a video probability that a video trigger has been detected and an audio neural network will produce an audio probability that an audio trigger has been detected. The video probability and the audio probability may be combined and evaluated in any suitable manner against one or more probability thresholds. For example, if a player laughs silently, the audio neural network may not detect the sound corresponding to a laugh, but the video neural network may detect the action or movement associated with laughter, or a probability that the motion corresponds to a laugh. Any change of emotion or other response captured in audio or video, may be designated as a trigger.

In some embodiments, a trigger may be defined according to particular cultural aspects of a player. For example, research may show that European players react to a game situation in a first way, American players react to the same game situation in a second way, south Asian players react to the same game situation in a third way and east Asian players react to the same game situation in a fourth way. Reactions of the different cultures may include utterances and statements made orally or body movements or postures, or any combination of these. Different models may be directed to geography or language or other characteristics of different gamers.

In some embodiments, the processing of audio and video streams to identify triggers may occur on a user device such as computing device 206 (FIG. 2). The processing may be part of the game application running on a gamer's device. In other embodiments, the processing of audio and video streams may be done remotely such as at a server hosting the game and accessible over a network such as the public internet.

In some embodiments, the audio stream may be provided to a speech recognition module. The speech recognition module may detect and identify words stated by a gamer. Any suitable speech recognition module may be used for this purpose. In this manner, the user may be able to provide commands to the gaming system. Moreover, a trigger may be detected based on an identified statement or command of the player.

In some embodiments, data for a user's audio and video recognition may be stored in a user profile. The user profile may contain any suitable information useful for processing the audio or the video associated with the user. The user profile may be accessed when the user initiates the game or during gameplay, or at any appropriate time. The user profile may be stored locally at a device of the user. In other embodiments, the user profile may be stored remotely at a server or other storage location for access by the local device of the user.

In some embodiments, a detected trigger may be characterized to determine particular characteristics of the trigger. The detected characteristics may be used to automatically select different characteristics of the trigger clip that is recorded. For example, a sound may be identified as a scream. If the volume of the scream exceeds a certain threshold, or if the duration of the scream exceeds a certain duration, or a combination of these characteristics, the scream may be treated as a more significant trigger. Identification of the more significant trigger may cause the qaudio processing system or other aspect to record a trigger clip having a particular characteristic, such as a longer duration. Similarly, identification of the more significant trigger may cause the audio processing system or other aspect to distribute the recorded trigger clip to a different audience than the audience for a conventional trigger. The neural network may be trained using appropriate training data to distinguish any characteristics of interest in the audio stream and to generate a value corresponding to a probability that the trigger has been detected. If the probability exceeds a predetermined threshold, such as 85 percent, the characteristic may be identified as a significant trigger. Any suitable statistics in the audio stream and in the neural network can be used to identify one or more triggers.

In one or more embodiments, the video game server can determine a group of players involved in a current trigger by identifying the group of players using, or in response to, implementing image recognition techniques on a trigger clip. In one or more embodiments, the video game server can instead, or in addition, identify a group of players involved in a current trigger by identifying the group of players using, or in response to, analyzing one or more audio streams such as chat audio streams or microphone audio streams on a trigger clip. In some embodiments, the video game server 1402 can determine the group of players involved in the current trigger by identifying the group of players by, or in response to, analyzing game action during the same time period each possible trigger clip in the group of trigger clips. That is, when the video game server 1402 identifies a trigger in a portion of game content from one player's perspective, the video game server can then generate a trigger clip for that player (i.e. record a portion of the game content from that player's perspective). However, the video game server 1402 can also record other portions of game content, each portion of game content from a different player's perspective. These group of portions of game content are possible trigger clips to comprise the distributed trigger clip. However, after determining only players involved in the trigger, the video game server 1402 discards portions of game content that are from perspective of players not involved in the trigger and generates the distributed trigger clip to comprise a group of portions of game content (i.e. trigger clips) from the perspective of each player involved in the trigger.

Figure 15A:
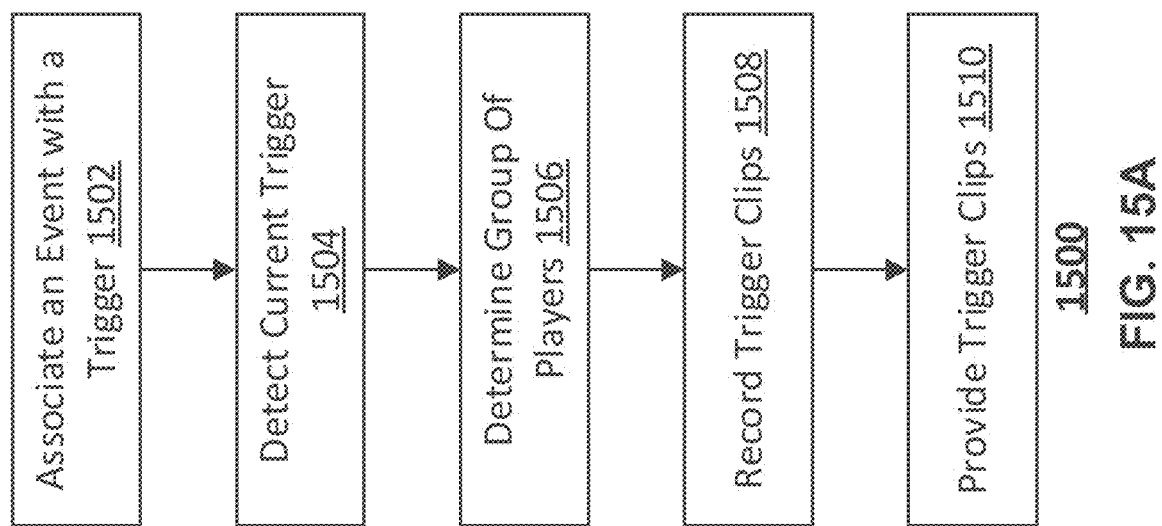

FIGS. 15A-D depict illustrative embodiments of methods utilized in the subject disclosure. Further, the methods depicted in FIGS. 15A-D can be implemented by a video game server as described herein. Referring to FIG. 15A, the method 1500 can include the video game server, at 1502, associating each event in a group of events with each trigger type from a group of trigger types. Further, the method 1500 can include the video game server, at 1504, detecting a current trigger during a video game. In addition, the method 1500 can include the video game server, at 1506, determining a group of players involved in the current trigger. Also, the method 1500 can include the video game server, at 1508, recording a trigger clip of game content for each player in the group of players resulting in a group of trigger clips. Each trigger clip of the group of trigger clips is a portion of game content that includes the current trigger from a perspective of each player of the group of players. Further, the method 1500 can include the video game server, at 1510, providing the group of trigger clips to a group of gaming devices over a communication network. Each gaming device of the group of gaming devices is associated with one player of the group of players.

Figure 15B:
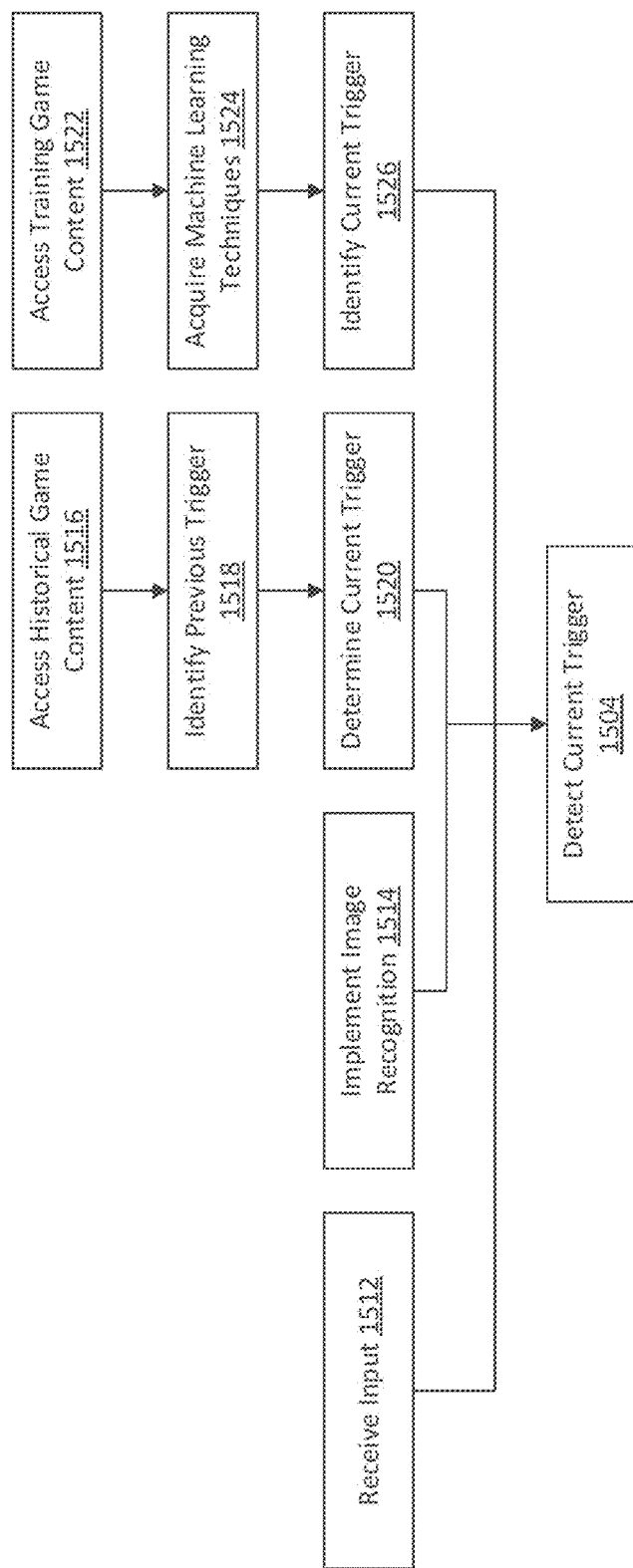

Referring to FIG. 15B, the method 1511 can implement detecting of the current trigger in different embodiments. The method 1511 can include the video game server, at 1512, receiving first user-generated input. The first user-generated input indicates the current trigger and/or to record the group of trigger clips. Further, the method 1511 can include the video game server, at 1514, implementing image recognition techniques on each portion of game content associated with each of trigger clip of the group of trigger clips to determine that an event occurred within each portion of game content such that the event comprises the current trigger. In addition, the method 1511 can include the video game server, at 1516, accessing historical game content. Also, the method 1511 can include the video game server, at 1518, identifying a previous trigger within the historical game content. Further, the method 1511 can include the video game server, at 1520, determining the current trigger is a same type of trigger as the previous trigger. In addition, the method 1511 can include the video game server, at 1522, accessing training game content. Also, the method 1511 can include the video game server, at 1524, acquiring machine learning techniques to identify different triggers from different events from the training game content. Further, the method 1511 can include the video game server, at 1526, identifying the current trigger in response to implementing the machine learning techniques on the portion of game content. In some embodiments, the current trigger comprises a trigger type, wherein the trigger type comprises one of kill, hit, weapon fire, loss of life of current player, loss of life of another player, and change in ammunition.

Referring to FIG. 15C, the associating an event with a trigger can be done by the video game server in different embodiments. The method 1531 can include the video game server, at 1530, determining the group of events of the video game. Further, the method 1531 can include the video game server, at 1532, associating each event in the group of events of the video game with each trigger type from the group of trigger types. In addition, the method 1531 can include the video game server, at 1534, receiving second user-generated input. The second user-generated input provides an indication of each event associated with each trigger type.

Figure 15D:
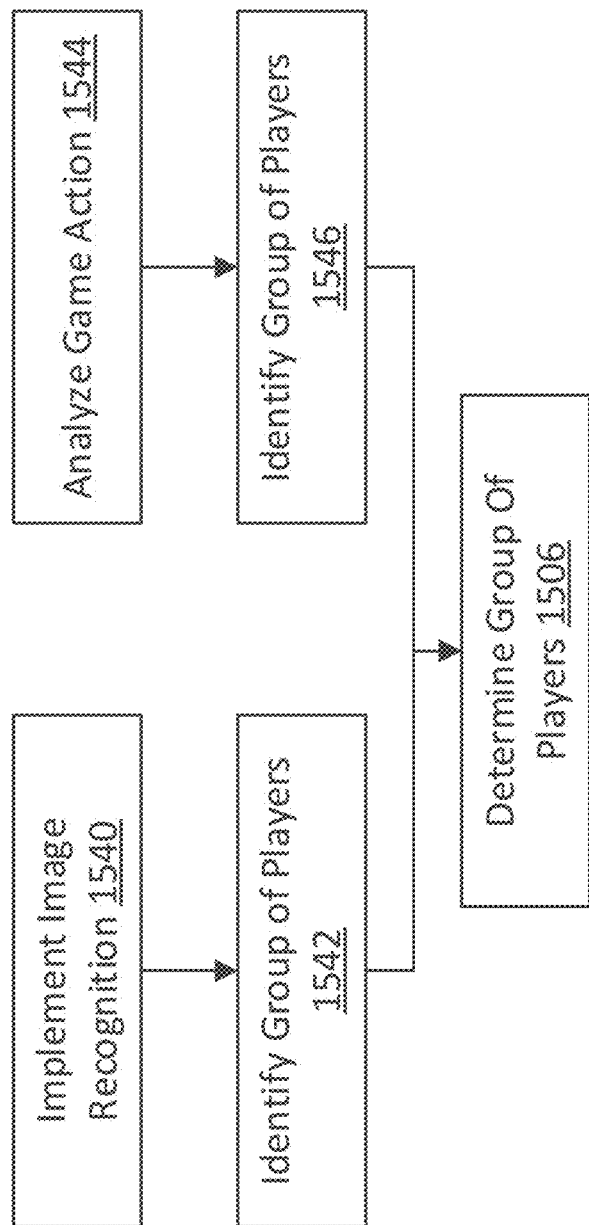

Referring to FIG. 15D, the determining the group of players involved in the current trigger can be done by the video game server in different embodiments. The method 1541 can include the video game server, at 1540, implementing image recognition techniques or analyzing audio streams on each trigger clip of the group of trigger clips. In response, the method 1541 can include the video game server, at 1542, identifying the group of players. Further, the method 1541 can include the video game server, at 1544, analyzing game action during a same time period as each trigger clip of the group of trigger clips. In response, the method 1541 can include the video game server, at 1546, identifying the group of players. This analysis can include the video game server determining from game action the location of each player within the video game and determining the group of players involved in the current trigger by determining the location of each player within the game. Further, those players within a certain threshold distance from the event/current trigger are determined to be involved with the current trigger.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
receiving, by a processing system including a processor and a memory, a live game output audio stream of a gaming application currently being played by a plurality of gamers, wherein the receiving the live game output audio stream comprises receiving a chat audio stream including teammate speech among the plurality of gamers;
retrieving, by the processing system, a stored configuration file, the stored configuration file including data defining stored live audio processing settings;
modifying, by the processing system, the live game output audio stream including the chat audio stream of the gaming application according to the stored live audio processing settings, forming modified gaming audio; and
providing, by the processing system, the modified gaming audio to one or more gamers of the plurality of gamers.

2. The method of claim 1, further comprising:
separating, by the processing system, the live game output audio stream of the gaming application into a plurality of audio streams including the chat audio stream;
identifying, by the processing system, a selected audio stream associated with the stored configuration file; and
modifying, by the processing system, the selected audio stream according to the stored live audio processing settings.

3. The method of claim 2, wherein the separating the live game output audio stream comprises:
separating, by the processing system, the live game output audio stream into a gaming audio stream including audio produced by the gaming application, the chat audio stream including the teammate speech and a microphone audio stream including speech of one gamer of the plurality of gamers;
modifying, by the processing system, the gaming audio stream according to gaming settings of the stored configuration file;
modifying, by the processing system, the chat audio stream according to chat settings of the stored configuration file; and
modifying, by the processing system, the microphone audio stream according to microphone settings of the stored configuration file.

4. The method of claim 1, further comprising:
identifying, by the processing system, a gamer associated with the gaming application; and
retrieving, by the processing system, the stored configuration file based on the identifying a gamer.

5. The method of claim 4, further comprising:
identifying, by the processing system, the gaming application; and
retrieving, by the processing system, the stored configuration file based on the identifying a gaming application and the identifying a gamer.

6. The method of claim 1, further comprising:
identifying, by the processing system, the gaming application; and
retrieving, by the processing system, the stored configuration file based on the identifying a gaming application.

7. The method of claim 1, further comprising:
detecting, by the processing system, an initiation of the gaming application;
retrieving, by the processing system, the stored configuration file, wherein the stored configuration file is associated with the gaming application; and
applying, by the processing system, the stored live audio processing settings to the live game output audio stream of the gaming application.

8. The method of claim 1, further comprising:
detecting, by the processing system, an initiation of the gaming application;
determining, by the processing system, an identification of the gaming application;
retrieving, by the processing system, the stored configuration file, wherein the stored configuration file is associated with the gaming application, and wherein the stored configuration file includes a plurality of pre-set audio configurations for the gaming application;
providing, by the processing system, to a gamer of the plurality of gamers, information about the plurality of pre-set audio configurations for the gaming application, wherein the gamer accesses a graphical user interface;
receiving, by the processing system, from one gamer of the plurality of gamers, a gamer selection of a selected pre-set audio configuration; and
applying, by the processing system, the selected pre-set audio configuration to the live game output audio stream of the gaming application.

9. The method of claim 8, further comprising:
receiving, by the processing system, gamer modifications to the selected pre-set audio configuration, forming an updated configuration file; and
storing the updated configuration file for subsequent retrieval and access by the gamer of the plurality of gamers.

10. The method of claim 9, wherein the receiving gamer modifications to the selected pre-set audio configuration comprises receiving the gamer modifications at the graphical user interface.

11. A device, comprising
a processing system including a processor; and
a memory that stores executable instructions that, when executed by the processing system, facilitate performance of operations, the operations comprising:
initiating a gaming application for a gamer of a plurality of gamers;
retrieving a gamer configuration file associated with the gamer;
receiving a gaming application audio output stream, wherein the receiving the gaming application audio output stream comprises receiving a chat audio stream including teammate speech among the plurality of gamers;
applying audio modifications specified by the gamer configuration file to the gaming application audio output stream including the chat audio stream, forming a modified gaming audio stream; and
providing the modified gaming audio stream to one or more gamers including the gamer.

12. The device of claim 11, further comprising:
providing information about the audio modifications specified by the gamer configuration file to a graphical user interface, wherein the graphical user interface is accessible by the gamer of the plurality of gamers;
receiving, from actuation of the graphical user interface by the gamer of the plurality of gamers, updates to the audio modifications specified by the gamer configuration file, forming an updated configuration file; and
storing the updated configuration file for subsequent retrieval and access by the gamer of the plurality of gamers.

13. The device of claim 12, wherein the providing the providing information about the audio modifications specified by the gamer configuration file to a graphical user interface comprises:
providing a parametric equalizer on the graphical user interface, wherein the parametric equalizer is associated with one or more filters to modify the gaming application audio output stream according to equalizer settings, the equalizer settings being retrieved in the gamer configuration file; and
receiving, from the gamer of the plurality of gamers, modifications to the equalizer settings to customize the gaming application audio output stream for the gamer of the plurality of gamers.

14. The device of claim 13, further comprising:
displaying, on the graphical user interface, a graphical plot of frequency response and filter adjustments associated with the equalizer settings;
receiving, from the gamer of the plurality of gamers, actuations of the graphical plot of frequency response to select and modify respective filter adjustments;
updating the equalizer settings according to the actuations of the graphical plot of frequency response, forming updated equalizer settings; and
storing the updated equalizer settings with the updated configuration file.

15. The device of claim 11, further comprising:
responsive to the initiating a gaming application for the gamer of a plurality of gamers, determining an identity of the gamer of the plurality of gamers;
identifying a plurality of stored configuration files associated with the identity of the gamer, wherein respective stored configuration files are associated with respective gaming applications;
determining an identity of the gaming application; and
retrieving the gamer configuration file associated with the gamer based on the identity of the gaming application.

16. The device of claim 11, further comprising:
retrieving a standard configuration file, the standard configuration file including standard audio modifications available to all gamers;
applying the standard audio modifications specified by the standard configuration file to the gaming application audio output stream, forming a standard modified gaming audio stream;
providing information about the standard audio modifications specified by the standard configuration file to a graphical user interface, wherein the graphical user interface is accessible by the gamer of the plurality of gamers;
receiving, from actuation of the graphical user interface by the gamer of the plurality of gamers, customizations to the standard audio modifications specified by the standard configuration file, forming a customized configuration file for the gamer of the plurality of gamers; and storing the customized configuration file for subsequent retrieval and access by the gamer of the plurality of gamers.

17. A non-transitory machine-readable medium, comprising executable instructions that, when executed by a processing system including a processor, facilitate performance of operations, the operations comprising:

initiating a gaming application for a gamer of a plurality of gamers;

retrieving a standard configuration file, the standard configuration file including standard audio modifications to a gaming audio stream of the gaming application;

receiving a gaming application audio output stream, including receiving a chat audio stream including gamer chat among the plurality of gamers;

applying the standard audio modifications to the gaming application audio output stream including the chat audio stream, forming a modified gaming audio stream;

providing the modified gaming audio stream to one or more gamers including the gamer;

receiving, from actuation of a graphical user interface by the gamer of the plurality of gamers, customizations to the standard audio modifications specified by the standard configuration file, forming a customized configuration file for the gamer of the plurality of gamers; and storing the customized configuration file for subsequent retrieval and access by the gamer of the plurality of gamers.

18. The non-transitory machine-readable medium of claim 17, wherein the operations further comprise:

providing information about the standard audio modifications specified by the standard configuration file to a graphical user interface, wherein the graphical user interface includes a parametric equalizer and wherein the standard audio modifications comprise equalizer settings for controlling one or more filters associated with the parametric equalizer.

19. The non-transitory machine-readable medium of claim 17, wherein the retrieving a standard configuration file comprises:

identifying the gaming application; and retrieving a game-specific standard configuration file including game-specific standard audio modification, wherein the retrieving is based on the identifying the gaming application.

20. The non-transitory machine-readable medium of claim 17, wherein the operations further comprise:

separating the gaming application audio output stream of the gaming application into a plurality of audio streams including the chat audio stream;

modifying the plurality of audio streams according to the standard audio modifications;

subsequently, retrieving the customized configuration file; and modifying the plurality of audio streams according to the customizations to the standard audio modifications specified by the standard configuration file.

\* \* \* \* \*